US011112856B2

(12) United States Patent
Rouvinez et al.

(10) Patent No.: US 11,112,856 B2
(45) Date of Patent: Sep. 7, 2021

(54) TRANSITION BETWEEN VIRTUAL AND AUGMENTED REALITY

(71) Applicant: Logitech Europe S.A., Lausanne (CH)

(72) Inventors: Thomas Rouvinez, Lausanne (CH); Aidan Kehoe, Morges (CH); Mario Gutierrez, Lausanne (CH); Vincent Jalil, Lausanne (CH); Damien O'Sullivan, County Cork (IE); Mathieu Meisser, Lausanne (CH); Nicolas Ramond, Lugrin (FR); Regis Croisonnier, Bellevue (FR)

(73) Assignee: Logitech Europe S.A., Lausanne (CH)

(*) Notice: Subject to any disclaimer, the term of this patent is extended or adjusted under 35 U.S.C. 154(b) by 0 days.

(21) Appl. No.: 16/421,335

(22) Filed: May 23, 2019

(65) Prior Publication Data

US 2020/0019232 A1 Jan. 16, 2020

Related U.S. Application Data

(63) Continuation of application No. 15/457,854, filed on Mar. 13, 2017, now Pat. No. 10,317,989.

(60) Provisional application No. 62/307,539, filed on Mar. 13, 2016, provisional application No. 62/421,910, filed on Nov. 14, 2016, provisional application No. (Continued)

(51) Int. Cl.
*G06F 3/01* (2006.01)
*G06T 19/00* (2011.01)
*G02B 27/01* (2006.01)

(52) U.S. Cl.
CPC ............ *G06F 3/011* (2013.01); *G06T 19/006* (2013.01); *G02B 27/017* (2013.01)

(58) Field of Classification Search
CPC ....... G06F 3/011; G06T 19/006; G06T 19/20; G06T 2200/04; G02B 27/01–0189; G02B 2027/0105–0198
See application file for complete search history.

(56) References Cited

U.S. PATENT DOCUMENTS 5,835,079 A 11/1998 Shieh
10,317,989 B2 6/2019 Rouvinez et al.
(Continued)

FOREIGN PATENT DOCUMENTS

GB 2535730 A 8/2016
WO 2012088285 A2 6/2012
(Continued)

OTHER PUBLICATIONS

U.S. Appl. No. 15/457,854, "Advisory Action", dated Dec. 6, 2018, 4 pages.
(Continued)

*Primary Examiner* — Stephen G Sherman
(74) *Attorney, Agent, or Firm* — Kilpatrick Townsend & Stockton LLP

(57) ABSTRACT

In an embodiment there is provided a user interface device for interfacing a user with a computer, the computer comprising at least one processor to generate instructions for display of a graphical environment of a virtual reality simulation. The user interface device includes a sensor for detecting activation and/or a sensor for detecting proximity of a body part of the user (e.g., hand). At least partially based on detection by one of these sensors, a transition between virtual reality states is triggered.

20 Claims, 23 Drawing Sheets

Related U.S. Application Data

62/428,276, filed on Nov. 30, 2016, provisional application No. 62/428,241, filed on Nov. 30, 2016, provisional application No. 62/428,488, filed on Nov. 30, 2016.

(56) References Cited

U.S. PATENT DOCUMENTS

| | | | |
|---|---|---|---|
| 2001/0026277 A1* | 10/2001 | Dorrell | H04N 19/23 345/474 |
| 2003/0227470 A1 | 12/2003 | Genc et al. | |
| 2009/0044028 A1* | 2/2009 | Wong | G06F 1/266 713/300 |
| 2010/0079356 A1* | 4/2010 | Hoellwarth | G02B 27/0093 345/8 |
| 2010/0103103 A1 | 4/2010 | Palanker et al. | |
| 2010/0265107 A1* | 10/2010 | Whitman | G06F 3/021 341/23 |
| 2011/0063224 A1 | 3/2011 | Vexo et al. | |
| 2012/0075168 A1* | 3/2012 | Osterhout | G06F 3/011 345/8 |
| 2013/0002534 A1 | 1/2013 | Braun et al. | |
| 2013/0113762 A1 | 5/2013 | Geaghan | |
| 2013/0194188 A1 | 8/2013 | Walker et al. | |
| 2013/0342564 A1 | 12/2013 | Kinnebrew et al. | |
| 2014/0306866 A1 | 10/2014 | Miller et al. | |
| 2015/0123771 A1 | 5/2015 | Otto et al. | |
| 2015/0123891 A1 | 5/2015 | Tu et al. | |
| 2016/0054791 A1 | 2/2016 | Mullins et al. | |
| 2016/0209658 A1 | 7/2016 | Zalewski | |
| 2016/0238692 A1 | 8/2016 | Hill et al. | |
| 2016/0253842 A1 | 9/2016 | Shapira et al. | |
| 2016/0260251 A1 | 9/2016 | Stafford et al. | |
| 2017/0083104 A1* | 3/2017 | Namba | G02B 27/017 |
| 2017/0262045 A1 | 9/2017 | Rouvinez et al. | |

FOREIGN PATENT DOCUMENTS

| | | |
|---|---|---|
| WO | 2015096145 A1 | 7/2015 |
| WO | 2015183621 A1 | 12/2015 |
| WO | 2016041088 A1 | 3/2016 |
| WO | 2018090060 A1 | 5/2018 |
| WO | 2018102615 A1 | 6/2018 |

OTHER PUBLICATIONS

U.S. Appl. No. 15/457,854, "Final Office Action", dated Aug. 29, 2018, 10 pages.
U.S. Appl. No. 15/457,854, "Non Final Office Action", dated May 9, 2018, 14 pages.
U.S. Appl. No. 15/457,854, "Notice of Allowance", dated Jan. 24, 2019, 8 pages.
EP17868922.0, "Extended European Search Report", dated Sep. 2, 2020, 12 pages.
EP17868922.0, "Partial Supplementary European Search Report", dated Apr. 17, 2020, 13 pages.
EP17876363.7, "Extended European Search Report", dated Jul. 3, 2020, 9 pages.
EP19187087.2, "Extended European Search Report", dated May 19, 2020, 11 pages.
EP19187087.2, "Partial European Search Report", dated Dec. 3, 2019, 11 pages.
PCT/US2017/061649, "International Preliminary Report on Patentability", dated May 23, 2019, 14 pages.
PCT/US2017/061649, "International Search Report and Written Opinion", dated Apr. 5, 2018, 17 pages.
PCT/US2017/061649, "Invitation to Pay Additional Fees and, Where Applicable, Protest Fee", Jan. 3, 2018, 2 pages.
PCT/US2017/064080, "International Preliminary Report on Patentability", dated Jun. 13, 2019, 12 pages.
PCT/US2017/064080, "International Search Report and Written Opinion", dated Apr. 5, 2018, 16 pages.
PCT/US2017/064080, "Invitation to Pay Additional Fees and, Where Applicable, Protest Fee", Feb. 6, 2018, 3 pages.

* cited by examiner

TRANSITION BETWEEN VIRTUAL AND AUGMENTED REALITY

CROSS-REFERENCES TO RELATED APPLICATIONS

This application is a continuation of U.S. Non-Provisional application Ser. No. 15/457,854, filed Mar. 13, 2017, entitled "Transition Between Virtual and Augmented Reality," which claims priority to provisional application No. 62/307,539, filed Mar. 13, 2016, entitled "Virtual and Augmented Reality Generation System," provisional application No. 62/421,910 filed Nov. 14, 2016, entitled "A System for Importing User Interface Devices into Virtual/Augmented Reality," provisional application No. 62/428,276, filed Nov. 30, 2016, entitled "Updated—A System for Importing User Interface Devices into Virtual/Augmented Reality," provisional application No. 62/428,241, filed Nov. 30, 2016, entitled "Augmented/Mixed Reality Peripheral Discovery and Usage," provisional application No. 62/428,488, filed Nov. 30, 2016, entitled "Tracking System for Real Objects in Virtual Reality," which are hereby incorporated by reference in their entirety for all purposes.

FIELD OF THE INVENTION

The described embodiments relate generally to virtual reality (VR), Augmented Reality (AR) and Mixed Reality (MR) states, and more specifically to transitioning between such states.

BACKGROUND

Virtual Reality (VR) may be referred to as immersive multimedia or computer-simulated reality. VR, AR, MR and other types of reality are sometimes referred to as X Reality (XR) to cover multiple types of reality. It is frequently associated with a variety of applications, which may comprise immersive, highly visual, computer-simulated environments. These environments typically simulate a physical presence of a user in places in the real world or imagined worlds. Related thereto is Augmented Reality, wherein the computer simulations comprise a direct or indirect view from actual physical world, with objects augmented or supplemented by graphical images. The computer simulation of these environments is commonly achieved by visual images and auditory signals.

Visual images are commonly presented by means of a video display that forms part of a head mounted display (HMD) and may encompass all or part of a user's field of view. The HMD may be arranged as a visor, helmet or other suitable configuration. An example of a HMD presently available is the Oculus Rift from Oculus VR. A further example of a HMD presently available is the HoloLens from Microsoft.

The HMD is usually arranged to cover the eyes of a user such that a user wearing the HMD can see only the virtual world and is thus unable to see the actual physical world. In the physical world a user is normally able to see his or her arms, legs and torso when they are within their field of view. A known system for determining a position and orientation of a body parts of a user is by attaching to the HMD a camera, which is able to provide images for tracking body parts. A further known system comprises a magnetic field based tracking system, which requires attaching to the user trackers arranged within a magnetic field. Such an arrangement is disclosed in U.S. Patent Application No. 2011/0032187. U.S. Pat. No. 8,140,970 shows a method for displaying a virtual keyboard with a semi-transparent overlay of an end user's hands, where the user's hands are captured by a video camera.

One issue with transitioning between AR and VR states is determining when to transition. One approach is detecting when the user is interacting with an object to be used for AR, or otherwise based on a user's location, such as described in the following: U.S. Pub. No. 20160314624 (interaction with an object or user's location in a scene triggers transition); U.S. Pub. Pub. No. 20150123966 (describes an incremental transition).

In spite of the considerable effort already invested in the development of said systems further improvements are desirable.

BRIEF SUMMARY

In an embodiment there is provided a user interface device for interfacing a user with a computer, the computer comprising at least one processor to generate instructions for display of a graphical environment of a virtual reality simulation. The user interface device detects an interacton with any of its input elements and may include a body part sensor system for detecting proximity of a body part of the user (e.g., hand). At least partially based on detection by one of these sensors, a transition between virtual reality states is triggered.

In one embodiment the orientation or arrangement of the user body part relative to the user interface device is detected, and the transition between virtual reality states is triggered by an orientation indicating imminent use of the user interface device (e.g., fingers over the keys of a keyboard, approaching a mouse from a usage direction). The body part sensor system may be arranged on the user interface device to determine in respect of the body part any one or more of: a geometry of one or more portions of the body part; an orientation of one or more portions of the body part; a position of one or more portions of the body part. The body part may comprise a hand, fingers or a foot. The body part sensor system may be arranged to determine an arrangement of more than one body part, such as both hands. The body part sensor subsystem may comprise one or more sensors selected from of the following: capacitive sensors; optical sensors; thermal sensors; pressure sensors; proximity sensors; resistive sensors; camera system; ultrasonic sensors; Time-of-Flight (ToF) sensors; radar sensors. The user interface device may be at least one of a: keyboard, steering wheel; stick; pedal; mouse body; keys; buttons; control pad; scroll wheel; flight yoke; light pen; touch pad.

In another embodiment instructions are provided for display of the arrangement of a body part relative to the sensed arrangement, such that the body part appears in a corresponding position on the display and with a corresponding size and orientation that the user would observe in the actual physical world. The processor may use the body part tracking system when the body part is not in contact with the user interface device and use at least the body part sensor system when in contact with the user interface device. The body part tracking system may comprise a camera system.

In another embodiment, a graphical image of a user's body part and a user interface device is provided in different layers which can be combined to provide a composite image. A layer with the user's body part (e.g., hands, fingers, finger tips) can track the real world position of the user's body part in real time. One or more layers for a user input device may fade in and out, or otherwise gradually transition between VR states. In one example, the body of a keyboard may fade out after a period of non-use or removal of a user's hand, while a layer containing the keycaps remains visible longer. In one embodiment, user interface device software assembles the layers into a composite image and provides the composite image to the HMD. In another embodiment, the layers are provided to the HMD for assembly. Alternately, the HMD may provide input to the user interface device software for modification of the layers.

In another embodiment, cues are provided in a HMD display to indicate the location of a user interface device to a user. The cue may highlight a portion or layer of a user interface device, or provide an indication that the user interface device is outside the user's current field of view (e.g., behind the user).

In another embodiment the trigger event for a state transition may comprise at least one of the following: the determination of one or more body parts of a user, such as a hand or foot, arranged proximal or in contact with a user interface device of the system; the determination of one or more body parts of a user, such as a hand of foot, arranged distal or out of contact with the user interface device; a characteristic movement of a body part of a user, such as an arm movement, which may include a particular speed of movement, or a head movement, which may include head up/down or tilt; a characteristic orientation of a body part of a user, such as a gesture made by a hand of a user. The trigger event may include the manual actuation of an input device of a user interface. The system may comprise a user interface device. The processor may be configured to send instructions for a transition to the second state from the first state in response to the determination of a trigger event comprising the moving of one or more body parts of a user out of contact or from being proximal with the interface device. The processor may be configured to send instructions for a transition to the second state from the first state in response to a trigger event. In one embodiment, the trigger event is the determination of a movement of a head of a user, whereby a field of view of the user may have the representation of the interface device moved from its actual position to at or proximal the center of the user's field of view. Various trigger events may be combined, including with logical operators, such as AND (e.g. where the event combinations comprise a trigger event), and OR. System trigger events or combinations thereof may be user configurable. The instructions for the transitioned to second state may comprise a real reality or augmented reality graphical image overlaid/superposed on the first state virtual reality simulation. The overlay/supposition may be arranged at or proximal a position of the user interface device.

In another embodiment a transition is triggered by the orientation or arrangement of the user interface device, or other manipulatable object, rather than, or in addition to, the user's body part. The user interface device or object includes an indication arrangement configured with a characteristic arrangement of one or more elements. An image of the arrangement of elements is captured and processed to determine an arrangement of the user interface device or object relative an image capture position. The arrangement may be defined as one or more of: a geometry of one or more portions of the interface device; an orientation of one or more portions of the interface device; a distance of one or more portions of the interface device from the camera system. The characteristic arrangement may comprise each of the elements arranged at a predetermined distance apart. The element(s) may comprise at least one selected from the following: a printed pattern; light emitting indicators, including a light emitting diode, which may emit infra-red. The element(s) may have a three dimensional pattern, whereby a parallax of the associated elements is processed to determine a three dimensional orientation of the user interface device. The indication arrangement may be arranged on an exterior surface of the user interface device, which may be distinct from a portion of the device that is configured to be contacted by a user when using the device. The user interface device may comprise an electronic steering wheel arrangement, whereby the elements are at least partially arranged on a portion of the wheel interconnecting an axis of rotation and the user graspable periphery and/or the wheel. The elements may be arranged on one or more panels that radiate from the axle to interconnect the wheel and axle.

The preceding summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Moreover, the above and/or proceeding embodiments may be combined in any suitable combination to provide further embodiments. Other features, aspects, and advantages of the subject matter described herein will become apparent from the following Detailed Description, Figures, and Claims.

BRIEF DESCRIPTION OF THE DRAWINGS

Aspects, features and advantages of embodiments of the present disclosure will become apparent from the following description of embodiments in reference to the appended drawings in which like numerals denote like elements and in which.

DETAILED DESCRIPTION

Figure 1:
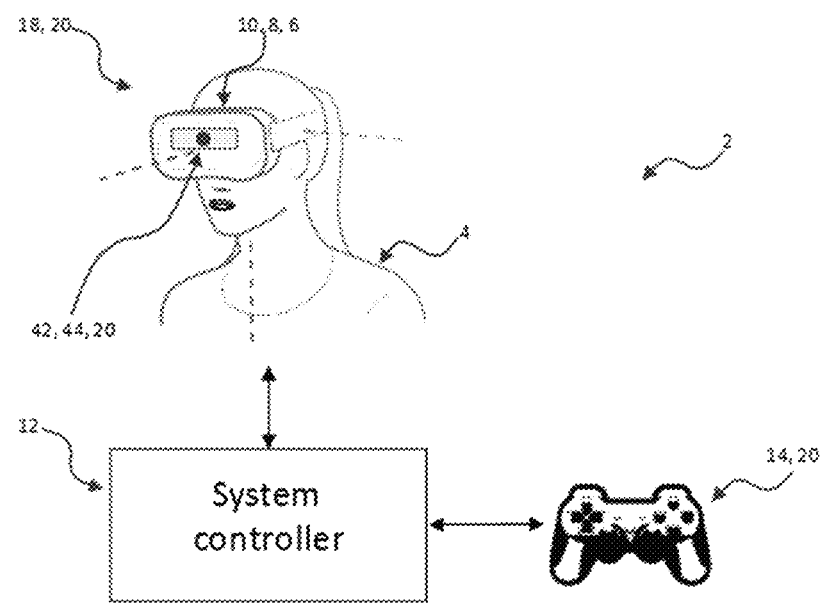
FIG. 1 is a schematic illustration of a virtual reality simulation (VR) system, which is capable of generating a VR simulation and displaying said simulation to a user and comprises a display, a system controller and at least one user interface device, according to certain embodiments.

The following detailed description refers to the accompanying drawings. The same reference numbers may be used in different drawings to identify the same or similar elements. In the following description, for purposes of explanation and not limitation, specific details are set forth such as particular devices, structures, architectures, interfaces, techniques, etc. in order to provide a thorough understanding of the various aspects of the present disclosure. However, it will be apparent to those skilled in the art having the benefit of the present disclosure that the various aspects of the claims may be practiced in other examples that depart from these specific details. In certain instances, descriptions of well-known devices, circuits, and methods are omitted so as not to obscure the description of the present disclosure with unnecessary detail.

Definitions

The present disclosure may be better understood in view of the following explanations:

As used herein, the terms "computer simulation" and "virtual reality environment" may refer to a virtual reality, augmented reality, real-reality or other form of visual, immersive computer-simulated environment provided to a user. As used herein, the terms "virtual reality" or "VR" may include a computer-simulated environment that replicates an imaginary setting. A physical presence of a user in this environment may be simulated by enabling the user to interact with the setting and any objects depicted therein. Examples of VR environments may include: a video game; a medical procedure simulation program including a surgical or physiotherapy procedure; an interactive digital mock-up of a designed feature, including a computer aided design; an educational simulation program, including an E-leaning simulation; or other like simulation. The simulated environment may be two or three-dimensional. As used herein, the terms "augmented reality" or "AR" may include a computer-simulated environment that replicates a simulation of the real-world environment. Objects simulated may include those of the real-world environment, said objected may be augmented or supplemented. Examples of AR environments may include: architectural applications for visualisation of buildings in the real-world; medical applications for augmenting additional information to a user during surgery or therapy; gaming environments to provide a user with an augmented simulation of the real-world prior to entering a VR environment. As used herein, the terms "mixed reality" or "MR" may include a combination of virtual and augmented reality or a combination of real and virtual environments. Preferably, in MR the environment is mapped and known and virtual objects are actually injected into that environment (e.g., an object behind a table may be half occluded by the table). Embodiments described below can be implemented in AR, VR, or MR. In addition, the umbrella term XR may be used to capture multiple types of reality.

As used herein, the term "real-world environment" or "real-world" may refer to the physical world. Hence term "real-world arrangement" in respect of an object (e.g. a body part or user interface device) may refer to an arrangement of the object in the real-world and may be relative a reference point. The term "arrangement" in respect of an object may refer to a position and an orientation. Position and orientation may be defined in terms of a global or local coordinate system. Position may be defined by a global coordinate system. Orientation in respect of an object may be defined in respect of an arrangement of its local coordinate system in respect of the global coordinate system.

As used herein, the term "graphical images" may include images that may be displayed as video to a user as part of the virtual reality environment. The images may be displayed in two or three dimensions.

As used herein, the term "head mounted display" or "HMD" may refer to a display for display of the graphical images of the graphical environment to a user. The HMD may include a graphical display that is supported in front of part or all of a field of view of a user. The display can include transparent, semi-transparent or non-transparent displays. The HMD may be part of a headset as defined herein. The graphical display of the HMD may be controlled by a display driver, which may include circuitry as defined herein.

As used herein, the term "headset" or "virtual reality headset" may refer to an arrangement including the HMD and an associated support for support of the HMD in front of a field of view of a user. The headset may include wearable glasses, a headset, a helmet, visor, a heads-up display (HUD) or other suitable mounting configuration. Examples of presently available HMDs include: the Oculus Rift from Oculus VR; the HoloLens from Microsoft; the VIVE developed by HTC and Valve Corporation; Gear VR by Samsung Electronics. The headset may include any one or more of: an audio output device to provide auditory feedback; a haptic feedback device to provide haptic feedback; other sensors, which may be placed on or around a forward facing surface when in use, e.g. to enable determination of a gaze and/or field of view of a user. The headset may include the display driver for control of the HMD.

As used herein, the term "electrical circuitry" or "circuitry" may refer to, be part of, or include one or more of the following or other suitable hardware or software components: an Application Specific Integrated Circuit (ASIC); an electronic circuit; a processor (shared, dedicated, or group); a memory (shared, dedicated, or group), that execute one or more software or firmware programs, a combinational logic circuit. In an embodiment the circuitry may include one or more virtual machines that can provide the described functionality. In an embodiment the circuitry may include passive components, e.g. combinations of transistors, transformers, resistors, capacitors that may provide the described functionality. In some embodiments, the circuitry may be implemented in, or functions associated with the circuitry may be implemented by, one or more software or firmware modules. In some embodiments, circuitry may include logic, at least partially operable in hardware. The electrical circuitry may be centralised or distributed, including distributed on various devices that form part of or are in communication with the system and may include: a networked-based computer, including as a remote server; or cloud-based computer, including a server system; or a peripheral device.

As used herein, the term "processor" or "host/local processor" or "processing resource" may refer to one or more units for processing including as an ASIC, microcontroller, FPGA, microprocessor, digital signal processor (DSP) capability, state machine or other suitable component. A processor may include a computer program, as machine readable instructions stored on a memory and/or programmable logic. The processor may be centralised or distributed, including distributed on various devices that form part of or are in communication with the system and may include: a networked-based computer, including as a remote server; or cloud-based computer, including a server system; or a peripheral device. The processor may be arranged in one or more of: a peripheral device, which may include a user interface device, the HMD; a computer (e.g. a personal computer or like device); or other device in communication with the system.

As used herein, the term "computer readable medium/ media" may include conventional non-transient memory, for example, random access memory (RAM), a CD-ROM, a hard drive, a solid state drive, a flash drive, a memory card, a DVD-ROM, a floppy disk, an optical drive, and/or combinations thereof. It is to be understood that while one or more memories may be located in the same physical location as the system, the one or more memories may be located remotely from the host system, and may communicate with the one or more processor via a computer network. Additionally, when more than one memory is used, a first memory may be located in the same physical location as the host system, and additional memories may be located in a remote physical location from the host system. The physical location(s) of the one or more memories may be varied. Additionally, one or more memories may be implemented as a "cloud memory" (i.e., one or more memory may be partially or completely based on or accessed using the network).

As used herein, the term "communication resources" may refer to hardware and/or firmware for electronic information transfer. Wireless communication resources may include hardware to transmit and receive signals by radio, and may include a various protocol implementations e.g. the 802.11 standard described in the Institute of Electronics Engineers (IEEE) and Bluetooth™ from the Bluetooth Special Interest Group of Kirkland Wash. Wired communication resources may include; a modulated signal passed through a power line, said modulation may comprise a power-line communication protocol (PLC), including the Institute of Electronics Engineers (IEEE) G3-PLC and PRIME protocols; Universal Serial Bus (USB); High-Definition Multimedia Interface (HDMI) or other protocol implementations.

As used herein, the term "network" or "computer network" may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network.

As used herein, the term "sensor system" may refer to a system operable to provide position and identification information concerning input devices, peripherals and other objects in the physical world that may include a body part or other object. The term "tracking system" may refer to detecting the movement of such objects. The body part may include, an arm, leg or torso, or subset thereof including a hand or digits (finger and thumbs). The body part may include the head of a user. The sensor system may provide position information from which a direction of gaze and/or field of view of a user can be determined. The object may include a peripheral device, other component of or interacting with the system. The sensor system may provide a real time stream of position information (this can be video, position x,y,z coordinates and movement vectors, and/or any other type of position information that is updated in real time). In an embodiment an image stream is provided, that may represent an avatar of a user (the image stream may include a real video image, an augmented video image, a computer generated or pre-stored image, or any combination or any other type of image). The sensor system and/or tracking system may include one or more of a: camera system; a magnetic field based system; capacitive sensors; radar; acoustic; other suitable sensor configuration, optical, radio, magnetic, and inertial technologies, such as lighthouses, ultrasonic, IR/LEDs, slam tracking, lidar tracking, ultra-wideband tracking, and other suitable technologies as understood to one skilled in the art. The sensor system may be arranged on one or more of: a peripheral device, which may include a user interface device, the HMD; a computer (e.g. a P.C., system controller or like device); other device in communication with the system. One example of a lighthouse is the lighthouse from Valve, which operates by flooding a room with non-visible light, Lighthouse functions as a reference point for any positional tracking device (like a VR headset or a game controller) to determine where objects are located in real 3D space.

As used herein, the term "camera system" may refer to a system comprising a single instance or a plurality of cameras. The camera may comprise one or more of a: 2D camera; a 3D camera; an IR camera; a time of flight (ToF) camera. The camera may include a complementary metal-oxide-semiconductor (CMOS), a charge-coupled device (CCD) image sensor, or any other form of optical sensor in use to form images. The camera may include an IR filter, which can be used for object tracking. The camera may include RGB camera, which may be used for generation of real reality or augmented reality simulations. In an embodiment different frames of a single camera may be processed in an alternating manner, e.g. with an IR filter and for RGB, instead of separate cameras. Images of more than one camera may be stitched together to give a field of view equivalent to that of the user. A camera system may be arranged on any component of the system. In an embodiment the camera system can be arranged on the headset or HMD, wherein a capture area of the camera system may record a field of view of a user. Additional cameras may be arranged elsewhere to track other parts of a body of a user. Use of additional camera(s) to cover areas outside the immediate field of view of the user or outside of the field of view of other cameras in communication with the system may provide the benefit of allowing pre-rendering (or earlier initiation of other calculations) involved with the augmented or virtual reality rendition of those areas, or body parts contained therein, which may increase perceived performance (e.g. a more immediate response) to a user when in the virtual reality simulation. This can be an important aspect to ensure safe and pleasant use of VR. The camera system may provide information, which may include an image stream, to an application program, which may derive the position and orientation therefrom. The application program may implement known techniques for object tracking, such as feature extraction and identification. Examples include the speed-up robust features (SURF) algorithm and the like. An example of a camera presently available is the Pro C920 or C930 Full HD by Logitech and the like.

As used herein, the term "component of the system" includes various components that implement the system to generate the virtual reality environment. Said components may include peripheral devices and one or more devices that may implement the main system controller (e.g. a computer). As used herein, the term "peripheral device" may include components peripheral to one or more devices that may implement the main system controller. The peripheral device may include one or more of the user interface device, HMD, headset, or sensor system.

As used herein, the term "user interface device" may include various devices to interface a user with a computer, examples of which include: pointing devices including those based in motion of on a computer, such as a mouse, trackball, joystick, finger tracker; pointing devices based on touching a surface, such as a graphic tablet, stylus, touchpad or touch screen; game controllers such as a gamepad, steering wheel, paddle, yoke (control column for aircraft) a directional pad, joystick, throttle quadrant, pedals, light gun; 3D motion controller, jog dial, knob, smart phone; light/laser pen; keyboard. The user interface device may include one or more input elements. In embodiments the user interface device may include devices intended to be worn by the user. Worn may refer to the user interface device supported by the user by means other than grasping of the hands.

As used herein, the term "input element" or "user interface" may refer to an object that the user interacts with to provide user input. The input element or user interface may include a user manipulatable object, examples of which include: key, button, slider, rocker switch, steering wheel; stick; pedal; mouse; keys; buttons; control pad; scroll wheel; flight yoke; light pen or other stylus device; glove, watch or other wearable device; rotational elements such as a dial or knob, motion detector; touch sensitive device or any other input element. The user input element may be adapted to provide an input in other manners, including by the determination of a movement of a body part, including a touch pad.

As used herein, the term "totem" may, for example, include one or more physical or virtual objects which are manipulatable by the user to allow input or interaction with the AR, MR or VR system. The totem may be a user interface device or a controller, or an object in virtual space. Some totems may take the form of inanimate objects, for example a piece of metal or plastic, a wall, a surface of table. Alternatively, some totems may take the form of animate objects, for example a hand of the user. The totems may not actually have any physical input structures (e.g., keys, triggers, joystick, trackball, rocker switch). Instead, the totem may simply provide a physical surface, and the AR, MR or VR system may render a user interface so as to appear to a user to be on one or more surfaces of the totem. For example, the AR, MR or VR system may render an image of a computer keyboard and trackpad to appear to reside on one or more surfaces of a totem. For instance, the AR system may render a virtual computer keyboard and virtual trackpad to appear on a surface of a thin rectangular plate of aluminium which serves as a totem. The rectangular plate does not itself have any physical keys or trackpad or sensors.

As used herein, the term "lighthouse" may, for example, include a sensor for a tracking system to track real objects such as a totem, user input device, or any other object. A lighthouse can be incorporated into the sensor system, tracking system and camera system as described above.

As used herein, the numbering of elements is consistent from figure to figure, so that the same element is shown in different figures.

VR System Overview

FIG. 1 is a schematic illustration of a virtual reality (VR) generation system 2. The system 2 is capable of generating a VR environment and displaying said environment to a user 4. The system 2 comprises a display 6 providing a graphical environment 8 for said VR generation. The graphical environment 8 comprises a graphical image 10. The system further comprises a system controller 12 in communication with the display 6, which is capable of generating and/or controlling the graphical environment 8. The system controller 12 may provide instructions to the display 6, for example, by executing program code including an application program related to the VR and/or AR simulation. The system 2 may further comprise one or a plurality user interface devices 14, through which the user 4 interfaces with the system controller 12. The user interface device 14 and display 6 may be embodied as peripheral devices 20 as will be discussed.

The display 6 may be embodied in a head-mounted display (HMD) 18 that comprises a video display, which encompasses part or all of a user's field of view and presents computer generated images of the graphical environment 8. The display 6 may be driven by a display driver unit comprising one or more processors coupled thereto. Example embodiment HMDs comprise a: visor; helmet; goggles; glasses; other similar arrangement, all of which are known to the skilled person. Examples of VR HMDs presently available are the Oculus Rift from Oculus VR, VIVE from HTC Corporation and Gear VR by Samsung Electronics. A further example of a HMD presently available is the HoloLens from Microsoft. The HMD may further comprise any one or more of: headphones to provide auditory feedback, vibration means to provide vibration feedback; other sensors placed on or around the forward facing surface when in use. The HMD may comprise and audio output device as discussed following.

Computer System

Figure 2:
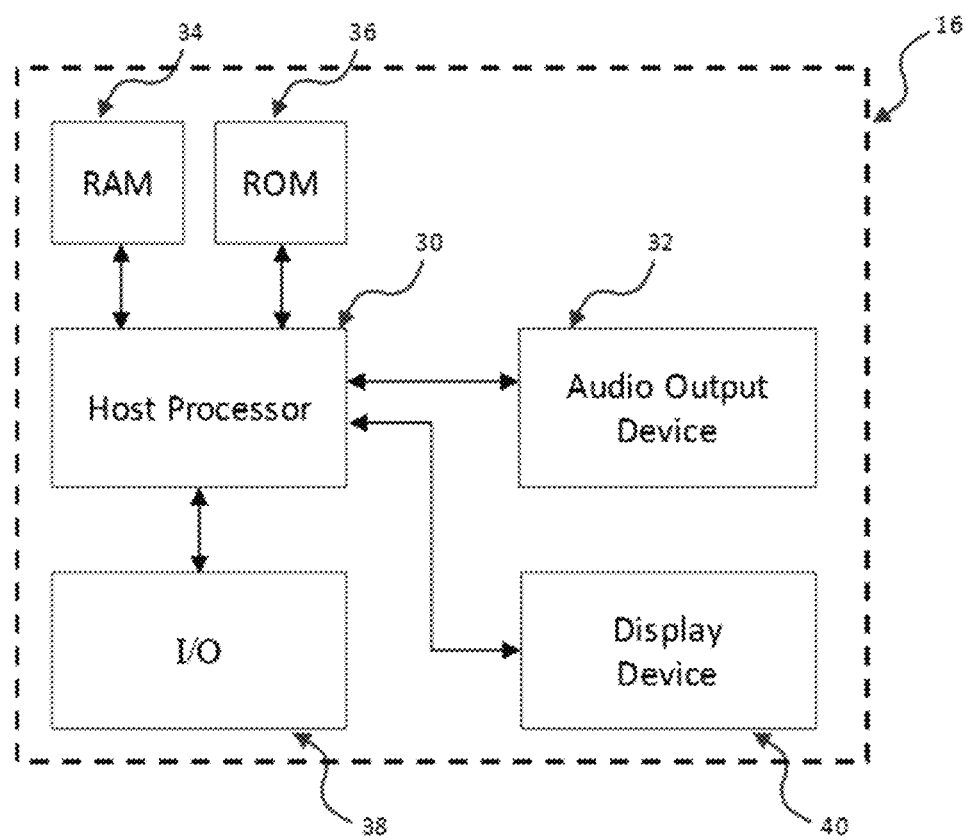
FIG. 2 is a block diagram illustrating an example implementation of the system controller of FIG. 1, according to certain embodiments.

In an embodiment the system controller 12 may be a computer. FIG. 2 is a block diagram illustrating an embodiment implementation of the computer 16. The computer 16 comprises a host processor 30 that may comprise a microprocessor, multiple processors and/or co-processor chips, and/or digital signal processor (DSP) capability. A system clock (not shown) may be coupled to or part of the host processor 30 to provide timing data. An audio output device 32 such as a speaker, which is preferably coupled to host processor 30 via associated audio circuitry such as, but not limited to amplifiers, filters, and other circuitry known to the skilled person to provide sound output to user when an audio event occurs during the implementation of an application program. The audio output device 32 and associated circuitry may be formed or located on the HMD 18. A display device 40 may display images of a simulation, game environment, operating system application or other images associated with the simulation. The display device 40 may be part of the HMD 18, forming/displaying the virtual reality environment, or the display device 40 may be a separate secondary display device to allow configuration of the system by the user without needing to wear the HMD, or configuration of the system by any other person, or to allow a secondary non-VR display of the virtual reality environment, e.g. for observational, run-time configurational, safety or any other purpose(s). The computer 16 may include other known components, such as random access memory (RAM) 34, read-only memory (ROM) 36, and input/output (I/O) system 38.

The computer 16 may implement an application program, which may be a simulation program for generation of the virtual reality environment. The user may interact with the program via said peripherals 20. The application program may comprise: a video game; a medical procedure simulation program such as a surgical or physiotherapy procedure; an interactive digital mock-up of a designed feature, such as a computer aided design; an educational simulation program, such as an E-leaning simulation; or other like simulation. The application program may comprise or access an external database, such as over a network, e.g. an online game. The application program may be implemented as one or more modules or other functional units. Herein, for simplicity, operating systems such as Windows™, Android; IOS; MS-DOS, MacOS, Linux, etc. are also referred to as application programs as may be device drivers for hardware associated with the computer. Typically, the application program is capable of providing instructions for the generation of said graphical environment 8 on the display 6. It may thus provide images to be displayed on a display 6 of the HMD 18 and may output other feedback, such as auditory or vibration signals. The application program may be operable to check for input signals from the peripherals 20 and provide the corresponding output. The application program may interface with the HMD 18 and/or other peripherals 20 via a device driver, whereby the device driver communicates with the device through electronic circuitry of the I/O system 38.

The computer 16 as described with reference to FIG. 2 may be embodied in a personal computer, workstation, laptop or server, such as a PC compatible computer or Macintosh personal computer, or a Sun or Silicon Graphics workstation. The computer 16 may be operable under the Windows™, MacOS, Unix, or MS-DOS operating system or similar. In other embodiments, the computer 16 can be a home video game console system, which is typically connected to a television set or other display. Examples include systems that are provided by Microsoft, Valve, HTC, Oculus, Nintendo, Sega, Sony, or any other company in the games console field. In other embodiments, the computer 16 may be a set-top box, which can be used, for example, to provide interactive television functions to users, or a network or internet-computer, which allows users to interact with a local or global network using standard connections and protocols such as used for the Internet and World Wide Web. In other embodiments the computer 16 may comprise: a media player (such as an MP3 player); a subnotebook/netbook; a tablet computer; a smartphone; a cellular telephone; a personal digital assistant (PDA); other similar electronic device.

User Interface Device.

Figure 3:
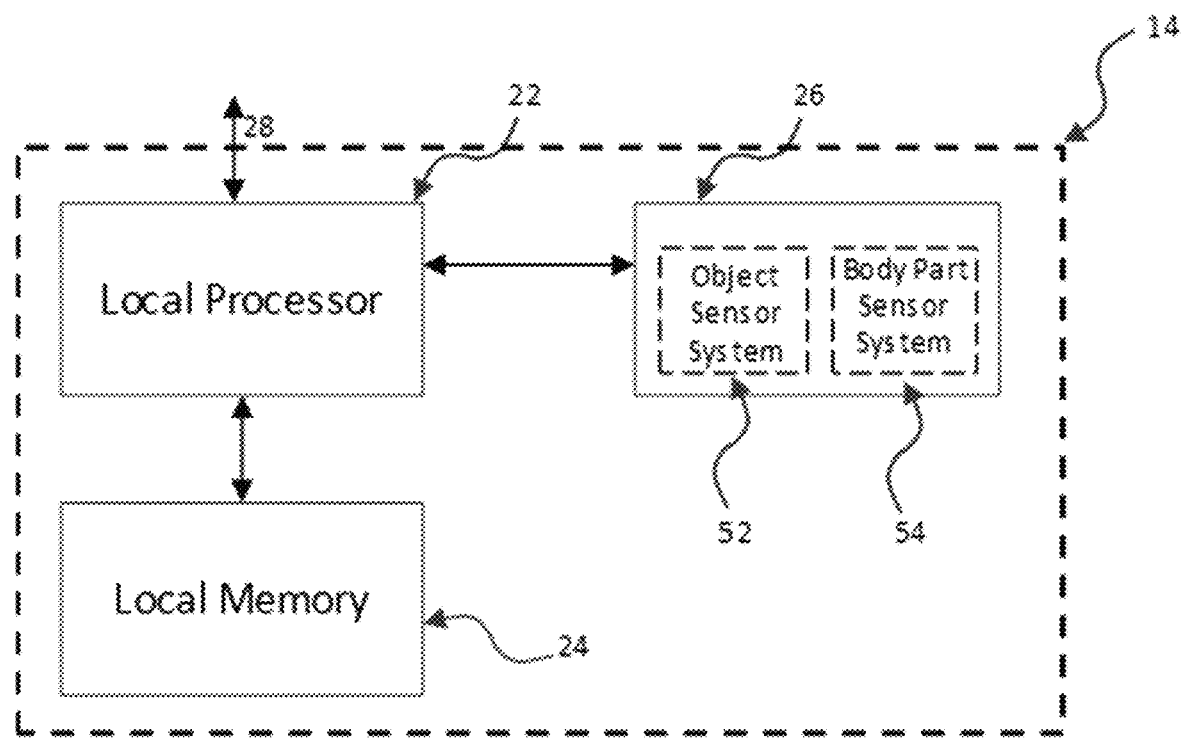
FIG. 3 is a block diagram illustrating an example implementation of the user interface device of FIG. 1, according to certain embodiments.

FIG. 3 is a block diagram illustrating an embodiment implementation of the user interface device 14. The user interface device may comprise a local processor 22, such as an ASIC, a microcontroller or a microprocessor. It may can include one microprocessor chip, multiple processors and/or co-processor chips, and/or digital signal processor (DSP) capability. By local it is meant that the processor 22 is a separate from the host processor 30 of the computer 16, and local to the user interface device 14. The local processor 22 may be provided with software instructions to wait for commands or requests from the computer 16, decode the command or request, and handle/control input and output signals according to the command or request. In addition, the local processor 22 may operate independently of the computer 16 by reading sensor signals and calculating appropriate forces from those sensor signals, time signals, and stored or relayed instructions selected in accordance with a host command. Suitable microprocessors for use as local processor 22 include various forms of ARM processors, such as the STM32, and like processors by Motorola, Microchip and Intel Corp. Local memory 24, such as RAM and/or ROM, is preferably coupled to local processor 22. A local clock (not shown) may be coupled to or part of the local processor 22 to provide timing data. The user interface device 14 may comprise an I/O system 26 providing a sensor signal to the local controller 22. The I/O system 26 will vary depending on the configuration of the user interface device 14 as will be discussed following, for example it may comprise optical sensor systems, linear optical encoders, potentiometers, optical sensors, velocity sensors, acceleration sensors, strain gauge, resistive sensors, capacitive (e.g. touch) sensors, or any other type of sensors. An optional sensor interface (not shown) can be used to convert sensor signals to signals that can be interpreted by the local processor 22 and/or computer 16, and is known to the skilled person. The user interface device 14 is coupled to the computer 16 by a communication interface 28, which may comprise bi-directional bus. The bi-directional bus sends signals in either direction between the computer 16 and the user interface device 14. The bus can be a serial interface bus, such as an RS232 serial interface, RS-422, RS-485, 12C, Universal Serial Bus (USB), MIDI, Firewire or other protocols known to the skilled person, or a parallel bus or wireless link, such as BTIe or proprietary 2.4 HHz protocol for instance. The communication interface 28 may provide power to the subcomponents of the user interface device 14 and/or the user interface device 14 may comprise a separate power supply.

The user interface device 14 as described with reference to FIG. 3 may be embodied in pointing devices including those based in motion of on a computer, such as a mouse, trackball, joystick, finger tracker. Alternatively it may be embodied in pointing devices based on touching a surface, such as a graphic tablet, stylus, touchpad or touch screen. The user interface device may be embodied in game controllers such as a gamepad, steering wheel, paddle, yoke (control column for aircraft) a directional pad, joystick, throttle quadrant, pedals, light gun. It may also be embodied in other human interface devices, such as a 3D motion controller, jog dial, smart phone; light/laser pen; keyboard. The user interface device maybe embodied in devices similar to the above embodiments.

The user interface devices 14 may not be limited to providing an input to said system controller 12, in embodiments they may also provide output to the user for example in the form of visual or and/or haptic feedback. An example of such devices that incorporate haptic feedback are disclosed in US 2011032187, which is incorporated herein by reference.

The system 2 may further comprise an object tracking system 42 for tracking of objects in the field of view of a user and for tracking of body parts of a user, such as one or more of a user's hands, arms, legs, feet, head, torso. The object tracking system 42 may be used to provide a real time image stream to the display 8 of the HMD 18, for example an image stream depicting an avatar of a user and/or of other objects in the field of view of a user in the virtual reality environment.

In an embodiment said object tracking system 42 may comprise a camera system 44, such as one of more of a: 2D camera; a 3D camera; an IR camera; a time of flight (ToF) camera. There may be a single instance of such a camera, or there may be a plurality of said cameras. The camera system 44 may comprise complementary metal-oxide-semiconductor (CMOS) or charged-coupled device (CCD) image sensor, or any other form of sensor in use to form images. An example of a camera presently available is the Pro C920 or C930 Full HD by Logitech. The camera system 44 may comprise a camera with an IR filter, which can be used for object tracking. The camera system 44 may comprise an RGB camera, which can be used for generation of the later described real reality or augmented reality simulations. In an embodiment different frames of a single camera may be processed in an alternating manner, e.g. with an IR filter and for RGB, instead of separate cameras. Images of more than one camera may be stitched together to give a field of view equivalent to that of the user. A camera system 44 may be mounted to or integrated as part of the HMD 18 as illustrated in FIG. 1, or otherwise adapted to be worn on a head of a user, whereby the capture area of the camera is arranged to record an equivalent to a field of view of a user when wearing the headset. Additional cameras may be arranged elsewhere to track other parts of a body of a user. Use of additional camera(s) to cover areas outside the immediate field of view of the user (or outside of field of view of other cameras within the system) may provide the benefit of allowing pre-rendering (or earlier initiation of other calculations) involved with the augmented or virtual reality rendition of those areas, or body parts contained therein, which may increase perceived performance (e.g. a more immediate response) to a user when in the virtual reality simulation. This can be an important aspect to ensure safe and pleasant use of VR to humans. The computer 16 may implement an application program for determining from the image stream provided by the camera system 44 the arrangement of objects in the capture area. Such objects may comprise the aforesaid body parts, computer 16 and user input device 14. For object tracking the application program may implement known techniques, such as feature extraction and identification. An example us the speed-up robust features (SURF) algorithm. In an embodiment said object tracking system 42 may comprise an ultrasonic, magnetic, or other field tracker, which may be mounted on the HMD (or other object to be tracked), which is able to sense a magnetic field generated from a local base station, video game console or other apparatus. The magnetic field tracker provides information about the sensed magnetic field to an application program, which derives the position and orientation of the magnetic field tracker, and thus the HMD, relative to a base station or the magnetic tracker from such information.

Figure 4:
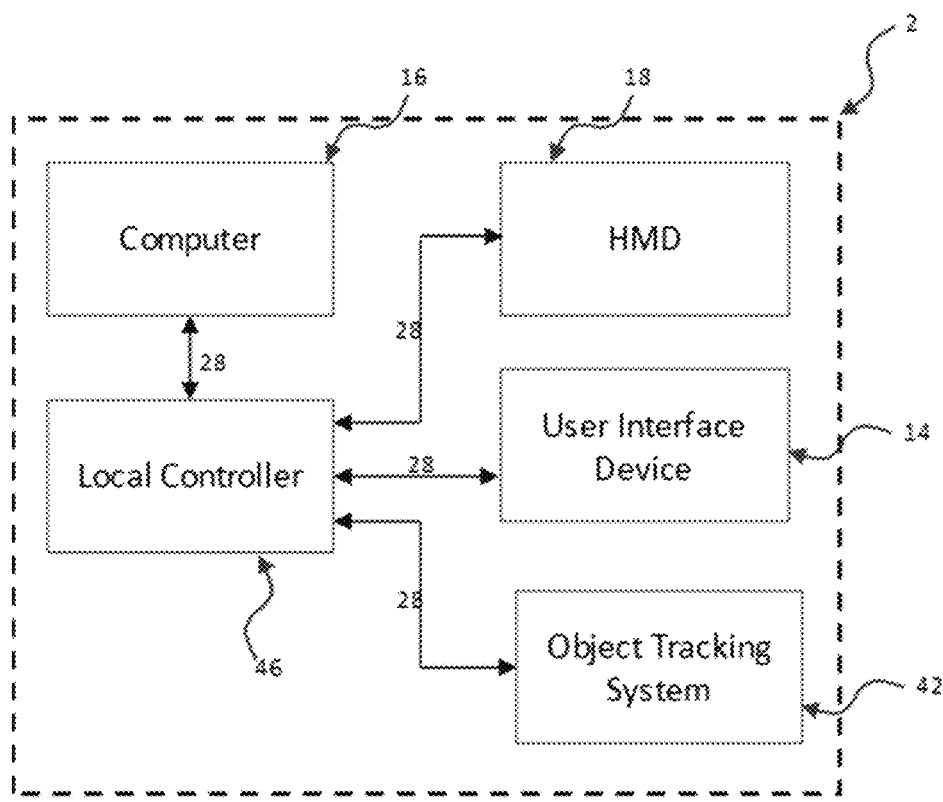
FIG. 4 is a block diagram illustrating an example implementation of the system device of FIG. 1, according to certain embodiments.

FIG. 4 is a block diagram showing an implementation of the system 2 of FIGS. 2 and 3 further comprising a local controller 46, which is connected to one or more of the: object tracking system 42; one or more user interface devices 14; HMD 18. Said local controller 46 may comprise a local processor, local memory and a communication interface all of which may be configured as described in respect of the user interface device 14. The local controller 46 may implement the described application programs associated with the object tracking system 42 and/or the user interface device 14. In an alternative embodiment (not shown) the local controller 46 may be implemented in one of the peripheral devices 20, such as the HMD 18 or user interface device 14, wherein the local processor 22 of the peripheral 20 may be utilized as that of the local controller 46.

User Interface Device Manipulation Detection.

In a first embodiment of the system 2, aspects of which are illustrated in the FIGS. 3, 5A-5G and 6A-6B, the user interface device 14 may comprise a user manipulatable object 50A-50G. Referring to FIG. 3, the I/O system 26 may comprise an object manipulation sensor subsystem 52 to detect a manipulation of the object 50 and to provide a signal. The signal may be processed by any of the herein described processing resources, for control of the graphical environment 8. The signal may be processed by the application program, in particular a module thereof, for providing traditional control for driving of the VR environment, for example, for proving instructions for playing the video game.

The I/O 26 system may further comprise a body part sensor subsystem 54, which may be arranged to determine an arrangement of a body part of a user in contact or in proximity with the user interface device. The body part sensor subsystem 54 to provide a signal to be processed to determine the arrangement of the body part for display of the body part in the graphical environment. The signal may be processed by any of the herein described processing resources, for control of the graphical environment 8. The signal from the body part sensor subsystem 54 may be processed by processing resources running the application program, in particular a module thereof, for providing the generation of the body part in the correct arrangement as will be discussed. The interface device 14 may implement a separate processors for processing of the signal from the body part sensor subsystem 54 and the signal from the object manipulation sensor subsystem 52.

The body part sensor subsystem 54 may comprise one or more sensors, which are arranged to determine a particular arrangement of one or more body parts of a user. The body part may comprise a hand or individual portions of a hand such as one or more fingers of the thumb. The body part may comprise a foot or individual portions of a foot such as one or more toes. The arrangement of the body part may be determined in respect of: the geometry of one or more portions of the body part, such as a hand span, finger size or foot size; orientation such as fingers extended or gripped or foot extended or retracted; position, such as the location of the hand or foot on the peripheral. The body part sensor subsystem 54 may be at least partially arranged on a portion of the user interface device 14 that is configured to be held or abutted by the body part of a user in normal use of the user interface device 14, for example on the user manipulatable object and/or a housing of the user interface device.

The sensors of the body part sensor subsystem(s) 54 may comprise one or more: capacitive sensors; optical sensors; thermal sensors; pressure sensors; proximity sensors; resistive sensors; camera; ultrasonic sensors; ToF sensors; radar sensors. The sensors may be configured with a response time of less than 50 ms or 10 ms. In an embodiment comprising a capacitive sensor, said sensor may be continuously disposed around a surface on the user interface device 14, such as a user holdable portion of the object 50. In an example, the sensor(s) is/are placed in or on a portion of the user interface device most likely to be a or the first touched by the user when moving from a first non-interacting state, to a second, interacting state with the system 2 (e.g. moving from a state of not gaming, to a state of gaming, a more particular example may be moving a hand onto, or sufficiently near to, the surface of the user interface device 14). Examples of suitable configuration of user interface devices 14 are discussed with reference to FIGS. 5A-5G discussed in the following, in which specific example embodiments will use the same general reference number, but appended with a suitable discriminating letter post fix (A, B, etc.).

Figure 5A:
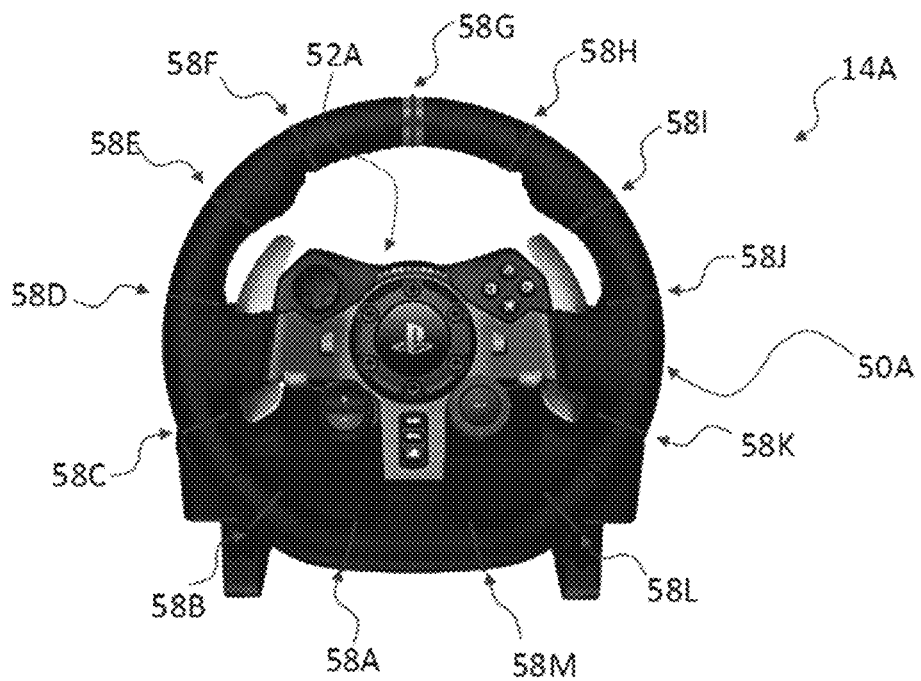
FIGS. 5A-5G show schematic perspective views of example embodiments of the user interface devices of the system of FIG. 1, according to certain embodiments.

FIG. 5A shows a schematic perspective view of an example embodiment user interface device 14A that comprises an electronic steering wheel. The manipulatable object 50A comprises the wheel and the object manipulation sensor subsystem 52A is operable to detect rotation of the wheel and to provide a signal to a processor, e.g. host processor 30, for control of the graphical environment 8. The body part sensor system 54A is arranged on the wheel 50A to detect one or both hands grabbing the wheel. In the embodiment the body part sensor system 54A comprises a plurality of capacitive sensors 58A-58M. The capacitive sensors 58A-58M are arranged in circumferentially disposed sectors, which have approximately the same circumferential distance (i.e. are equally spaced radially around the wheel 50A). Whilst the example shown uses thirteen sensors, it will be appreciated that other numbers and arrangements of sensors may be utilized instead, together with other sensor types. In an embodiment more sensors may be arranged proximal the 10-2 o'clock, and/or 9-3 o'clock positions for increased accuracy of a most typical placement of the user hand on the wheel, and may also provide optional specific finger or thumb tracking. In an example embodiment the capacitive sensor arrangement may be continuously disposed around the part or all of a periphery of the wheel.

Figure 5B:
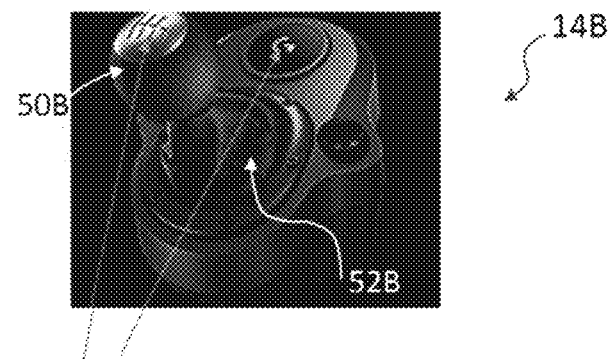

FIG. 5B shows a schematic perspective view of an example embodiment user interface device 14B that comprises an electronic gear stick arrangement. The manipulatable object 50B comprises the stick and the object manipulation sensor subsystem 52B is operable to detect movement of the stick and to provide a signal to a processor, e.g. host processor 30, for control of the graphical environment 8. The body part sensor system 54B may be arranged on the stick to detect a hands grabbing the stick. The body part sensor system 54B may also be arranged on other input devices such as buttons. In the embodiment the body part sensor system 54B comprises a plurality of capacitive sensors 58A, 58B. Whilst the example shown uses two sensors, it will be appreciated that other numbers and arrangements of sensors may be utilized instead, together with other sensor types. In an embodiment more sensors may be arranged on the stick for increased accuracy of a most typical placement of the user hand on the stick, and may also provide optional specific finger or thumb tracking. In an example embodiment the capacitive sensor arrangement may be continuously disposed around the part or all of a periphery of the stick.

Figure 5C:
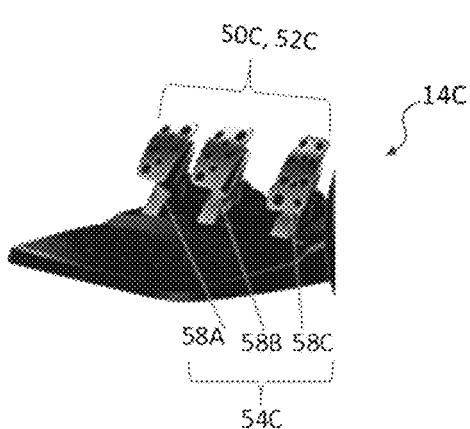

FIG. 5C shows a schematic perspective view of an example embodiment user interface device 14C that comprises an electronic pedal arrangement. The manipulatable object 50C comprises the pedals and the object manipulation sensor subsystem 52C is operable to detect movement of the pedals and to provide a signal to a processor, e.g. host processor 30, for control of the graphical environment 8. The body part sensor system 54C may be arranged on the pedals to detect a foot making contact therewith. In the embodiment the body part sensor system 54C comprises a plurality of pressure sensors 58A-58C. Whilst the example shown uses three sensors, it will be appreciated that other numbers and arrangements of sensors may be utilized instead, together with other sensor types.

Figure 5D:
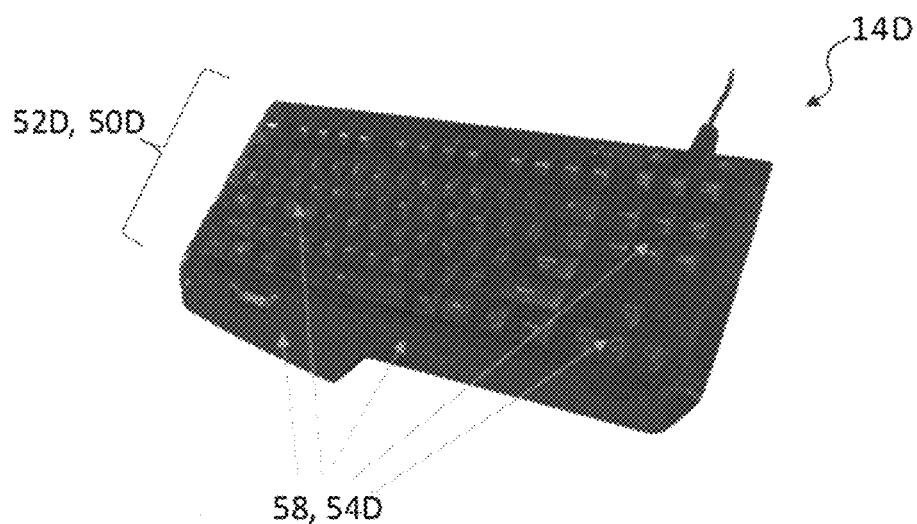

FIG. 5D shows a schematic perspective view of an example embodiment user interface device 14D that comprises a computer keyboard. The manipulatable object 50D comprises the keys and the object manipulation sensor subsystem 52D is operable to detect actuation of the keys and to provide a signal to a processor, e.g. host processor 30, for control of the graphical environment 8. The body part sensor system 54D may be arranged on one or more of the key and optionally the housing such as the wrist support as shown. In the embodiment the body part sensor system 54B comprises a plurality of capacitive sensors 58. Whilst the example shown uses five sensors, it will be appreciated that other numbers and arrangements of sensors may be utilized instead, together with other sensor types.

Figure 5E:
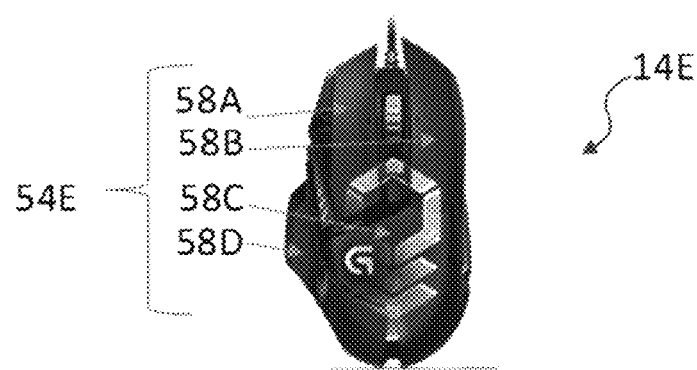

FIG. 5E shows a schematic perspective view of an example embodiment user interface device 14E that comprises a computer mouse. The manipulatable object 50E comprises the body of the mouse and the object manipulation sensor subsystem 52B is operable to detect movement of the mouse relative to an abutting surface and to provide a signal to a processor, e.g. host processor 30, for control of the graphical environment 8. The body part sensor system 54E may be arranged on the body of the mouse to detect a hands grabbing the mouse. The body part sensor system 54B may also be arranged on other portions of the mouse, such as buttons or a scroll wheel. In the embodiment the body part sensor system 54B comprises a plurality of capacitive sensors 58A-58D. Whilst the example shown uses four sensors, it will be appreciated that other numbers and arrangements of sensors may be utilized instead, together with other sensor types. In an example embodiment the capacitive sensor arrangement may be continuously disposed around the part or all of the body of the mouse.

Figure 5F:
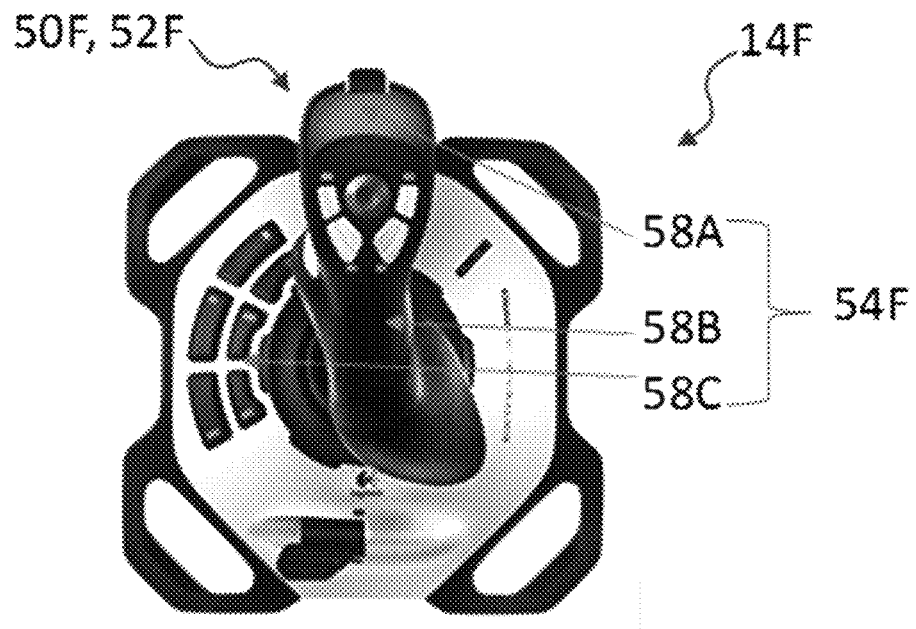

FIG. 5F shows a schematic perspective view of an example embodiment user interface device 14F that comprises a computer joystick. The manipulatable object 50F comprises the stick and the object manipulation sensor subsystem 52F is operable to detect movement of the stick and to provide a signal to a processor, e.g. host processor 30, for control of the graphical environment 8. The body part sensor system 54F may be arranged on the stick to detect a hands grabbing the stick. The body part sensor system 54F may also be arranged on other input devices such as buttons. In the embodiment the body part sensor system 54F comprises a plurality of capacitive sensors 58A-58C. Whilst the example shown uses three sensors, it will be appreciated that other numbers and arrangements of sensors may be utilized instead, together with other sensor types. In an embodiment more sensors may be arranged on the stick for increased accuracy of a most typical placement of the user hand on the stick, and may also provide optional specific finger or thumb tracking. In an example embodiment the capacitive sensor arrangement may be continuously disposed around the part or all of a periphery of the stick.

Figure 5G:
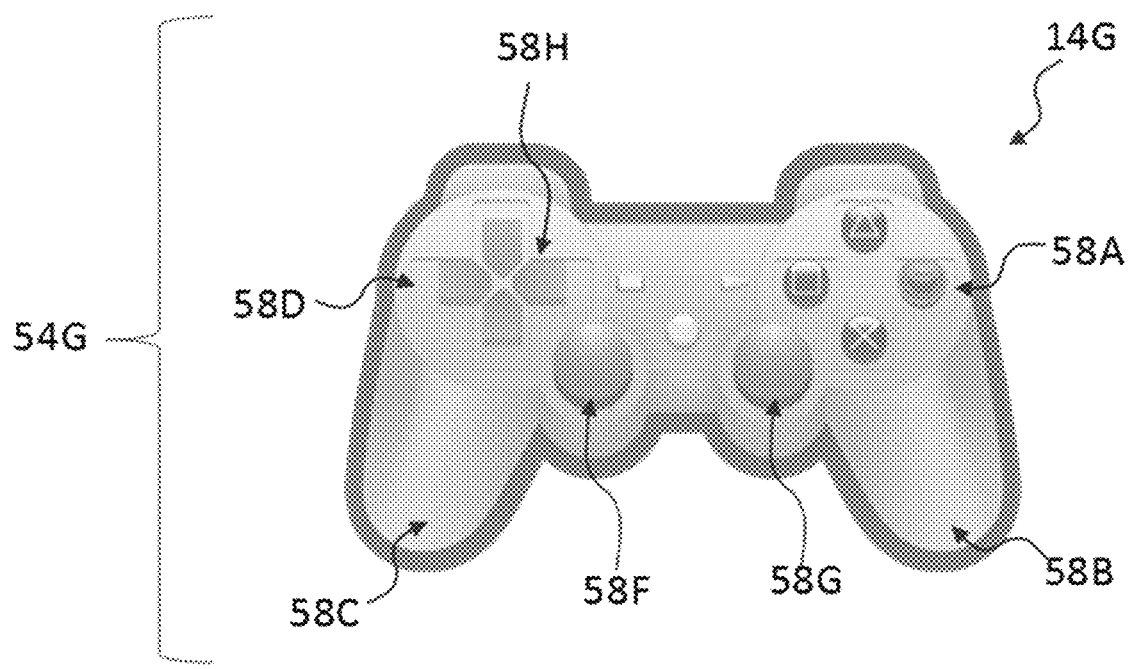

FIG. 5G shows a schematic perspective view of an example embodiment user interface device 14G that comprises a game controller. The manipulatable object 50G can comprise at least one of the sticks and the object manipulation sensor subsystem 52G is operable to detect movement of the stick and to provide a signal to a processor, e.g. host processor 30, for control of the graphical environment 8. The body part sensor system 54G may be arranged one or both sticks to detect a hands grabbing the stick. The body part sensor system 54G may be arranged on other input devices such as buttons. The body part sensor system 54G may be arranged on graspable portions of a housing of said controller. In the embodiment the body part sensor system 54F comprises a plurality of capacitive sensors 58A-58H. Whilst the example shown uses eight sensors, it will be appreciated that other numbers and arrangements of sensors may be utilized instead, together with other sensor types. In an embodiment more sensors may be arranged on the graspable portions for increased accuracy of a most typical placement of the user hand on the controller, and may also provide optional specific finger or thumb tracking. In an example embodiment the capacitive sensor arrangement may be continuously disposed around the part or all of a periphery of the graspable portions.

The above examples are non-limiting and further embodiment implementations are possible, such as a touch panel pad or light pen etc.

In the above example embodiments the signal provided by the body part sensor subsystem 54 may be processed to determine the arrangement of the body part of the user based on mapping the sensor signal to one of a database of stored arrangements, such as a lookup table. Individual sensors may also apply a confidence value to determine their weight in respect of the other sensors when performing said mapping. The arrangement of the body part refers to the estimation of the hand pose (position of hands over the keyboard, accurately matching the fingers position over the keycaps in real-time). This can be done using the combination of different types of sensors such as: capacitive sensors+camera. A keyboard can contain capacitive sensors on each keycap or at least on a meaningful number of them, e.g. home row (querty . . . ). Other devices can include capacitive sensors on buttons, switches, scroll wheels and other input elements, as well as sensors placed on the body of the device, such as for detecting the palm of a hand on the bottom of a mouse. Such sensors provide information about touch and hovering: close range distance estimation between finger and keycap, e.g. in the order of a couple of centimeters (up to 5-10 cm) above the keycap. In addition, a head-mounted or desk-mounted camera analyses the image, locates the keyboard and extracts the image of the hands.

Touch-Hovering information+2D image of the hands can be merged to synthesize a 3D model of the hands with the right position of each finger over the keyboard. The arrangement of capacitive sensors provides a set of values that allow distinguishing between different hand poses over the keyboard. For a given hand pose, the corresponding set of values (signature) is stored in a database. This is done during a preparation phase that involves data acquisition and training of machine learning algorithms that will be able to map in a very fast and accurate way a given sensor signature to the corresponding hand pose. One implementation uses a lookup table that maps a signature to a unique hand pose. Another implementation uses convolutional neural networks. This preparation can be done with a fixed number of users and then generalized, so that the final user is not involved in the data acquisition and training, or only a few interactions are required to fine-tune the system. The hand pose then can be further refined using the 2D image of the hands for accurate positioning over the virtual keyboard. Touch sensors provide a rough estimation of the pose, but not precise location over the keycaps, e.g. sensor reports touching G key, camera shows hand at right position: covering lower left corner of the keycap. If one of the different sensor types is missing the hand pose loses accuracy, but still provides good enough estimation for typing and activating different augmentation layers.

The determined arrangement of the body part can be processed to provide instructions for the display of a representative graphical object in the graphical environment 8 of the virtual reality simulation. In particular, the body part can be displayed in a position in the graphical environment 8 of the display 6 that corresponds to the position that would be experienced by the user in their actual field of view in the physical world, e.g. bottom left, top right etc. The body part can be displayed in the graphical environment 8 of the display 6 with size and/or orientation that corresponds to that experienced by the user in their actual field of view in the physical world, e.g. hands gripping and thumbs pointing upwards.

Figure 6A:
FIG. 6A is an image of an actual arrangement of the hands of a user on an example user interface device in the physical world, according to certain embodiments.
Figure 6B:
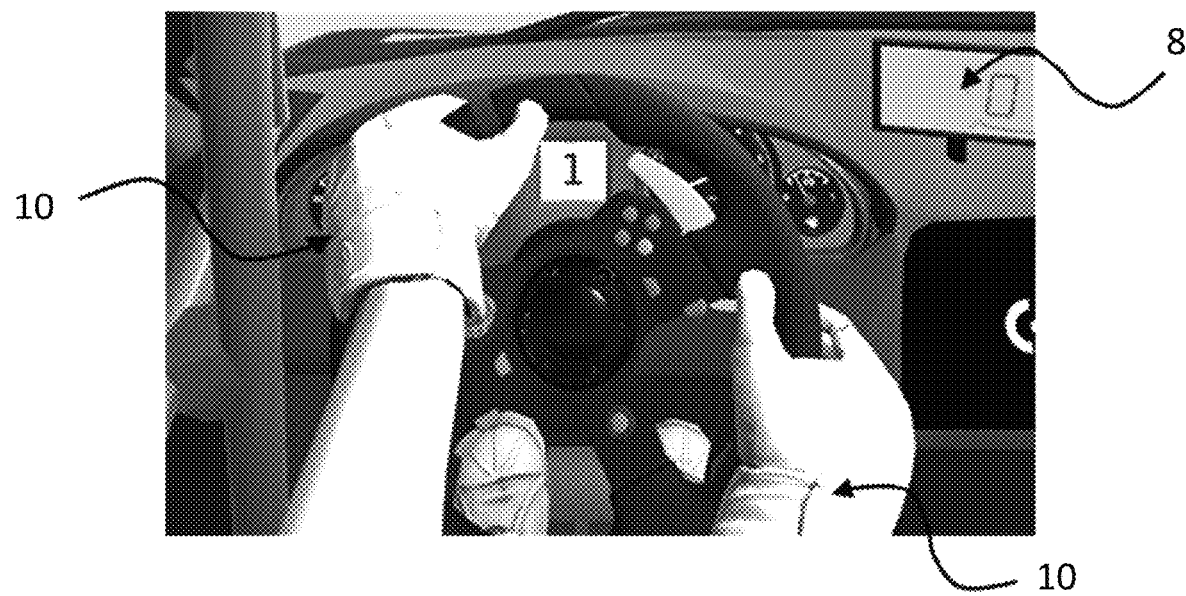
FIG. 6B is a diagrammatic drawing showing a first example of hand positions of a user in a graphical environment of a virtual reality simulation of the system of FIG. 1, according to certain embodiments.

FIG. 6A is an illustrative example showing an image of the actual arrangement of hands of a user 4 arranged on an electronic steering wheel in the physical world. The body part sensor subsystem 54 is used to provide the arrangement of both hands of the user (including the fingers in one embodiment). The arrangement is processed to provide instructions for the corresponding graphical environment 8 as shown in FIG. 6B, which is a diagrammatic drawing showing hands of a user as graphical objects 10 of the graphical environment 8. As illustrated by example of FIGS. 6A and 6B the system 2 provides a more immersive virtual reality experience for the user since their body parts are arranged in the virtual reality simulation with the correct size, position and orientation as in the actual physical world. Interfacing with a device, such as grabbing a wheel or touching a joystick, is hard to show given occlusions. This is handled, as discussed below, by a fusion of real and stored images, make sure this is included that we deal with the occlusions with the sensor subsystem.

In an embodiment a graphical image of the actual user interface device 14 may be displayed in the graphical environment 8, as shown in the illustrative examples of FIGS. 6A and 6B. In an embodiment the arrangement of the interface device 14 in the graphical environment may correspond to that in the actual physical world. In a like manner the arrangement may be defined in terms of one or more of: position; size; orientation. The graphical image of the user interface device 14 may be supplied by one of more of: the camera system 44; information stored on the user interface device 14; information stored on the application program.

In an embodiment (not shown) a graphical image of the actual body part of a user may be displayed in the graphical environment 8. The graphical image of the user interface device 14 may be supplied by the camera system 44.

Object Tracking System.

In an embodiment wherein the virtual reality generation system 2 comprises an object tracking system 42, information from said tracking system 42 may be used to enhance the accuracy of the determined arrangement of the body part on the user interface device 14. For example, in the event the arrangement of the body part cannot be determined, or is determined with a low confidence value, from information from the body part sensor subsystem 54. Moreover said information may be used to determine the arrangement of a body part when not in contact with the user interface device 14. In an example a user may remove their hand from the steering wheel, whereby the object tracking system 42 system enables the hand of the user to be displayed in a position corresponding to that of the actual physical world.

In further embodiments the system 2 may comprise more than one user interface device 14, such as one or more of the: electronic steering wheel; electronic gear stick; electronic pedal arrangement. The system 2 may provide in the graphical environment 8 of the virtual reality simulation representations of different body parts concurrently or sequentially on different user interface devices, with optional representations of body parts moving therebetween.

Figure 7:
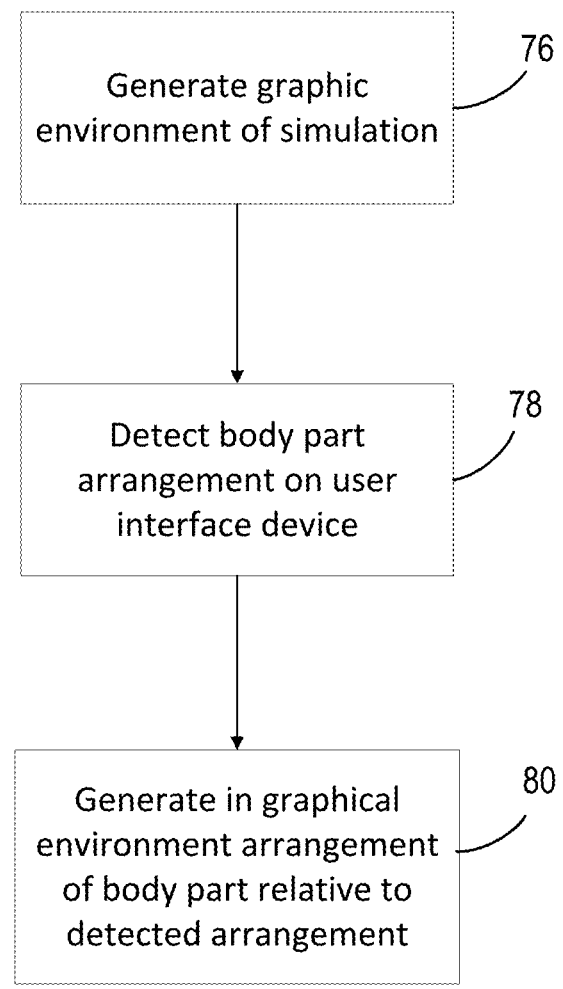
FIG. 7 is a flow diagram showing a method of generating a graphical environment of a virtual reality simulation according to an embodiment of the system of FIG. 1, according to certain embodiments.

FIG. 7 is a flow diagram showing a method of generating a graphical environment of a virtual reality simulation that may be executed by the application program of the computer 16. The method comprises at step 76 generating the graphical environment of the simulation. At step 78 detecting an arrangement of a body part of a user in contact with a user interface device using the signal from the body part sensor system 54 arranged on the interface device. At step 80 generating in the graphical environment an arrangement of the body part in the graphical environment in relation to the detected arrangement of the body part.

Triggering State Transitions.

Figure 8:
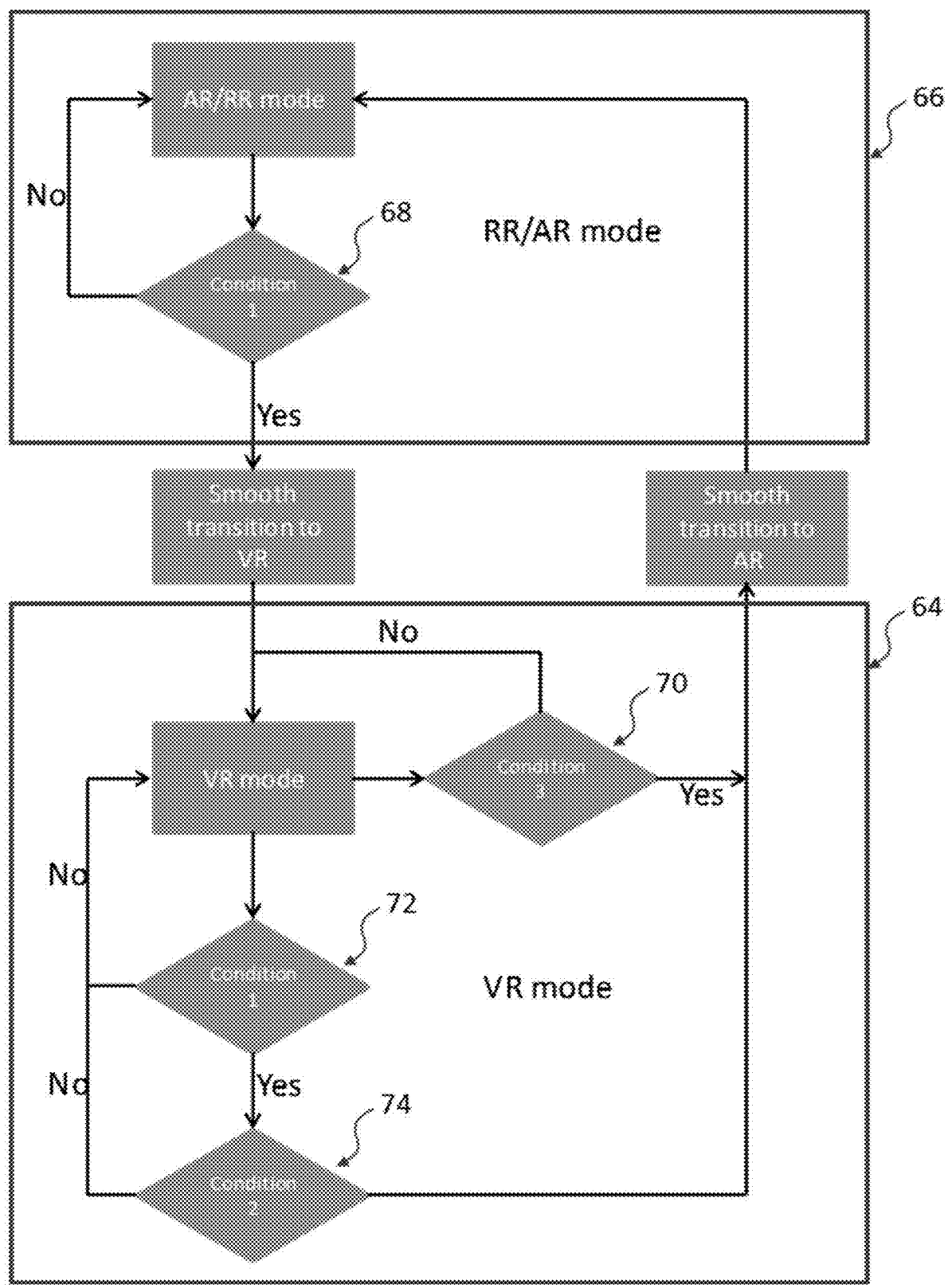
FIG. 8 is a flow diagram showing a method of generating a graphical environment of a virtual reality simulation of the system of FIG. 1, according to certain embodiments.

In a second embodiment of the system 2, aspects of which are illustrated in FIG. 8, the system 2 may be configured to transition the graphical environment 8 of the display 6 between a plurality of states. The computer 16, and in particular the application program running thereon, may be operable to generate instructions for display of the different states. A state may be associated with a particular application program, such as a video game or associated with a particular module of an application program.

One state may comprise the aforementioned described VR simulation, e.g. the video game. Herein for simplicity the VR simulation is referred to as a first state. In particular a user 4 interacts with the video game via an interface device 14 that is an electronic steering wheel such as the wheel described for the first embodiment of the system 2. Auditory signals may be provided to the user as part of the VR environment in response to a transition, such as when layers are changed or when a user presses a key.

A further state may comprise and augmented reality (AR) simulation, which may be defined herein as a simulation of the real-world environment, with objects comprising said environment augmented or supplemented. Said objects may be presented to the user with a corresponding size, position and orientation as they would be experienced by the user in the actual physical world. The AR simulation may be generated at least partially by using images from the camera system 44. In particular the camera system 44 may be arranged to capture a field of view representative of the actual field of view of the user in the physical world as described previously. In an embodiment AR simulation object outlines can be displayed, such as the computer, its associated components including the user interface device 14, body parts of a user, and other objects in the field of view of the user. Objects may in addition be shaded or have the color removed differently or have underlining or blurring applied. The object outlines may be displayed in a particular light color, such as blue, with a darker color as the background, such as black, or the converse. The colors that are provided can be contextually relevant. For example, if there is a black keyboard and dark skin, colors can be designed to enhance the experience based upon one another. Alternatively more than two color tones may be used. AR simulation may comprise less detail than the actual physical world. One advantage is that the user observes only objects important to the system, which may aid in a user positioning themselves prior to entering the VR environment. In a further embodiment graphical images from the actual physical world may be augmented by the additional or removal of objects to said images. For generating said AR environments the application program may implement known routines such as edge image detection based on Sobel-Feldman operator. Such algorithms are known to the skilled person.

A further state may comprise direct graphical images from the actual physical world referred to herein as real reality (RR). The RR may be generated by using images from the camera system 44.

For simplicity both RR and AR simulation are referred to hereon as a second state although they may be implemented as separate states with transitioned therebetween being provided as for the first and second states. The RR and AR simulation enables the user to remain connected to the actual physical world by providing a representative simulation thereof. The second state may thus be periodically entered from the first state, i.e. the VR simulation, to resolve VR motion or other sickness with VR. The second state may also be utilized for the user positioning themselves in preparation to enter into the first state VR simulation.

In an embodiment the system 2 may be configured to change the instructions to the display 6 to transition between said states. In an embodiment said transition may be triggered in response to a user manual actuation of an input device of the system 2, such as a stick, control pad, button, switch, yoke, keys or like manually actuated device. The input device, which may be part of the described I/O systems, can be arranged on the computer 16, HMD 18, user interface device 14 and in particular may comprise the object manipulation sensor subsystem 52 thereof.

In an embodiment said transition between said states may be triggered in response to the determination of a characteristic user interaction. In particular an interaction that does not comprise the manual actuation of an input device according to the directly preceding embodiment. Said interaction may be determined by the object tracking system 42 and/or the body part sensor subsystem 54. In this way the user does not need to perform a specific actuation of an input device, hence their cognitive work load may be decreased. The characteristic user interaction may comprise one or more of the following: a body part moved from distal to proximal to an interface device 14: a body part moved to from proximal to distal an interface device 14; a body part moved into or out of contact with an interface device 14. It will be appreciated that contact and movement may be determined by the aforedescribed object tracking system 42 and/or the object body part sensor subsystem 54 of the interface device 14. Specific examples of transitioning between states in response to particular triggering interactions will now be discussed.

In a first example, the computer 16 may change the instructions to the display 6 from providing the second AR/RR state 66 to the first VR state 64. A graphical image of an AR simulation showing both hands of a user approaching an electronic steering wheel can be provided. A graphical image of an AR simulation showing one hand of a user arranged on the electronic steering wheel with fingers wrapped around and another hand approaching said wheel can also be provided. A graphical image of an AR simulation showing both hands of a user arranged on the electronic steering wheel can also be provided, which in this embodiment is the trigger for transition to the first VR state. The camera system 44 in this embodiment provides graphical images for the AR simulation. The body part sensor subsystem 54 of the interface device 14, as described for the first embodiment of the system, provides a signal for determination of both hands arranged on the electronic steering wheel.

In variants of this example other interface devices 14 may be implemented, such as those described for the first embodiment of the system, e.g. such as an electronic pedal arrangement, gear stick or game controller or similar. Accordingly triggering may be based on other body parts, such as one or more feet. Triggering may also be based on the contact with an interface device of one or more body part, such as one or both hands or one or both feet arranged on the interface device.

Triggering may be based on proximity rather than contact, e.g. a body part moved from a distal position to within a threshold proximal position with respect to the interface device. In such an example the object tracking system 42 can be used to determine proximity.

Triggering may be based on a characteristic body part movement, such as a hand movement above a threshold speed, or a head up and/or head down movement. Triggering may be based on the user looking at a particular object, such as the interface device for a predetermined or user configurable period of time. In such an example the object tracking system 42 can be used to determine said movement.

Triggering may be based on the body part being arranged on the device in a particular orientation, for example, the body part may be a hand and the orientation may be an orientation for nominal use, such as the hand grabbing the device 14. The object tracking system 42 and/or the body part sensor subsystem of the interface device can be used to determine said orientation.

Triggering may be based on a particular body part gesture, such as a hand of a user, which may make an A-OK sign or other gesture. In such an example the object tracking system 42 can be used to determine said gesture. The gesture may be proximal the HMD 18 or the interface device 14 or other position. Triggering may also be based on voice commands, contextual events, and combinations of all of the above. Contextual event examples include starting a type of racing game to bring in the wheel, receiving a message window to bring in the keyboard, running low on ammunition in a game to bring in a gamepad or keyboard with a reload key highlighted, bringing in a mouse or trackball when a 3D drawing program is activated, or a portion for moving the drawing, etc.

The aforedescribed triggering may be across more than one interface device. An example is triggering by a hand on a wheel and a foot on a pedal, or a hand on a wheel and a hand on a gear stick. It will be appreciated that the combination of interface devices for cross device triggering will depend on the type of VR simulation. Mice, keyboards, gamepads, joysticks, trackballs, speakers and other input or peripheral devices can all communicate with one another. In one embodiment, each of them can be detected by one another (locationally) and in communication with one another to provide to the application program instructions based upon different combinations of trigger events with combinations of peripherals.

In an embodiment, when in the first state VR simulation and/or second state AR simulation an image of a body part of the user may be provided in a position corresponding to RR. In particular, it may be provided in contact with the interface device by implementation of the aforedescribed first embodiment of the system 2 and/or the body part tracking system 42.

In an embodiment, in the second state AR simulation, upon contact between a body part and the interface device, and prior to triggering, an image of the body part and/or interface device may be injected into the AR/RR simulation. Said image may be of increased detail, e.g. resolution and/or brightness. The body part of the user may be provided in an arrangement corresponding to RR as discussed previously.

In embodiments that do not use the body part tracking system 42, the body part may contact the interface device via an animation, for example, upon triggering the hands and arms of a user are injected along a vector corresponding to that of the arms of the user when arranged on the interface device in normal use.

In an embodiment the computer 16 may, upon triggering, process instructions from the user interface device 14 for controlling the virtual reality simulation. In this way when the display 6 is changed to the VR simulation the user interface device 14 becomes active for controlling said simulation.

In a second example, the computer 16 may change the instructions to the display 6 from providing the first VR state 64 to the second AR/RR state 66, which in some embodiments may comprise portions of the VR state.

In an embodiment, triggering may be based on the removal of both hands from the interface device 14, such that they are arranged in 10 O'Clock and 2 O'Clock position. Triggering may be instantaneous or require the hands removing for a predetermined amount of time, which may be any duration between 1-10 seconds, such as 3 seconds and may be user configurable.

In an embodiment, triggering causes a second state 66, wherein an AR image is overlaid/superposed on the VR state 64 in proximity to the interface device. Triggering may be caused by a user looking at the user interface device 14, which as discussed above can be determined by the camera system 44 or other suitable system. Triggering may in addition require one hand is removed from the wheel, hence optional conditions may be combined. In variants of the above embodiment upon triggering the RR/AR simulation may be fully displayed rather that an overlay. Moreover the triggering may be based on the user looking elsewhere, such as top left or right.

Like variants for the two proceeding embodiments of the second example may be derived from the previously discussed variants of the first example, which are now discussed.

In one embodiment of the system, other user interface devices are provided, e.g. such as an electronic pedal arrangement, gear stick or game controller or similar. Accordingly triggering may be based on other body parts, such as one or more feet. Triggering may also be based on the removal of contact between an interface device of one or more body part, such as one or both hands or one or both feet removed from contact between the interface device.

Triggering may be based on proximity rather than contact, e.g. a body part moved from a proximal or contacting position to within a threshold distal position with respect to the interface device. In such an example the object tracking system 42 can be used to determine proximity.

Triggering may be based on a characteristic body part movement, such as a hand movement above a threshold speed, or a head up and/or head down movement. Triggering may be based on the user looking at a particular object, such as the interface device for a predetermined or user configurable period of time. In such an example the object tracking system 42 can be used to determine said movement.

Triggering may be based on the body part being arranged on the device in a particular orientation, for example, the body part may be a hand and the orientation may be an orientation not for nominal use, such as the hand not grabbing the device 14. In such an example the object tracking system 42 and/or the body part sensor subsystem of the interface device can be used to determine said orientation.

Triggering may be based on a particular body part gesture, such as a hand of a user, which may make a thumbs up sign or other gesture. In such an example the object tracking system 42 can be used to determine said gesture. The gesture may be proximal the HMD 18 or the interface device 14 or other position.

The aforedescribed triggering may be across more than one interface device. An example is triggering by a hand removal from a wheel and a foot removal from a pedal, or a hand removal from a wheel and a hand removal from a gear stick. It will be appreciated that the combination of interface devices for cross device triggering will depend on the type of VR simulation. In an embodiment comprising more than one interface device, such as an electronic steering wheel and electronic gear stick arrangement, triggering may be adapted to the particular devices. For example if a hand remains on the wheel and the other hand is determined as active, e.g. on the gearstick or is reaching for the gearstick or wheel, then triggering is prevented, else triggering occurs.

In embodiments that do not use the body part tracking system 42, the body part may be removed from contact with the interface device via an animation, for example, upon triggering the hands and arms of a user are retracted along a vector corresponding to that of the arms of the user when arranged on the interface device in normal use.

In a further embodiment triggering from the first VR state to the second AR/RR state may be based on an event in the VR simulation, e.g. the VR simulation is paused for a particular time or there is a period of user inactivity.

In an embodiment triggering may comprise the determination of a particular auditory signal from external the system 2. The auditory signal may comprise a name of the user or other identifiable word/phrase, which may be spoken by another person. Said signal may be sensed by an audio input device in communication with the system 2, such as arranged on the HMD 18 or arranged as part of the computer 16. In an embodiment said determination may cause transition from the first VR state to the second AR/RR state, which may include muffling of the audio signal of the VR environment as discussed following. In an embodiment the determination of such an audio signal may provide an alert to the user when in the first VR state. The alert may comprise the provision of a message in the graphical environment or a characteristic vibration of the graphical images in said environment.

In embodiments, the auditory signal provided to the user may be adapted according to the state. The auditory signal may be controlled by instructions to one of the aforedescribed audio output device. For example, when in the first VR state the audio may be associated with the simulation thereof, such as the video game. When transitioning to the second RR/AR state the audio associated with the VR simulation may be changed, such as stopped or replaced with a different or a muffled audio signal. In particular, during the aforesaid overlay of the RR/AR image in the VR state a muffled audio signal may be provided.

When transitioning between the states the rate of transition of the graphical images may occur at different rates, which may depend on the state being transitioned to and/or the triggering event. A plurality of rates may be provided. A fast transition may be defined as less than 1 second. A slow transition may be defined as greater than 1 second and less than 5 seconds. The transition may be slow if the triggering can include a body part remaining on the device, such as in the aforedescribed embodiment wherein an overlaid RR/AR image is provided on the VR image. The transition rate may be dependent of a speed of a body part. For example a fast hand movement is associated with a fast transition and the converse. In an embodiment wherein transition is from the second RR/AR state to the first VR state and the triggering is both body parts arranged on the interface device, the transition may be slow. In an embodiment wherein transition is from the first VR state to the second RR/AR state and the triggering is both hands moved out of contact with the interface device, the transition may be fast. The speed of the transition may also depend on the context, or a combination of factors. Machine learning may be used to adapt the transition from initially slow to fast, or vice-versa. For example, after receiving a message window, based upon prior user response times as well as what is currently being done in the virtual environment, the transition could occur "slow" or "fast" as appropriate.

FIG. 8 is a flow diagram showing an embodiment operation of the system 2 for transitioning between the AR/RR second state 66 and VR first state 64. Various conditions 68-74, representing the previously discussed triggers, require satisfying to trigger transitioning between the states. In the AR/RR state 66 there is a single condition 68 that must be satisfied to trigger transition to the VR state 64, for example, the placement of both hands on the steering wheel. In the VR state 64 the condition 70 may be satisfied to trigger transition to the AR/RR state 66, for example, both hands removed from the steering wheel. In the VR state 64 the both conditions 72, 74 may be satisfied to trigger transition to the AR/RR state 66, for example, the condition 72 may be a single hand removed from the steering wheel and the second condition 74 may be a user looking at the steering wheel.

It will be appreciated that various triggers, such as those described previously may be combined in various ways, to effect transitioning between the AR/RR second state 66 and VR first state 64. For example separate triggers may be arranged in parallel to define an OR logical operator. A plurality of triggers may be combined to define an AND logical operator. Said triggers may also be arranged across more than one interface device as previously discussed. In an embodiment the combination of the triggers is user configurable, e.g. on the peripheral 20 (including the interface device 14 and the HMD 18 and other components of the system 2), or computer 16, such as via the application program.

In an embodiment, when providing the AR/RR simulation and/or the VR simulation the computer 16 may provide in the instructions to the display 6 an arrangement of a body part of the user 4, using the aforedescribed body part tracking system 42. The computer 16 may determine proximity with a particular object, such as the user interface device 14, a display device 40 of the computer, or other object in the actual physical world. In response to determination of proximity the amount of image detail of the object may be changed. The image detail may for example be increased or decreased in terms of resolution or brightness. An AR outline image may be changed to comprise a more detailed shaded image or a real image from the actual physical world. Proximity may be defined in terms of a determined distance, which may be defined in terms of points on the object and body parts. In an example said points may comprise the fingertips of a user and a point on the outer periphery of the steering wheel. In a related embodiment the computer 16 may determine contact between an object, such as the user interface device 14, and upon said determination provide the aforesaid increased image detail of the object. Contact may be determined using the body part tracking system 42 and/or the I/O system 26, such as the object manipulation sensor subsystem 52 and/or the body part sensor subsystem 54.

Figure 9A:
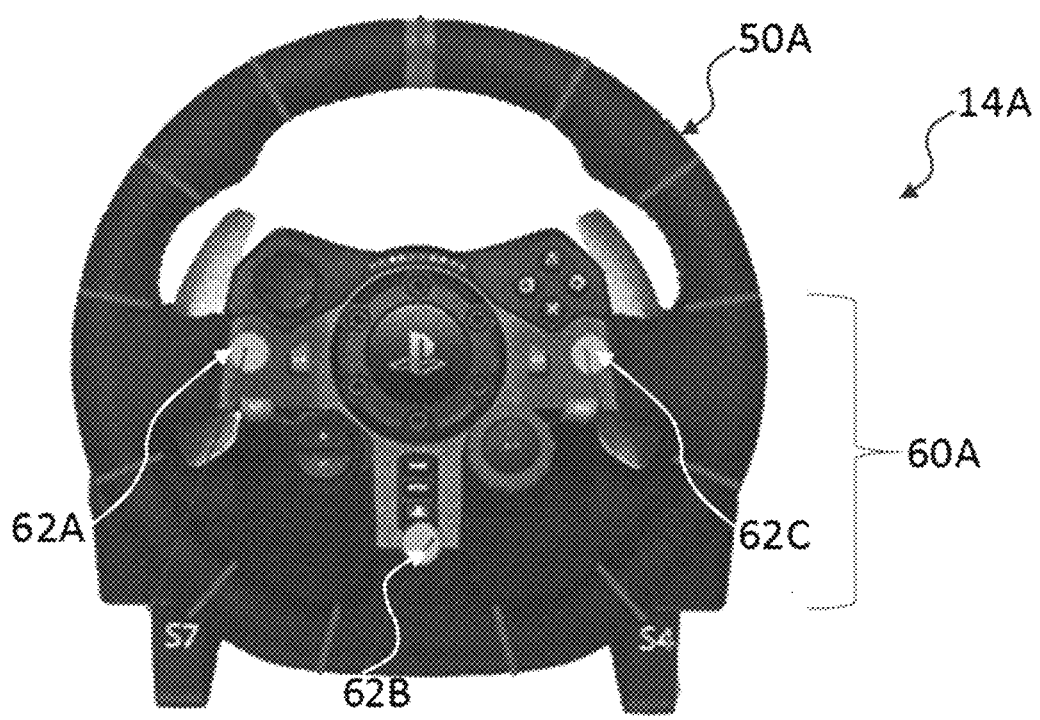
FIGS. 9A and 9B show schematic perspective views of example embodiments of the user interface devices of the system of FIG. 1, according to certain embodiments.
Figure 9B:
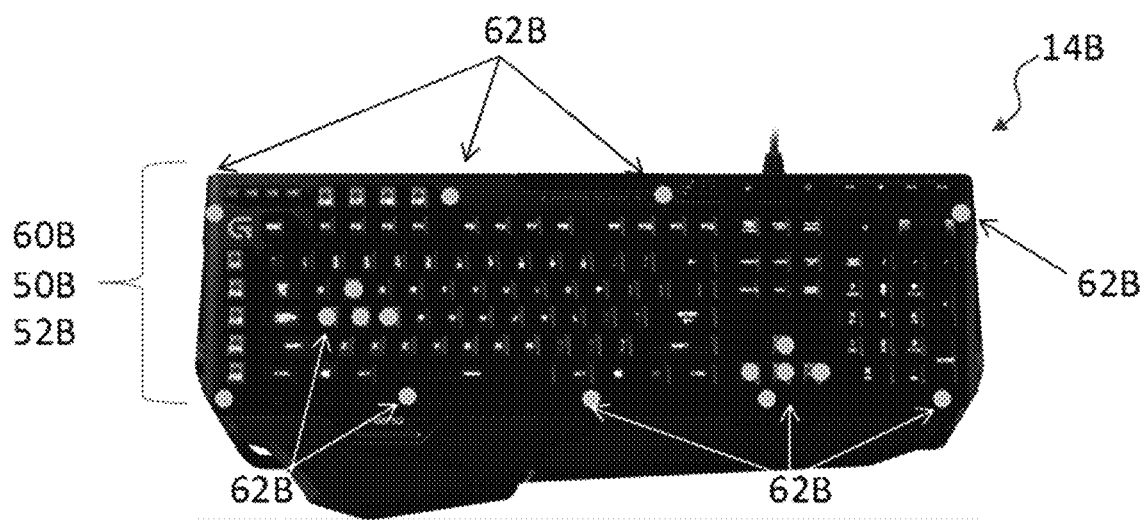
Figure 10:
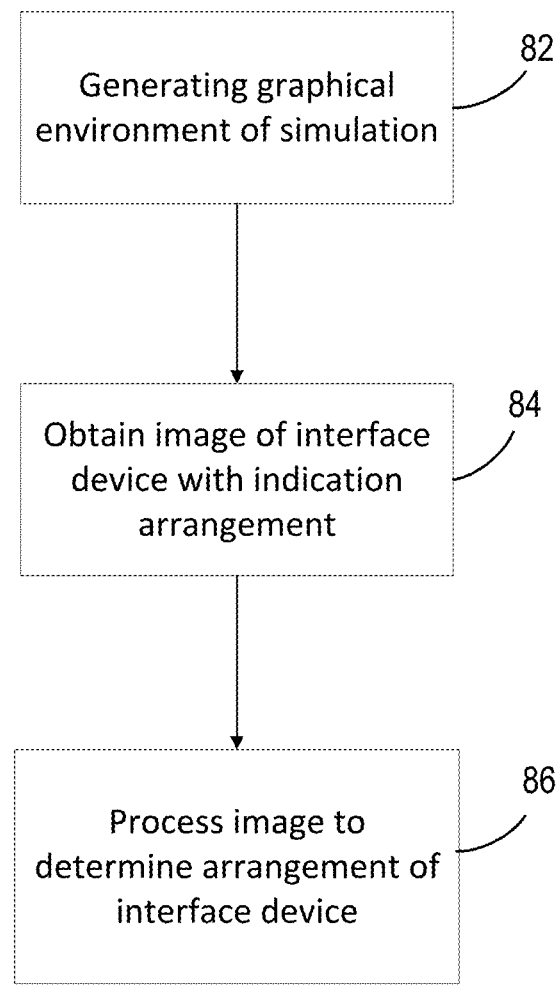
FIG. 10 is a flow diagram showing a method of generating a graphical environment of a virtual reality simulation of the system of FIG. 1, according to certain embodiments.

In a third embodiment of the system 2, aspects of which are illustrated in FIGS. 9A-9B, 10, the user interface device 14 may comprise an indication arrangement 60 configured with a characteristic arrangement of one or more elements 62. The camera system 44 may be arranged to provide graphical images of the indication arrangement 60. The computer 16 may process the graphical images of the indication arrangement 60 from the camera system 44 to determine the arrangement of the user interface device 14 with respect to the camera system 44, and in particular a position of image capture. Typically the camera system 44 is arranged on the HMD 18. In this way the arrangement is determined in respect of the field of view of the user. The computer 16 may provide the instructions may provide in the instructions to the display 6 the determined arrangement of the user interface device 14.

The arrangement may be defined in terms of one or more of: a geometry of one or more portions of the interface device; an orientation of one or more portions of the interface device 14; a distance of one or more portions of the interface device 14 from the camera system. Said arrangement can be provided in the instructions to the display 6, whereby the user observes the interface device as would be observed if the user were to look at the interface device in the actual physical world, e.g. the interface device is observed in the same position with the same orientation and size.

The elements 62 may comprise: a printed pattern, such as a pattern printed with infra-red ink; light emitting indicators, such as a light emitting diode (LED), which may emit infra-red; ultrasonic emitters. The indication arrangement may be arranged to form or to comprise part of a logo. In an embodiment the elements are arranged with a three dimensional pattern. In this way a parallax of the associated elements is processable to determine a three dimensional orientation of the device. Generally the elements 62 are arranged on an exterior surface of the user interface device 14. In particular, they may be arranged such that sufficient elements remain visible for the aforedescribed processing of their arrangement when the user holds the user interface device during normal use. Embodiment arrangements of the elements on various peripherals are now described.

FIG. 9A shows a schematic perspective view of an embodiment user interface device 14A that comprises an electronic steering wheel. The manipulatable object 50A comprises the wheel and the object manipulation sensor subsystem is operable to detect rotation of the wheel and to provide a signal to a processor for control of the graphical environment 8. The indication arrangement 60A is arranged on a plate which interconnects the wheel 50A and the axis about which the wheel rotates. In the embodiment the indication arrangement 60 comprises a plurality of infra-red LEDs 62A-62C. Whilst three elements are shown disposed about the axis of rotation, it will be appreciated that other numbers and element arrangements may be utilized, together with other element types.

FIG. 9B shows a schematic perspective view of an embodiment user interface device 14B that comprises a computer keyboard. The manipulatable object 50B comprises the keys and the object manipulation sensor subsystem 52B is operable to detect actuation of the key and to provide a signal to a processor for control of the graphical environment 8. The indication arrangement 60B is arranged on a combination of the keys and a visible portion of the housing. In the embodiment the indication arrangement 60 comprises a plurality of infra-red LEDs 62B. Whilst 17 elements 62 are shown it will be appreciated that other numbers and element arrangements may be utilized, together with other element types. Whilst indication arrangement 60B is shown arranged on a combination of the keys and a visible portion of the housing it may be arranged on the keys or the visible portion.

FIG. 10 is a flowchart showing a method of generating a graphical environment of a virtual reality simulation that may be executed by the application program of the computer 16. The method comprises at step 82 generating the graphical environment of the simulation. At step 84 obtaining from the camera system 44 a graphical image of the user interface device 14 comprising the indication arrangement 60 configured with a characteristic arrangement of the one or more elements 62. At step 86 processing said graphical image of the indication arrangement to determine the arrangement of the user interface device with respect to the camera system 44. At step 88 generating in the graphical environment an arrangement of the interface device in relation to the determined arrangement of the interface device.

In an embodiment one or more sensors of the object sensor subsystem 52 may be operable to provide in the signal of said subsystem 52 information related to a physical state of the user. The sensors may comprise one or more of the following: heart rate sensors; perspiration sensors; temperature sensors. The signal from said sensors may be used to control the first state VR simulation. The signal from said sensors may be used as triggers for controlling the aforedescribed transition between first state VR simulation and the second state RR/AR simulation.

In the preceding embodiments processing of the signals/graphical images etc. may occur at the local processor 22 of the user interface device 14, at the computer 16 (e.g. in host processor 30), at a processor of the HMD 18, at the local controller 46 or at any other suitable arrangement of processing resources within or in communication with the system 2, or a combination thereof.

In the preceding embodiments the graphical images may be provided as 2D or 3D images by techniques known to the skilled person.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware or software components, including a one or more virtual machines that can provide the described functionality. In some embodiments, the circuitry may be implemented in, or functions associated with the circuitry may be implemented by, one or more software or firmware modules. In some embodiments, circuitry may include logic, at least partially operable in hardware. In some embodiment, the processing/execution may be distributed instead of centralized processing/execution.

It will be appreciated that any of the disclosed methods (or corresponding apparatuses, programs, data carriers, etc.) may be carried out by either a host or client, depending on the specific implementation (i.e. the disclosed methods/apparatuses are a form of communication(s), and as such, may be carried out from either 'point of view', i.e. in corresponding to each other fashion). Furthermore, it will be understood that the terms "receiving" and "transmitting" encompass "inputting" and "outputting" and are not limited to an RF context of transmitting and receiving radio waves. Therefore, for example, a chip or other device or component for realizing embodiments could generate data for output to another chip, device or component, or have as an input data from another chip, device or component, and such an output or input could be referred to as "transmit" and "receive" including gerund forms, that is, "transmitting" and "receiving", as well as such "transmitting" and "receiving" within an RF context.

Overview of AR/MR/VR System

Figure 11:
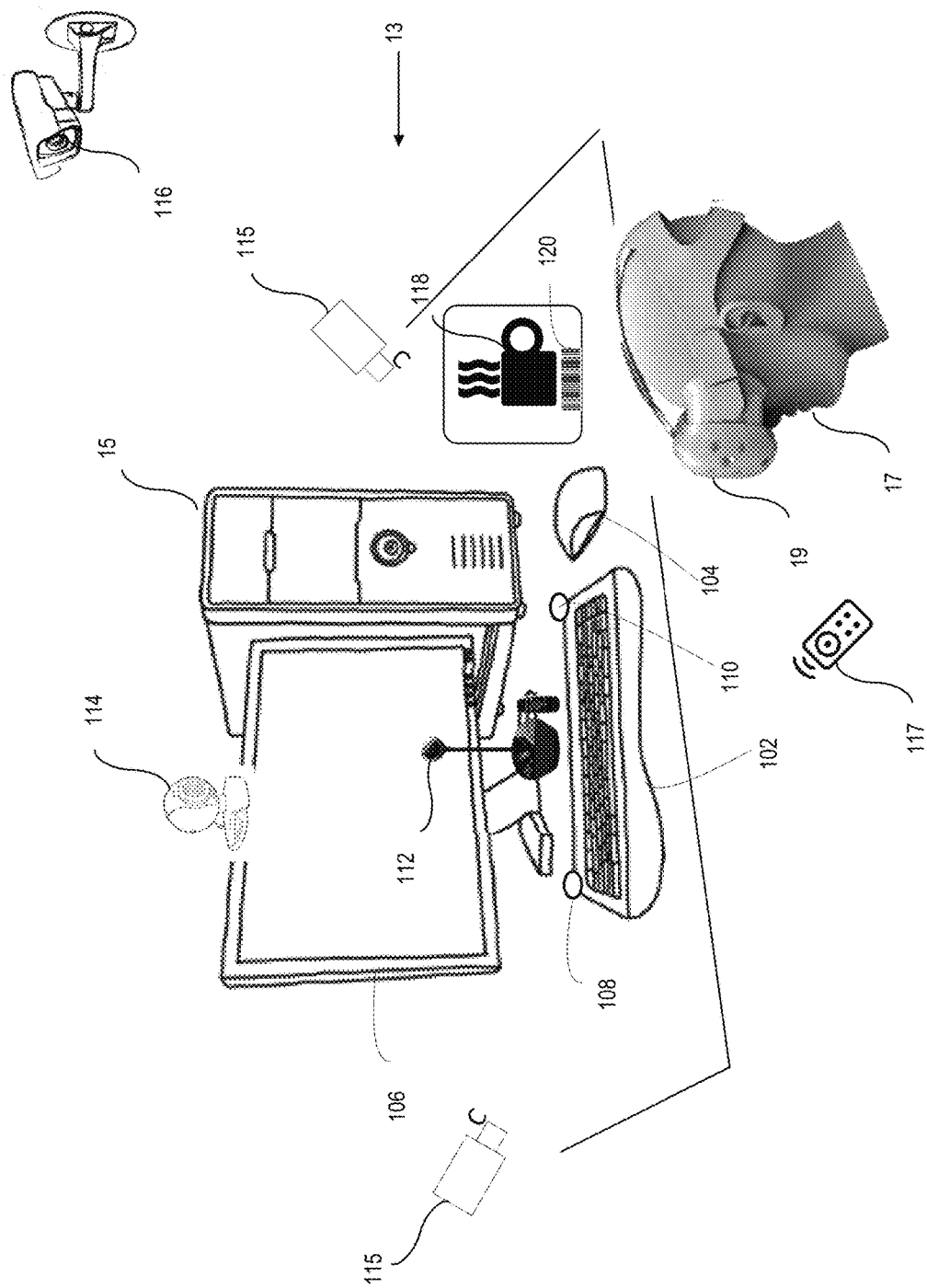
FIG. 11 illustrates a particular embodiment of a virtual reality system with a sensor and tracking system.

Referring to FIG. 11, an AR/MR/VR system 13 includes a computer 15, which is capable of providing an AR/MR/VR environment to a user. The system 13 includes a display, which in one embodiment is a HMD/glasses 19. For an AR or MR system, the HMD/glasses 19 may be glasses with a video projection system or any other AR/MR display device. The computer 15 provides instructions for display of the AR/MR/VR environment to the HMD/glasses 19 (including to a display driver thereof). The system 13 includes a user interface device 11 to interface the user with the computer 15. The user interface device 11 receives an input from the user for user control of the AR/MR environment. The system 13 includes a sensor and tracking system 9 to provide position and orientation information to the computer, e.g. of a body part of a user, which can include a user head orientation and hand orientation or of another object which may include a peripheral device or other object as will be discussed.

FIG. 11 illustrates a particular embodiment of a AR/MR/VR system with a sensor and tracking system. A user 17 is wearing HMD/glasses 19. Two peripherals or input devices are shown—a keyboard 102 and a mouse 104. The location and movement of the hands of user 17 are monitored with one or more cameras or other sensors. Shown in FIG. 2 are cameras 108 and 110 on keyboard 102, a video conference camera 112, a webcam 114 and a security camera 116. Cameras can also be mounted on HMD/glasses 19, elsewhere on the user 17, on a drone, or anywhere else with a view of the physical environment. Each camera can be a stereo camera, with two side-by-side image sensors to provide a 3D image with depth. Images from multiple camera angles can be combined.

One or more of the cameras or other sensors can detect objects in the physical environment, and can identify those objects through a variety of methods as described in more detail below. For example, a coffee cup 118 may be detected from a barcode 120, an RFID tag, or other identifier. For an RFID tag, instead of, or in addition to, using a camera, an RFID reader could be used. Alternately, a program in computer 15 can instruct the keyboard 102 or mouse 104 to flash an indicator light (e.g., RGB or IR) so it can be identified. The cameras or other sensors can detect which peripheral or object the user's hands are near or touching, and the movement of the user's hands with respect to that object.

A space near on any of the objects can be designated as a gesture space. For example, the airspace above the keyboard can be used for hand gestures which provide control signals. Multiple gesture spaces can be defined. For example, a gesture near the mouse 104 may have a different meaning, or use different gestures, than gestures over the keyboard 102 or on the display 106. More description is provided below.

As described in more detail below, the image of the object or peripheral can be imported into the virtual reality environment as it actually is, as if the HMD/glasses was partially transparent to allow the user to see the physical objects. Alternately, the real image can be augmented or otherwise changed, or moved, rotated, scaled, flipped, etc. For example, the types of keys shown on a keyboard representation could be changed from alphanumeric to emojis. An input that isn't present can be projected onto the object in the virtual reality environment, such as a keypad on top of mouse 104 or on coffee cup 118.

Figure 12:
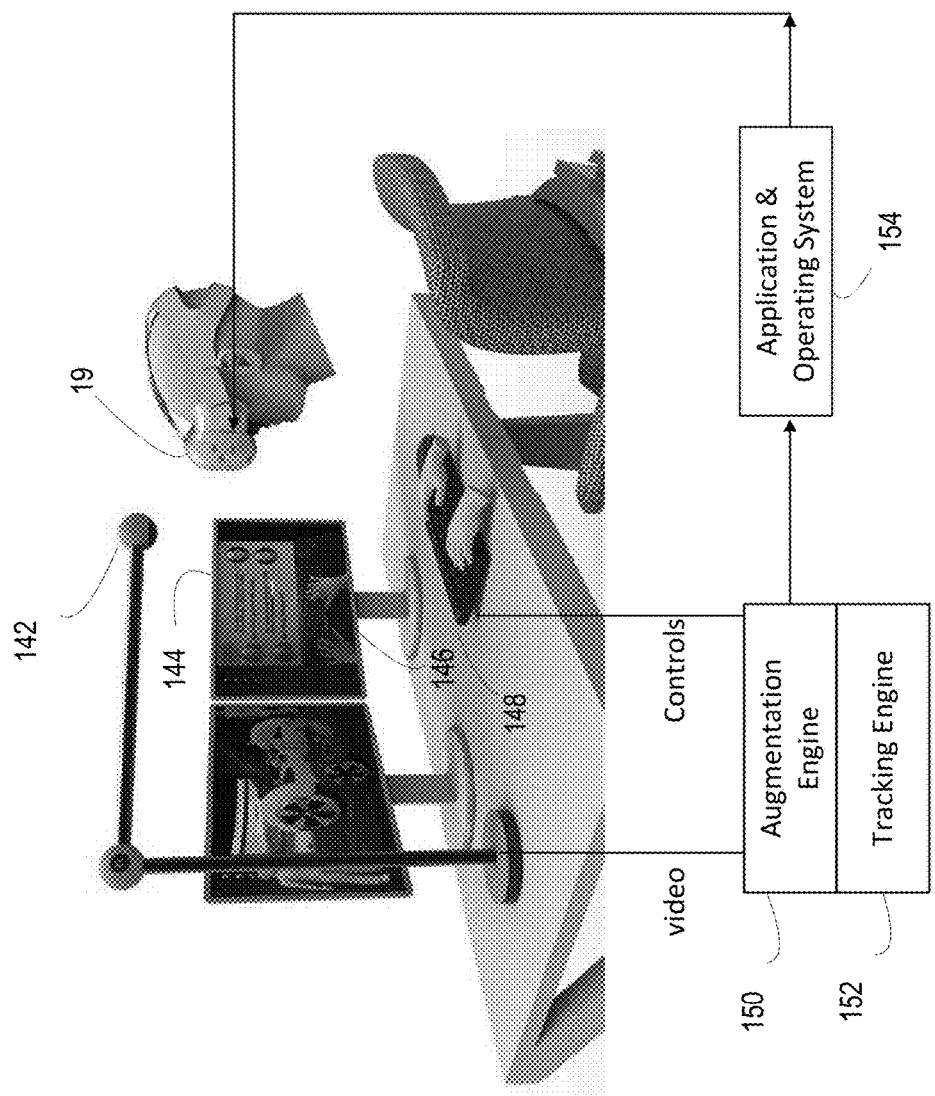
FIG. 12 is a high level diagram of an embodiment of an augmentation and tracking system operation.

FIG. 12 is a high level diagram of an embodiment of an augmentation and tracking system operation. A camera 142 provides video to an augmentation engine 150 and a tracking engine 152. Video from other cameras, and/or other sensing data from other sensors can be provided. The video and other sensing data can be used for two purposes. First, the video and/or sensor data is used to provide a realistic display as well as injection or a combination thereof of one or more peripherals and the user's hands in the virtual reality environment. Second, the video and/or sensor data is used to track the user movements with respect to the peripherals.

Separately, control inputs from keyboard 148 are provided to augmentation engine 148 and tracking engine 152. The determination of which key is depressed, or about to be depressed, can be detected by an actual key press which generates a key signal, a proximity sensor on the key, and/or from the camera 142 or other sensors. The control signals are provided to "press" the appropriate key in the virtual reality environment, as well as determine which key should be augmented. The video and control signals, as augmented and modified, are provided to application and operating system software 154 for the HMD/glasses 19. Hooks/IME are provided to integrate with virtual reality applications and desktop displays that are injected into the virtual reality environment. The graphic card generates a new frame that it stores in the video memory in a first buffer. When the image is fully computed, the graphic card will swap the first buffer and the current buffer. The current buffer holds the image that was being displayed to the user while the next image was being rendered in the first buffer. When this buffer swap happens, any type of screen receives the new buffer and displays the newly generated image. Therefore both screen and HMD receive the image at the same time, and directly from the graphic card. One can use an HMD without a desktop screen. The render from the application is made on the graphic card and is deployed at once to all types of screens once the image is fully rendered.

In one embodiment, a representation 146 of the keyboard and user's hands is displayed on a physical monitor 144, and then the display of the physical monitor is imported into the HMD/GLASSES 19. Alternately, representation 146 is only generated in the HMD/glasses, providing more flexibility on positioning, such as under a desired one of multiple virtual monitors in the virtual reality environment.

Network and Computer Elements

Figure 13:
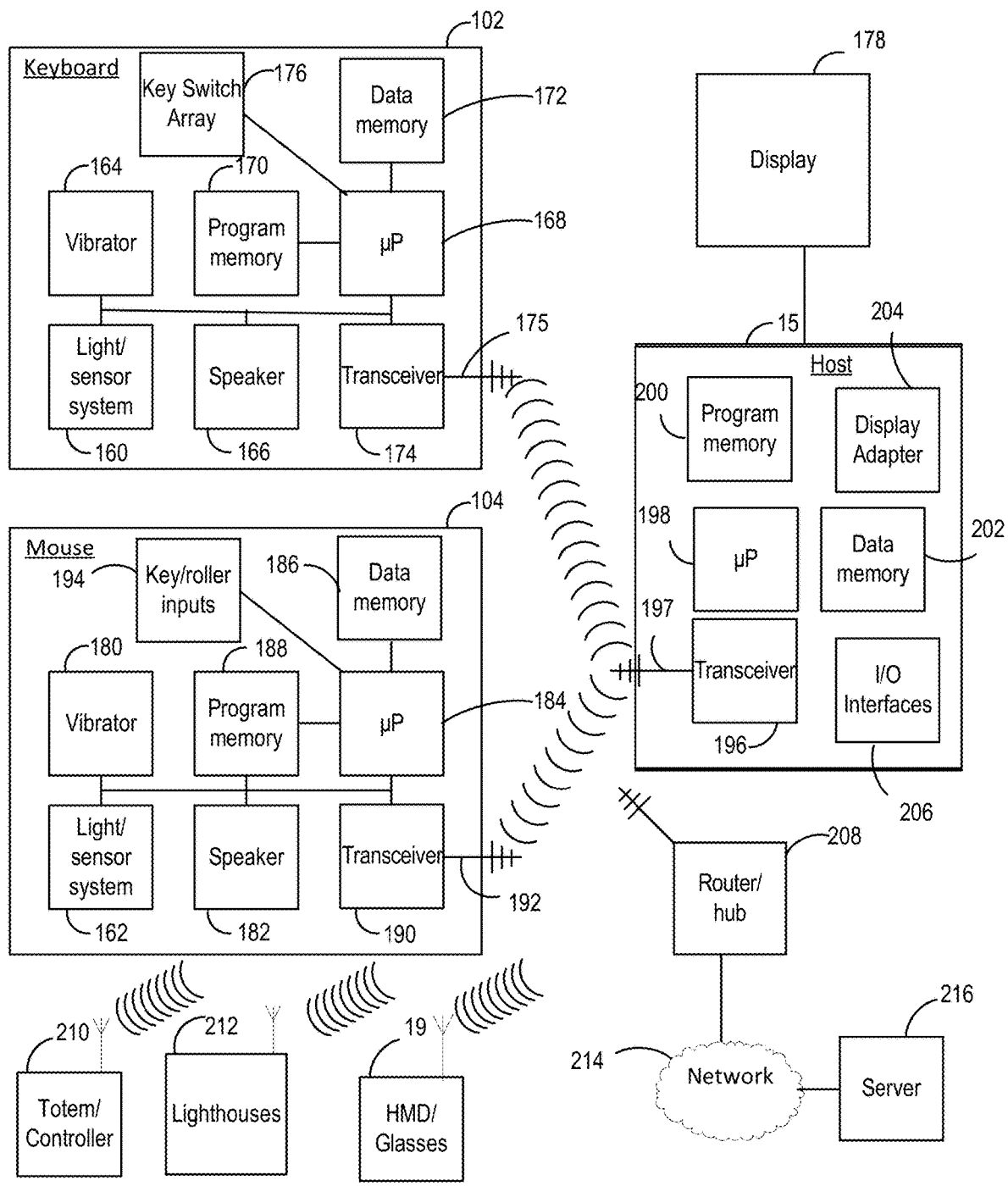
FIG. 13 is a block diagram of a particular embodiment of the electronics components in user interface devices and other elements of an augmented/mixed reality environment.

FIG. 13 is a block diagram showing an embodiment of a AR/MR/VR. A keyboard 102, mouse 104 and personal computer 15 are shown. Keyboard 102 has a lighting/sensor system 160, and mouse 104 has a lighting/sensor system 162. The sensor system 162 can include cameras or other sensors as described above. The lighting system can light up aspects of the keyboard or mouse to allow them to be identified by other cameras or other sensors. The lights can be visible or infrared, or alternately other identification technologies could be used, such as ultrasound. Additional user interface devices or peripherals with their own lighting/sensor systems can be added. For example, a game pad or game controller, a headset, a joystick, touchpad, steering wheel, or any other computer or gaming input device. The computer can be of any type, including a mobile phone or tablet. The input and interface devices may work with any such computer, including portable keyboards attached to mobile phones, tablets, etc. Alternately, non-user interface peripheral devices can be provided with the lighting/sensor systems, and injected into the VR environment, such as a mousepad, a stand, or the frame or display of the host itself.

Keyboard 102 also has a haptic feedback device such as a vibrator 164 and a speaker 166 for providing haptic and sound effects. A controller or microprocessor 168 controls the various systems using a program in program memory 170 and data in a data memory 172. In one embodiment, program memory 170 can be partially in firmware or ROM. A transceiver 174 and antenna 175 allow the wireless downloading of programs, communication with other devices and communication with computer 15. A key switch array 176 detects key activations and provides the key data to microprocessor 168, which can then provide the key data as inputs to HMD/glasses 19 or a display 178.

Mouse 104 can similarly have a vibrator 180 and speaker 182. It also has a controller 184, data memory 186, program memory 188, transceiver 190 and antenna 192. The transceiver and antenna can allow the wireless downloading of programs, communication with other devices and communication with computer 15. A key/roller inputs 194 can detect key and roller activations and provides the input/control data to microprocessor 184, which can then provide the key and control data as inputs to HMD/glasses 19 and/or a display 178.

Personal computer 15 has its own transceiver 196 and antenna 197, microprocessor 198, program memory 200, data memory 202, display adaptor 204 and I/O interfaces 206. Alternately, a router or hub 208 could be used to interconnect the various devices that provide the communication link. In addition, the router or hub or other device could function as the host, as well as providing the communication link.

Personal computer 15 can provide display signals to either HMD/glasses 19 or a desktop or other display 178. Inputs can also be provided from a totem/controller 210, which can have electronic components similar or the same as keyboard 102 and mouse 104. Lighthouses 212 can be used to detect the location of totem/controller 210, keyboard 102 and mouse 104. The lighthouses can include cameras for image recognition, sensors for detecting visible or IR light from the various devices, ultrasonic sensors, or any other type of sensing system. In another embodiment, the reverse is done where the lighthouses are emitting light and the sensors are in the totems/peripherals.

A remote server 216 can be accessed over a network 214 to provide some or all of the needed processing, or to provide content and controls, such as in a multi-player game environment. Server 216 may provide some or all of the video content or other data or controls to the computer 15. Network 214 can be the Internet, a Wide Area Network (WAN), a Local Area Network (LAN) or Wireless Local Area Network (WLAN) or any other network or networks or communication path. Alternately, the computer 15 may generate and/or control the virtual reality environment from locally stored instructions. In one embodiment the computer 15 includes a program memory 200 with instructions executable for generation of the VR/AR/MR environment. The number of servers 216 and networks 214 can be modified as appropriate for a particular implementation, such as where content is provided from multiple content servers, or computers of other users in a shared video game, interactive application, or any other multi-user application. The transceiver 196 of computer 15 may connect to the network 214 through router/hub 214 and/or via wired and/or wireless connections, and thereby communicate or become coupled with server 216, either directly or indirectly. Alternatively, transceiver 196 may be associated with server 216 through any suitable tangible computer-readable media or data storage device, data stream, file, or communication channel.

Computer 15 includes memory such as program memory 200 implemented as read-only memory (ROM) or a programmable memory. Data memory 202 may include a random-access memory (RAM) or another type of dynamic storage device that stores information and instructions for execution by microprocessor 198. The ROM may include a conventional ROM device or another type of static storage device that stores static information and instructions for use by microprocessor 198. The computer 15 includes input/output (I/O) interfaces 206 to interface the computer 15 with peripheral and input devices, including the HMD/glasses 19, keyboard 102, mouse 104 and totem/controller 210. Device drivers (not shown) may communicate with the peripheral devices through electronic circuitry of the I/O interfaces 206. The I/O interfaces 206 may use display 178 in addition to the HMD/glasses 19, which may display images of the virtual reality environment application, operating system application or other images associated with the AR/MR/VR environment. The display may allow configuration of system 13 by the user without needing to wear the HMD/glasses 19, or configuration of system 13 by any other person, or to allow a secondary non-VR display of the AR/MR/VR environment, e.g. for observational, run-time configurational, safety or any other purpose. The I/O interface 206 may include an audio output device (not shown) such as a speaker, which is preferably coupled to microprocessor 198 via associated audio circuitry such as, but not limited to amplifiers, filters, and other circuitry known to the skilled person to provide sound output to the user when an audio event occurs during the implementation of an application program. In embodiments the audio output device and associated circuitry may be located on the HMD/glasses 19.

The computer 15 may perform operations based on instructions that may be read into the program memory 200 from a computer-readable medium or from another device via communication resources. The instructions contained in the program memory 200 cause microprocessor 198 to perform processes that will be described later. Alternatively, hardwired circuitry may be used in place of or in combination with instructions to implement said processes. Thus, various implementations are not limited to any specific combination of hardware circuitry and software.

The computer 15 may implement instructions for determining from an image stream provided by the camera system the arrangement of objects in the capture area. In other embodiments, the computer 15 may implement instructions for determining, from an image stream provided by the camera system as well as data from the sensor system, the arrangement of objects in the capture area. For object tracking the instructions may implement known techniques, such as feature extraction and identification, as well as data received from components within the system 13. Examples include the speed-up robust features (SURF) algorithm.

Example implementations of the computer 15 include: a personal computer (PC); workstation; laptop; a home video game console system, which is typically connected to a television set or other display, including examples provided by Microsoft, Valve, HTC, Oculus, Nintendo, Sega, Sony, or any other company in the games console field; a set-top box, which can be used, for example, to provide interactive television functions to users; or a network or internet-computer; a media player (such as an MP3 player); a subnotebook/netbook; a tablet computer; a smartphone; a cellular telephone; a personal digital assistant (PDA); other similar electronic device; other suitable device. In an embodiment the computer 15 may be incorporated as part of the HMD/glasses 19 and/or user interface device such as keyboard 102 or mouse 104. The computer 15 may be operable under various operating systems including the Windows™ MacOS, UNIX, or MS-DOS operating system. Alternately, it could be a custom OS made by the provider of HMD/glasses that contain the processing units.

The user interface device microprocessors 168 and 184 may be provided with instructions to wait for commands or requests from the computer 15, decode the command or request, and handle/control input and output signals according to the command or request. In addition, the microprocessors may read sensor signals and calculate appropriate forces from those sensor signals, time signals, and stored or relayed instructions selected in accordance with a host command.

The keyboard 102, mouse 104 and any other user interface device includes an I/O system such as key switch array 176, key/roller inputs 194, or any other I/O input device to provide information to/from the microprocessors. The I/O system may vary depending on the configuration of the user interface device. In embodiments the I/O system may be incorporated, connected to, or in communication with the sensor system. Said input elements may include an associated sensor system coupled to the I/O system, which may include one or more of the following: optical sensor systems; optical encoders, potentiometers; velocity sensors; acceleration sensors; strain gauge; resistive sensors; capacitive (e.g. touch) sensors, or any other type of sensors. A sensor driver may be implemented to convert sensor signals to signals that can be interpreted by the microprocessors.

The user interface devices such as keyboard 102 and mouse 104 are coupled to the computer 15 by communication resources, an example of which includes a bi-directional bus such as an RS232 serial interface, RS-422, RS-485, I2C, Universal Serial Bus (USB), MIDI, Firewire or other protocols known to the skilled person or a parallel bus or wireless link, such as BTLe (BlueTooth Low energy) or proprietary 2.4 kHz protocol for instance. In embodiments the communication resources supply power from the computer 15 to the user interface. In embodiments a dedicated power supply is implemented.

Tracking Controllers, Totems and Objects

In certain embodiments, rather than a HMD or lighthouse tracking the position of a controller (outside-in), the controller tracks the position of a HMD, and thus its position with respect to the HMD (inside-out). The controller provides its location information to the HMD using a controller coordinate reference system. The controller coordinate reference system is then nested within the HMD coordinate reference system to provide the location of the controller within the HMD coordinate reference system.

In certain embodiments, it is assumed that the entities within the system can communicate with each other so the state or information of the sensor of different entities are shared or at least available on demand. All the tracked entities are localized and the results are sent to a central processor, e.g. to the computer that runs the VR game. The intelligence or the processing element that does this computation could be centralized (e.g. in the host computer, or in the HMD) or it could be distributed between the tracked entities.

Figure 14:
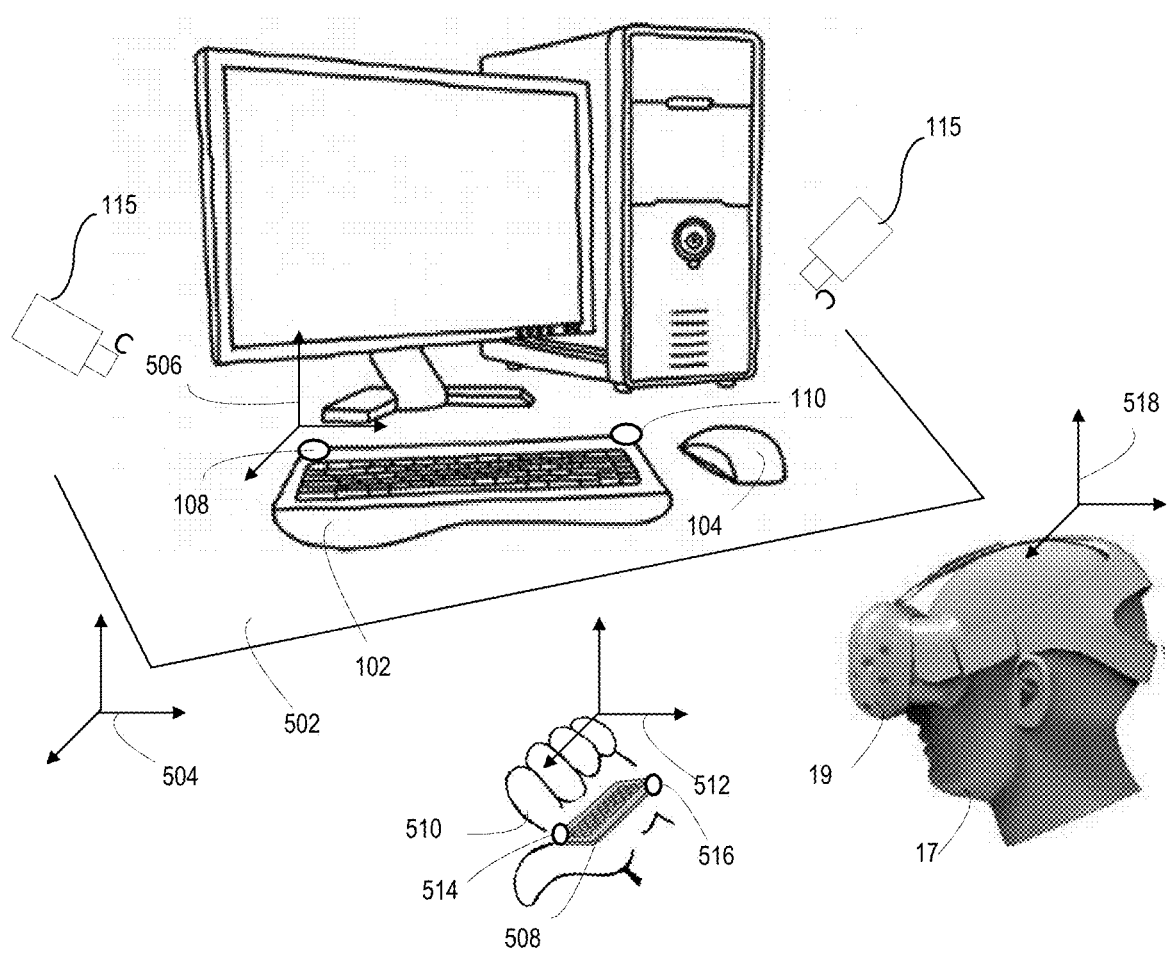
FIG. 14 is a diagram illustrating the nesting of controller and HMD coordinate systems according to an embodiment.

FIG. 14 is a diagram illustrating the nesting of controller and HMD coordinate reference systems according to an embodiment. The real world in which user 17, desk 502 and keyboard 102 are located is represented by a real world coordinate reference system 504. The view of the world from keyboard 102 is represented by a keyboard (controller) coordinate reference system 506 for sensor 108 (e.g., camera or ultrasonic sensor). The origin, or zero point of the keyboard coordinate reference system for the x, y and z axes is at sensor 108, or a particular point on sensor 108. Alternately, an origin elsewhere on keyboard 102, or proximate keyboard 102, may be used, with a known distance and direction between sensor 108 and the origin of the coordinate reference system. A similar or the same keyboard coordinate reference system may be referenced with respect to sensor 110. Combining the coordinate system of the keyboard with the coordinate system of the mouse allows the anticipation of potential occlusions, alignment of the injections, and otherwise transmitting accurate information to the HMD. In one embodiment, both sensors 108 and 110 reference the same origin of the keyboard coordinate reference system, located between the sensors, with each sensor having a different offset vector from the origin.

In certain embodiments, a hand-held controller 504 in a user's hand 510 has a coordinate reference system 512. Hand-held controller 504 similarly can have multiple sensors 514, 516 referencing the same or different coordinate reference systems. In one embodiment, hand-held controller 508 and keyboard 102 and potentially other controllers, such as a mouse 104, each have their own coordinate reference system. Alternately, only one of the controllers, or a subset, has sensors for establishing its own controller coordinate reference system, and the other controllers or other devices or objects are tracked relative to that/those controller coordinate reference system(s).

In certain embodiments, a HMD 19 on a user 17 has its HMD coordinate reference system 518. In one embodiment, HMD uses cameras to provide a visual image in AR, MR or VR. HMD need not track the controllers, because handheld controller 508 or keyboard 102 tracks its position with respect to HMD 19. The relative position in controller coordinate reference system 512 or 506 is then transmitted to HMD 19, or a computer accessible by HMD 19. The relative position is combined as an offset in the HMD coordinate reference system 518 to locate the controller relative to HMD 19. If HMD 19 is in a tracked environment, it may also relate the position in HMD coordinate reference system 518 to a real world position in real world coordinate reference system 504. In one embodiment, HMD coordinate system 518 is real world coordinate reference system 504.

In certain embodiments, tracking of particular devices or objects can dynamically shift between sensors on keyboard 102, sensors on hand-held controller 508, or sensors on other controllers, totems or objects when one of the sensors is more occluded than the other. In one embodiment, tracking is shifted in response to processing constraints, which may be based on contextual usage. Alternately, tracking responsibility may switch between controllers as one controller finds its view occluded. Alternately, the switching of tracking control may be only for a portion of the environment for which the view is occluded.

In certain embodiments, controller 508 can be tracked by fixed lighthouses 115. Controller may have photosensors which detect IR light from the lighthouses 115 to determine its position. The position information can then be provided to HMD 19. If user 17 moves out of the range of lighthouses 115, position tracking of controller 508 can switch to using sensors 514, 518 and coordinate reference system 512 as described above.

In certain embodiments, multiple tracking technologies are used. The HMD 19 uses a first tracking technology (e.g., visual with cameras), and the controller 508 uses a second tracking technology (e.g., ultrasonic or electromagnetic). The controller 508 may use multiple tracking systems, and switch between systems when one tracking system has occlusion. The controller 508 may have multiple sensors at different locations on the controller, and switch between them when one is occluded. The default tracking system can be the one that requires the least power or processing time. For example, a camera based tracking system and an ultrasound based tracking system may be used, with the ultrasonic based system being the default. Alternately, another technology could be used (IR, RF, etc.) and the default may be changed, and may change depending upon the environment. As used herein, references to controller 508 may also refer to keyboard 102, mouse 104, or any other controller, totem or object.

In certain embodiments, switching between sensors can be done based on other conditions than occlusion, such as pressure, temperature or other environmental factors. For example, one sensor may be experiencing more noise, such as reflections off a nearby object.

In certain embodiments, a lower accuracy position is tracked during fast movements, with higher accuracy tracking during slow movements. This saves processing power without degrading the user experience, since users do not see fast motion as well, and thus do not perceive the lower accuracy tracking. In other embodiments, partial position information can be provided by the controller 508 to the HMD 19, such as position of controller 508 but not orientation, or only 2 DOF. This allows the controller 508 to supplement tracking information where the HMD is occluded, and/or simply reduce the processing required in the HMD.

In certain embodiments, HMD 19 may track the position of controller 508, such as by using cameras mounted on HMD 19. The view of the cameras can become occluded, such as by the controller 508 being hidden by hand 508 or the user's other hand or arm, by controller 508 being held under desk 502, by controller 508 being held at the side of user 17 outside the FOV of HMD 19, by the user turning her/his head away from controller 508, etc. In such situations, tracking of the position and orientation of controller 508 relative to HMD 19 can switch to controller 508 and its sensors 514, 516. Control can switch back when the occlusion is removed. Alternately, in case of occlusions, the system does not switch from sensors located in the controllers to sensors located in the HMD. Instead, the system will switch from a set of sensors located in the controller (e.g., ultrasound) to another set of sensors (e.g., IMU) also located in the controller.

In certain embodiments, hand-held controller 508 only includes an internal IMU (Inertial Measurement Unit) for measuring 3 DOF, and does not have sensors 514, 516. The tracking of hand-held controller 508 can then be done by keyboard 102, another controller, or lighthouses 115 when in the illustrated environment of FIG. 14. When user 17 leaves the illustrated environment, controller 508 provides functions compatible with 3 DOF, such as rotating virtual objects in an AR/MR/VR environment. Alternately, controller 508 may have a 6 DOF IMU (or a 6DoF 'inside-out' SLAM system can be implemented based on cameras mounted in the controller). Controller 508 may be tracked by cameras in HMD 19 when out of range of keyboard 102 and lighthouses 115. Keyboard 102 could be replaced by another controller, totem or object for tracking controller 508 in the environment of FIG. 14.

Time Synchronization.

The combination of a position into a second coordinate system is done based on the time of measurement under each coordinate system. The multiple controllers can each have a clock, with all the clocks synchronized. Each measurement can have a timestamp, and measurements with the same time stamp are matched up. If the timestamps do not exactly match, one of the measurements can be interpolated to find a measurement with a matching time. The interpolation is based on the motion vector and differences in time of other measurements. In one embodiment, local clocks can be synchronized by different means such as timestamps, dedicated events (IR flash) or special coding. In one embodiment, an alternative to synchronized clocks is to use a form of synchronization based on trigger pulses sent between different entities. The trigger pulse could be based on IR or radio frequency.

Calibration.

Depending on the technology, calibration may be needed. For ultrasound, sound waves propagate at different speeds depending on environmental conditions, such as air pressure and temperature. An ultrasonic sensor accurately determining a distance in a user's home in the desert at sea level may not be accurate in an airplane or at a cold, higher altitude city. In certain embodiments, an automatic calibration routine is run using a known distance. In one example, the user is instructed to hold the controller at arm's length for an initial calibration, then when the system is used in another environment, the user is prompted to hold at arm's length for another calibration. Even though the exact distance is not known, the distance should be the same. Alternately, the controller can include transmitters/transducers and sensors. The distance between the transmitters/transducers and sensors on the controller will be a fixed, known amount, and can be used for calibration. In another embodiment, the distance can be determined from the camera imaging system, which is not affected in the same way by temperature and pressure.

Calibration can also be used to detect and later cancel noise effects in the environment, such as echoes. Other noise may be another source of ultrasound. By moving the controller around during calibration, it can locate the source of the interfering ultrasound and compensate for it. In one situation, the interfering source of ultrasound is another nearby controller of another user. In one embodiment, the two controllers can communicate with each other for the purposes of detecting and compensating for interfering signals. Alternately, each controller can transmit a unique tag or ID in ultrasound, which other controllers can recognize as not being the desired signal, and can perform appropriate compensation. In one embodiment, controllers can be synchronized by means of an RF or optical link to make sure that they do not transmit ultrasound waves at the same time.

In certain embodiments, tracking may be lost due to occlusion, noise or otherwise. When the occlusion or other interference is removed, the tracked controller, totem or object will need to be reacquired. Using the switching of sensors as described above, another sensor can provide current position information for the purpose of reacquisition. Alternately, the last motion vector can be used with the elapsed time since the last tracked position to estimate a new target position for reacquisition. Alternately, fusion is used to provide a smooth transition from one sensor set to another.

In certain embodiments, the power of the ultrasound, electromagnetic, or other tracking signal can be varied based on various factors. If the tracked object is close, less power may be required, while if the tracked object moves far away, power may be increased to ensure accurate tracking.

In certain embodiments, the ultrasound/electromagnetic system can be self-adaptive by evaluating the operating conditions and adapting its signal strength, modulation, etc. to the run-time environment. Alternately, the tracking system(s) can be tuned/adapted externally by a fusion algorithm taking into account more specific system level operating conditions such as motion vector, estimated trajectory, possible hands occlusion, which are otherwise not available at the sensor/component level (e.g., the ultrasound tracker doesn't know about the motion vector of the tracked object itself).

Fusion Module

Figure 15:
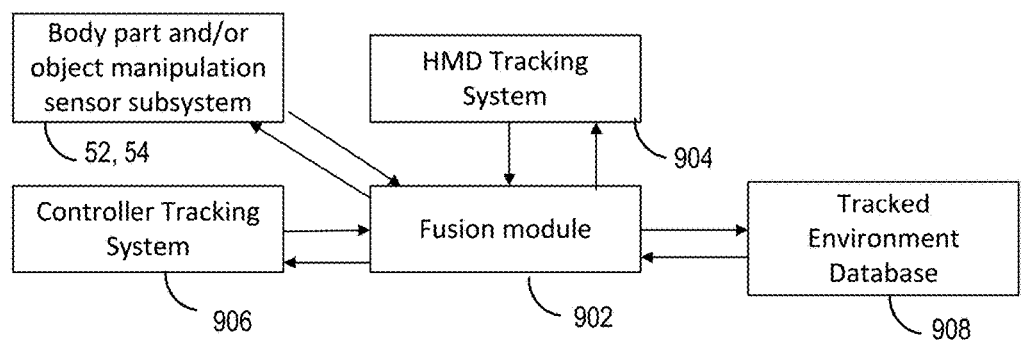
FIG. 15 is a diagram illustrating a fusion module for combining controller and HMD tracking systems according to an embodiment.

FIG. 15 is a diagram illustrating a fusion module 902 for combining controller and HMD tracking systems according to an embodiment. Fusion module 902 receives coordinate inputs from HMD tracking system 904 and controller tracking system 906. The nested coordinates of controller tracking system 906 are added to the real world coordinates of HMD tracking system 904 to yield an actual location and orientation within the real world coordinate system. The combined data can be stored in tracked environment database 908 for display or directly sent to the display. In one embodiment, the information from a body part and/or object manipulation subsystem 52, 54 is also used in the fusion operation, or in place of one of the other systems.

In embodiments, the HMD is tracked with respect to the real world whereas the controllers are tracked with respect to the HMD. In this case the tracked data cannot be fused. It must be added to get the position of the controllers with respect to the real world.

The fusion module can not only add coordinate systems together, in one embodiment, both the controller tracking system and the HMD tracking system measure the relative position of one device with respect to the other. In one embodiment, an IMU is provided in the HMD to provide information on the HMD location as a point of origin. This information is redundant and can be fused to achieve better performance. In one embodiment, the localization process is based on a multi-modal, redundant set of distance and orientation information. Each measurement of distance or orientation comes with a confidence bound or probability. The process of fusion is to combine this information to come up with the most probable estimation of positions and orientations. Thus, rather than switching between the estimated coming from different modalities, it fuses them to get an estimate that might be more accurate than any individual measurement.

In one embodiment, fusion module 902 also combines the 6DOF data provided by an ultrasound/video tracking system with the 6DOF data provides by an IMU.

In one embodiment, a fusion algorithm can re-purpose or re-configure the currently used sensor suite in the event of the LOS (line of sight) occlusion or interference. Hence, by having a superset of sensors (a full sensor suite) the currently active subset of sensors can be dynamically selected based on the quality of the measurements and run-time environment (perturbations). This way the measurement accuracy of the sensor pack can be significantly improved (ultrasound for example). Also the tracking system (ultrasound) can stay longer on-line providing the tracking data to the fusion algorithm. Re-purposing can be done if the LOS condition is lost, to have a continuous 6 DOF tracking. E.g., the ultrasound system can fall back to the 3DOF tracking.

In certain embodiments, a relative vector from the controller coordinate system is added to a vector from the HMD coordinate system to provide an absolute location. One or both vectors may be adjusted so that both have the same scale and precision. When there is motion, the detected positions can be modified based on an intelligent algorithm to smooth out erroneous variations.

In certain embodiments, the communications are two-way. For example, fusion module 902 may indicate which tracking system should activate and take over when the other is occluded. Fusion module 902 may be located in HMD 19, a controller, or a computer or server in communication with HMD 19 or the controller. Fusion module 902 may be implemented using the processor and program memory of such devices, or a separate processor and memory.

Discovery of User Input Device

Figure 16:
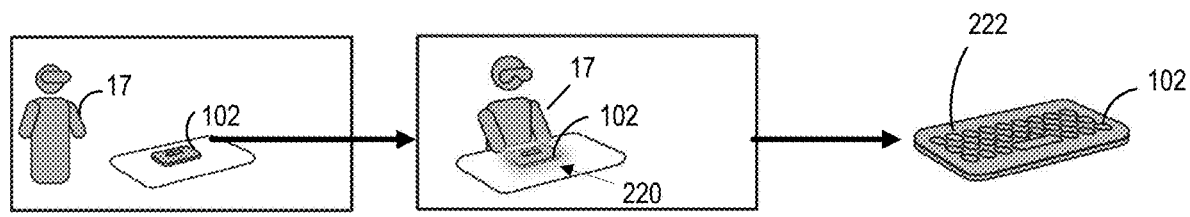
FIG. 16 is a diagram showing an embodiment of the discovery of a peripheral device in an augmented/mixed reality environment.

FIG. 16 is a diagram showing an embodiment of the discovery of a peripheral device in an augmented/mixed reality environment. The user 17 can enter an area or room wearing AR glasses, such as HMD/glasses 19. Keyboard 102 and/or another device (mouse, controller, totem, etc.) is on a table and is initially seen as it is in the real world. Keyboard 102 can periodically broadcast status information, including an indication that keyboard 102, or any other input device or peripheral, is available to work in the AR/MR/VR environment. Alternately, the indication can be based on a trigger or command. The trigger could be the detected proximity of HMD/glasses 19 to keyboard 102, a signal between the two when in range, a voice command or other trigger/command. In embodiments, the trigger can be contextual. For example, the trigger can be in response to an virtual application requiring input from keyboard 102 or mouse 104 (e.g., a message window, working document, video conference acceptance). The keyboard can glow with light 220 to indicate it is available for use in the AR/MR/VR environment. The glow can be an AR image placed on the display of HMD/glasses 19 over the location of the keyboard 102. The location of keyboard 102 is provided by the sensing and tracking systems as described above. Other indicators than a glow could be used. For example, a specific color, design or tag can be superimposed over the keyboard 102. An image could be made to hover over the keyboard, bump the keyboard or bounce rays off the keyboard. The keyboard can be made to appear to emit a searchlight, laser beams, etc.

Keyboard 102 could also indicate that it is not available for use for a variety of reasons, such as being currently paired with another user. This indication could be a different color, such as red, or some other distinct indication.

Alternately, rather than use an AR image to indicate the availability of keyboard 102, the real world keyboard itself can be instructed to flash lights, illuminate keys, etc. to indicate availability. The program controlling HMD/glasses 19 can communicate with the processor for the keyboard 102 to cause a particular illumination pattern.

The same triggering and discovery process can be used with any other user input device or other device that can interact with the AR/MR/VR environment by similarly highlighting or indicating with an AR/MR image, or by causing the real world device to emit light, make a sound or take some other action.

In one embodiment, the user input device automatically pairs with the HMD/glasses 19 for use as soon as the user starts interacting with the user input device. Alternately, pairing can be require some command, such as a spoken command, a user input on a button or other input of the HMD/glasses 19, or an interaction on the user input device. In one example a "use/pair" button 222 is highlighted on keyboard 102. User 17 activates button 222 to pair and/or otherwise begin use. It could also be paired when user 17 places a hand over keyboard 102, as detected by a proximity sensor in the keyboard 102 or by the AR/MR/VR sensing and tracking system. Button 222 could be made to glow or otherwise be highlighted or indicated, in any of the ways described for the keyboard above. In some embodiments, the user input device may automatically pair with the HMD/glasses 19 based on contextual triggers. For example, keyboard 102 may automatically pair with HMD/glasses 19 when a user receives a message window in the virtual environment.

The discovery and pairing can be accomplished using a communication channel between HMD/glasses 19 and keyboard 102 or other user interface device. The communication can use the Bluetooth™ communication protocol, a Near Field Communication (NFC) protocol, RF, IR, WiFi, or any other wireless communication. The communication can be direct, or using a local area network (LAN) or other network.

The keyboard 102, when the user commences using it, could have a default mode of providing inputs to a physical display or virtual display. The default can be user modified, or may be modified based on context. For example, an open program may require the virtual display, or may have last used the virtual display. The physical keyboard may be augmented, such as by superimposing different key indicia. A virtual or on screen keyboard (OSC) can be provided as well, and could be aligned with the physical keyboard. When the user is done with the user input device, the user can release the user input device, or the user input device can be released after a time-out period after the last input on the user input device.

Layering

Figure 17:
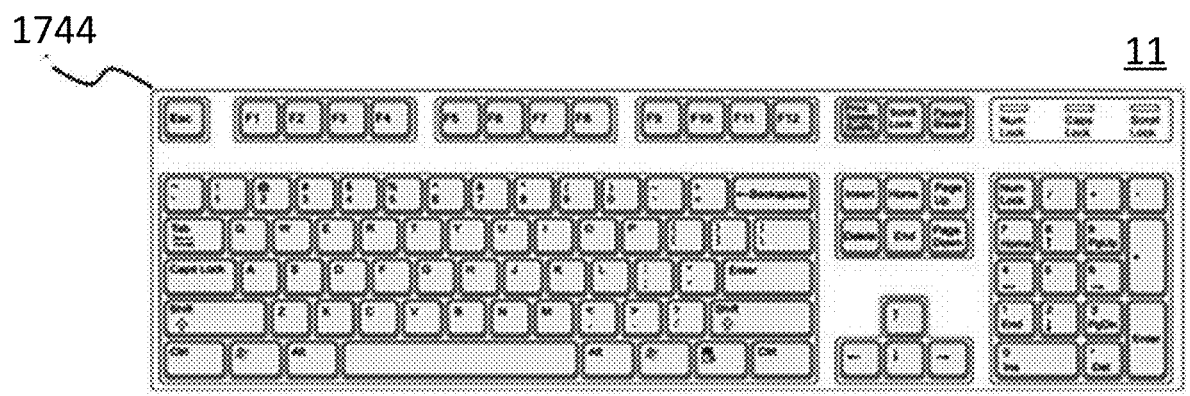
FIG. 17 is a plan view of an embodiment of a user interface device of the virtual reality environment system.

Referring to FIG. 17, an embodiment to interface a user with a computer 15, which may implement aspects of the previously described system or any other embodiment disclosed herein, includes a user interface device 11 including one or more input elements 1744 to interface the user with the graphical environment.

A memory (not shown) is communicatively coupled (e.g. for information transfer) to the processor to store a plurality of different layers 1864 to represent the user interface device 11 in the graphical environment and/or a field proximal the user interface device 11 and/or a body part 17 interfacing with the interface device 11. The processor may provide in said instructions one or more of the layers, e.g. the one or more different layers included in the instructions are selected from the plurality of different layers 1864. In various embodiments, the layers can be sent to a processor in a host, an HMD, a user input device or other peripheral, a graphics processor, or any other location where the layers can be assembled and/or modified.

As used herein the term "layer" in reference to the graphical environment may refer to a two or three-dimensional representation of an object in the real-world and/or the virtual reality environment. The layer may be rendered from an image of a real-world object (which may be provided from the camera system) or otherwise representative, including by augmentation. Layers could be 3D models or other representations and stacking layers can include adding more elements, such as animations, processing steps, finer details, etc.

Referring to FIG. 17, a real-world representation of the user interface device 11, which implements aspects of the previously described user interface device 11 or any other embodiment disclosed herein, is arranged as a computer keyboard. The keyboard 11 includes input elements 1744 of the I/O system to interface the user with said graphical environment. The input elements 1744 are arranged as mechanically actuatable keys. In variant embodiments not illustrated there may be any number of input elements, e.g. one or more. Moreover, said input elements may take other forms include those disclosed herein. Input elements can be peripherals which provide enhanced functionality, such as a wheel that has input elements, or a joystick that has buttons and other input elements.

In one embodiment, a user input device 11 is graphically represented as a series of "overlays" that are displayed in the virtual reality environment to the user on top of one another. The layers modularize the processing and modification of the virtual representation. A layer could be the surface area surrounding a keyboard, a layer can be the enlarged alphanumeric characters, a layer could be highlighting the alphanumeric characters the user is hovering over, a layer could be the hands of the user (semi-transparent, maybe only parts of the hands, etc.), The layers are contextually relevant, meaning they will and can change retroactively based upon the current virtual reality context. In one embodiment, a user, in the VR environment, may separate the peripheral from the layers, expand the layers to see what has been augmented, and customize based upon their preferences.

In one embodiment, a 5 layer setup is used: (1) background; (2) camera/keyboard alignment; (3) virtual key caps; (4) hands; and (5) activated key highlights. The keys may be highlighted in a number of ways, including highlighting on the key, above the key, enlarging the key, or outlining the key (highlighting the borders of the key). These could be combined, such as by highlighting the key without moving to above the key, but combined with enlarging the key.

Layers which fit to the shape of the real physical keyboard have been added to augment the keyboard in the virtual environment and make keycaps more visible and useable. Layers allow for a level of visual feedback (lighting up the augmented image of the key, in a variety of ways) when a key is pressed, as well as transforming the keyboard into a completely new augmented offering—like the emoji keyboard mentioned above, as well as solving localisation issues.

The layers can be superimposed over a video image of the actual keyboard or other device from a camera. The alignment can be enhanced by searching for unique shapes on the keyboard, such as corners, a special alignment feature such as a cross-hair on a corner, or the activation of elements of the keyboard, such as lighting a key, frame, or other part of the keyboard and informing a tracking system of what has been illuminated. The layers can be calibrated and aligned by using multiple recognized points, and aligning them in x,y,z space. The detection of a key press or other event could trigger a retroactive alignment. A keyboard or other device can be manufactured with features that enhance detection and alignment, such as lighting around the edges, high contrast between the keys and frame, etc. Also, particular key presses can be relayed back to the tracking system, so the fingertip and key being depressed can be identified from the image and used to update the alignment. Precision alignment can be prioritized in some embodiments for X, Z dimensions, and yaw, pitch rotation. There is typically less impact on alignment for the Y dimension, and roll is constrained for flat surface usage.

In one embodiment, the opacity or transparency of each layer is adjusted initially or dynamically to provide an optimum image. For example, the key indicia may be made bright enough to show through a finger when it is pressed, but not otherwise. In addition, or alternately, the finger can be made transparent enough to make sure the key indicia light can be seen through it.

Figure 18:
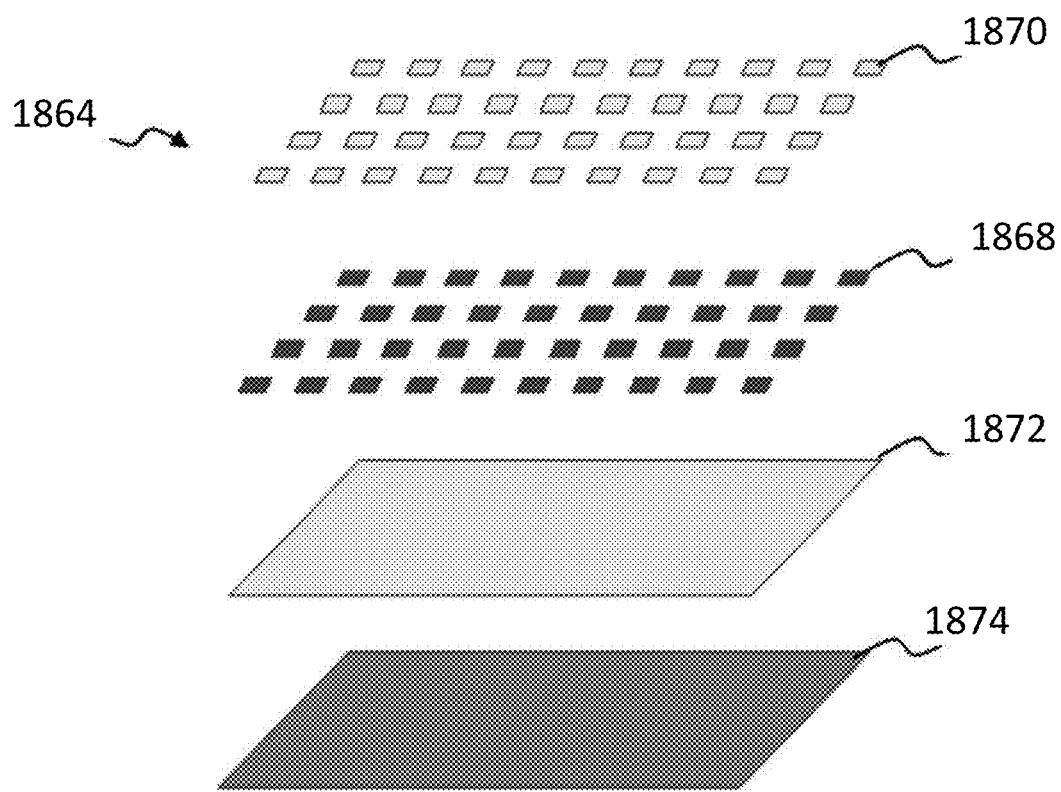
FIG. 18 is an exploded diagram showing the layers of an embodiment representation of the user interface device of FIG. 18.
Figure 19:
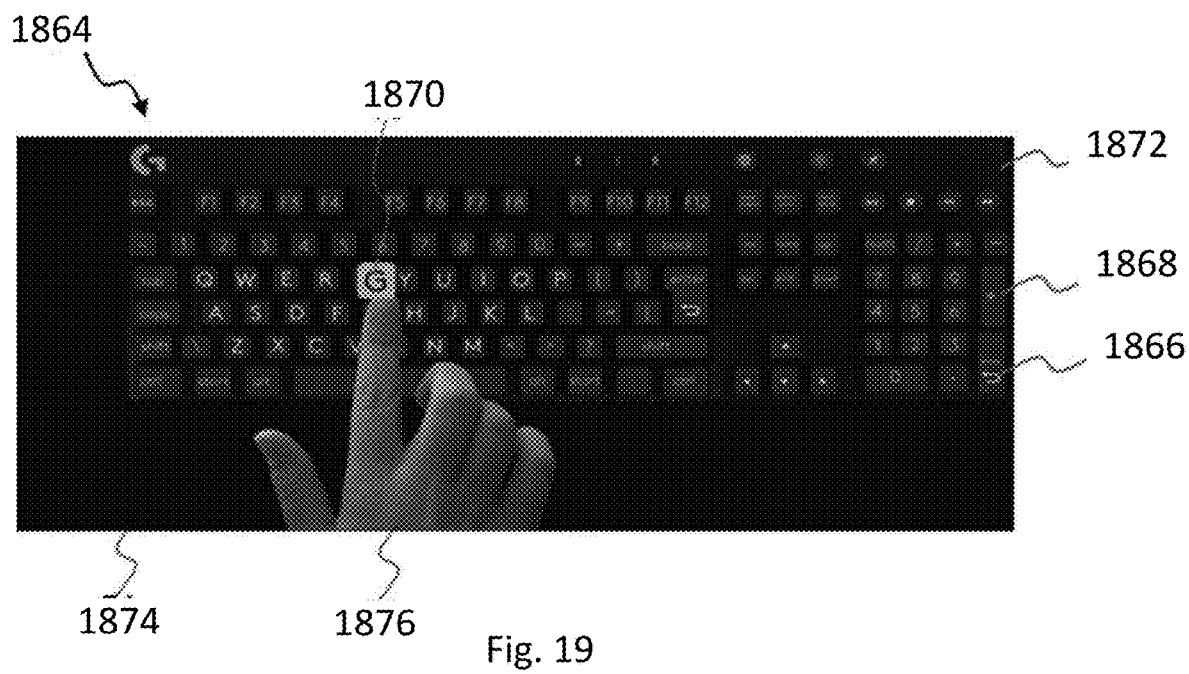
FIG. 19 is a schematic diagram showing an embodiment graphical environment to represent the user interface device of FIG. 17.
Figure 20:
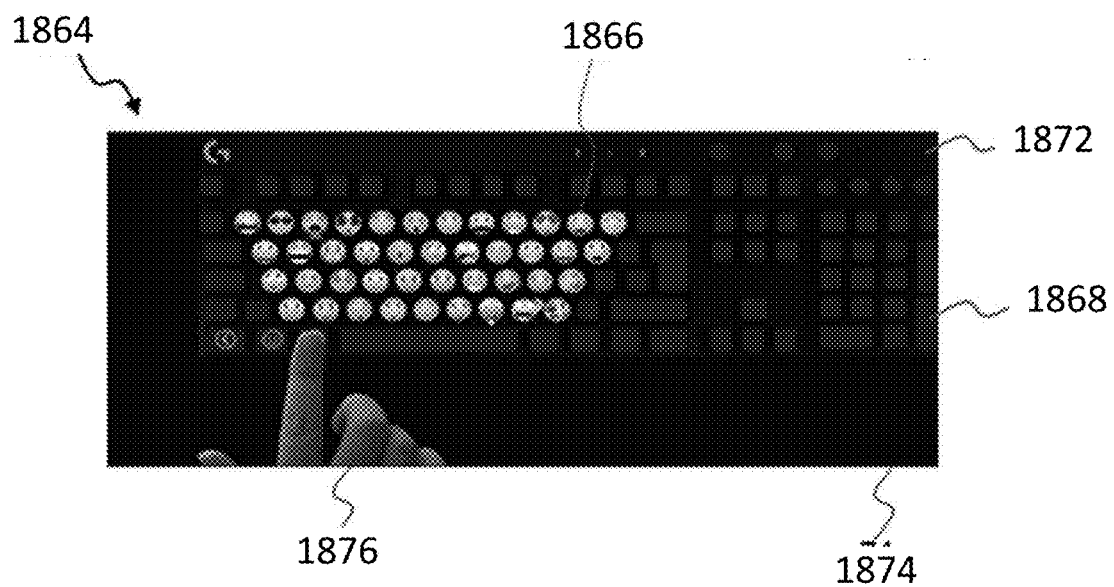
FIG. 20 is a schematic diagram showing an embodiment graphical environment to represent the user interface device of FIG. 17.

When a transition between XR states (VR, AR, MR, etc.) occurs due to a trigger, the transition is implemented by providing or removing representations of real objects, such as a user interface device, in the XR environment. The representations are constructed with various layers, which allows a variety of different types of transitions depending on the need or context. For example, one or more layers for a user input device may fade in and out, or otherwise gradually transition between XR states. In one example, the body of a keyboard may fade out after a period of non-use or removal of a user's hand, while a layer containing the keycaps remains visible longer. Referring to FIGS. 18-20, in one embodiment the layers 1864 to represent the keyboard 11 include one or more of the following: an indicia and input element layer 1868 to represent one or more of the input elements and the indicia on the input elements as shown in FIG. 19 (alternately a separate indicia layer 1866 may be used to show the indicia separately from the input element, such as a key indicia, as shown in FIG. 14); a feedback layer 1870 to provide user feedback of a state of the one or more input element; a device body layer 1872 to represent a body of the keyboard 11. A proximal layer 1874 represents a field proximal the user interface device 11 (e.g. the work surface, desktop, a mat or pad. Whilst the exemplary embodiment provides a computer keyboard, it will be understood that the embodiment layer representation can be implemented with other user interface devices, including those disclosed herein.

The indicia layer 1866 includes indicia to represent an input function associated with the or each input element 1844 (the input function may be stored by the memory coupled to the processor). Referring to FIG. 19 the indicia layer 1866 comprise indicia as alphanumeric and other symbols. Referring to FIG. 20 the indicia layer 1866 comprise indicia as emoji. In embodiments, which are not illustrated, other indicia of other indicia layers 1866 include gaming macros (G-keys), 'hot' keys.

Referring to FIG. 20 some of the indicia of the indicia layer 1866 comprise the equivalent indicia to the indicia of the real-world user interface device 11 of FIG. 17 (e.g. the alphanumeric symbols) and some of the indicia of the indicia layer 1866 are augmented or changed based on context, such as automatic triggers or user commands. The augmented or changed indicia thus comprise different indicia to the indicia of the real-world user interface device 11 of FIG. 17 (e.g. the windows key and the enter key). Referring to FIG. 20 the emoji are different indicia to the indicia of the real-world user interface device 11 of FIG. 17. Accordingly, in embodiments the equivalent and/or different indicia are mapped onto the indicia layer as on the real-world user interface device 11.

In embodiments where an input element does not provide any function in the virtual reality environment no indicia may be provided in the indicial layer 1866, e.g. referring to FIG. 20 the input elements peripheral to those associated to the emoji do not have indicia. For example, the edges of the case of a keyboard may not have keys. In one embodiment, non-functional areas may be changed in appearance or have functionality added. Also, keys not currently usable in a given mode may be modified. For example, if the windows key isn't relevant, the windows key can be changed to something the user might deem useful, which in turn inherently means the functionality of the keyboard needs to be modified as layers are incorporated.

In an embodiment, which is not illustrated, the real-world user interface device 11 does not include any indicia associated with the or each input element, wherein as part of the virtual reality environment the indicia are specified by the indicial layer 1866. Examples of such a user interface device 11 include a keyboard that has keys without any symbols or a touch pad that has the indicial layer 1866 specified to represent keys.

Other user input devices or peripherals may be represented by the same or different layers. For example, a mouse may be represented by an input element layer to represent the mouse buttons and scrolling wheel. A feedback layer modifies the appearance of the input element layer, such as by highlighting the button pressed, enlarging the button or scrolling wheel, A device body layer represents a body of the mouse, which can have its color, shape, etc. changed in the virtual reality environment. These layers can be curved, to correspond to the shape of the mouse. The layers can be continuous or discontinuous, and each layer can be broken into different, separately controlled and displayed portions, or multiple layers could be combined. A proximal layer represents a mousepad or work surface. Similar layers can be provided for a joystick, gamepad, steering wheel, or any other user input device, peripheral or object.

It will be understood that the function of the input element is linked to the associated indicia of the indicial layer, e.g. as different indicial layers 1866 are transitioned the function is correspondingly transitioned. For example, if alphanumeric keys are changed to emoji, the pressing of those keys by the user causes an emoji to be typed, not the alphanumeric character. Other augmentations or changes, such as highlighting or enlarging a key, do not change the function of the key. In one embodiment, changing the functionality of the input element is based on context.

In one embodiment, the layers are deconstructed from a camera image, suitably manipulated and augmented, then combined again for display in the virtual reality environment. This may be done as an initialization step, or periodically, such as after detecting the location of the user input device has changed. Alternately, stored images of one or more layers may be combined with the camera image of the input device, based on the obtained model number of the user input device. In one embodiment, the camera image is only used to determine location and movement, and the layers are entirely generated from a pre-stored image.

It will be understood that the input element layer 1868 may be configured in a similar manner to the indicia layer 1866, e.g. with some or all of the input elements 1744 of the real-world user interface device 11 represented in the input element layer 1868. In embodiments the input elements may be represented in a different manner to their arranged in the real-world, e.g. some input elements may not be represented in the input element layer 1868 or some input elements with the same function may be combined as a larger input element in the input element layer 1868.

The feedback layer 1870 may provide user feedback of a state associated with of the one or more input element 1744 that may be represented in the input element layer 1868 and/or the indicia layer 1866. The state may include that the associated input element 1744 has been interfaced with (e.g. selected) or is contemplated for interfacing with by the body part of user 17. Interfacing and/or contemplated Interfacing of the input element 1744 may be determined by the associated sensor of the I/O system and/or the sensor system 9 (including a sensor system operatively connected to the user interface device 11, which may include a camera system and/or capacitive sensing system).

As user herein the term "contemplated interfacing" or "contemplated for interfacing" or "contemplated for selection" may refer to a user body part arranged in operative proximity to select or otherwise interface with an input element, e.g. a finger of a user hovers over a key prior to selection.

Referring FIG. 19, the feedback layer 1870 includes a highlighted and enlarged representation of an associated input element and indicia (represented by the input element layer 1868 and the indicia layer 1866) of an input element that is contemplated for section by a body part (represented by a body part of a body part layer 1876). In embodiments the feedback layer 70 may implement various visual indicators of interfacing or contemplated interfacing, examples of which include one or more of the following: highlighting; lowlighting; enlargement; reduction; a colour change, of all or part of a graphical representation of an associated input element and/or indicia.

The device body layer 1872 may represent any portion of a body of the user interface device 11, including a peripheral surface (e.g. which forms a planform visible in use of the device to the user) and/or a cross-sectional portion of the device. A planform is the contour of an object as viewed from above.

Figure 21:
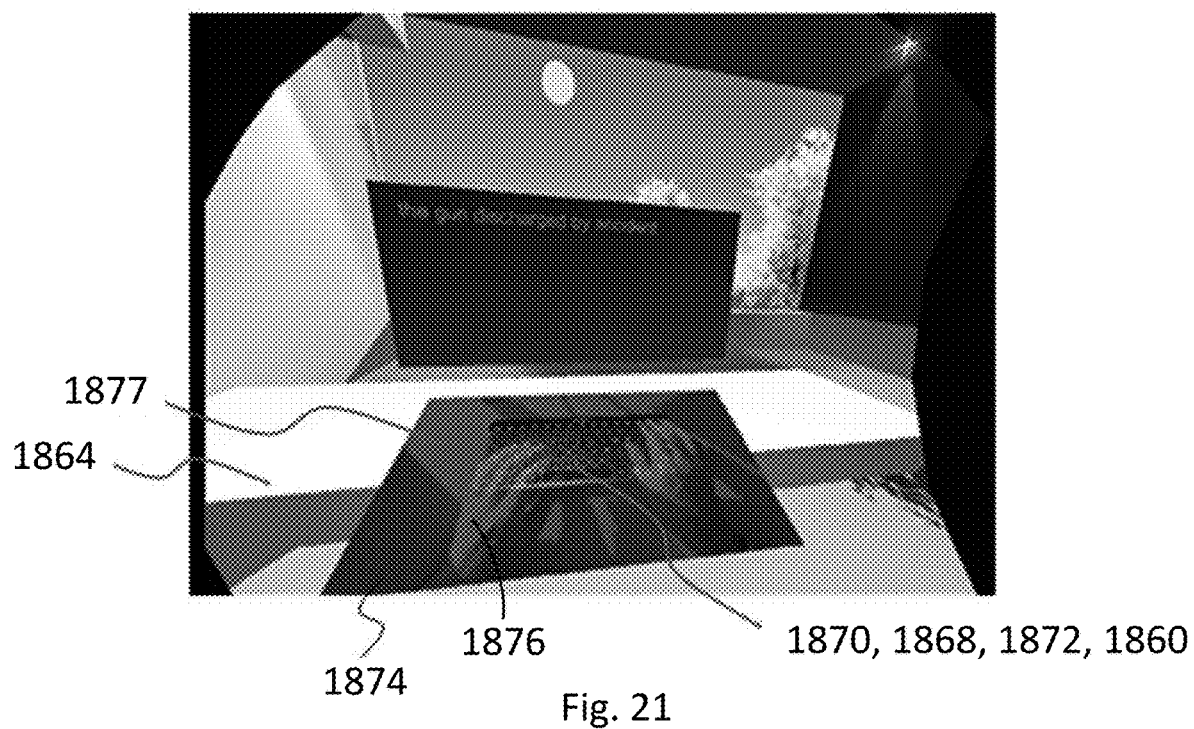
FIG. 21 is a schematic diagram showing an embodiment graphical environment to represent the user interface device of FIG. 17.

Referring FIGS. 19-21, the device body layer 1872 represents a planform surface, which is visible in use of the body of the keyboard 11, and is arranged around the input elements 1744 thereof.

In embodiments, which are not illustrated, when representing other user interface devices 11, the body may include a wheel of an electronic steering wheel or a stick and/or base of a joy stick, a mouse, speaker, or any other user input device, peripheral or object. In an embodiment the device body layer 1872 represents only an operative portion of the user interface device 11, e.g. only the numerical entry portion of the keyboard 11 is represented. In an embodiment the body layer 1872 represents an alternative device other than the real-world user interface device 11, e.g. the keyboard 11 is represented as an alternative peripheral device such as a game controller.

Referring to FIGS. 17-21 the layers 1864 include a proximal layer 1874 to represent a field proximal the user interface device 11 as defined herein (e.g. the work surface, a mat or pad, etc.). The proximal layer 1874 may thus include a representation of any of the previously described objects that may be arranged in said proximal field. In embodiments the proximal layer 1874 may include environmental media 1877. Referring to FIG. 21, the environmental media 1877 includes light and/or shadows present in the real-world environment, including from daylight, room lighting or other ambient light. The objects and environmental media 1877 and may be determined by the sensor system 9.

Referring to FIGS. 18-21 the layers 1864 include a body part layer 1876 to represent a body part 17. The body part may be represented in the body part layer 1876 as discussed previously. A layer can be provided that is responsive to motion, such as an interactive space which allows users to manipulate objects (e.g., totems or VR images), using the sensor system.

Various layers 1864 are superposed on each other. Referring to FIG. 21 the body part layer 1876 is represented as partially transparent, through which other layers are visible. Accordingly, in embodiments or more of the layers 1864 may by represented as partially transparent, wherein: a partially transparent layer may be superposed on another layer (which may be another partially transparent layer or a solid layer); and/or a layer (which may be a solid layer) is superposed on a partially transparent layer.

In an embodiment one or more of the layers represent different positions of a depth direction associated with the user interface device 11, e.g. a solid base layer is superposed by other layers of increasing transparency based on depth. For example, the desktop or environment layer need not be seen at all beneath a key and indicia layer. In general, it is desirable to have the top layers most visible, and thus least transparent. Alternately, as described above, the layers correspond to different functions, such as input elements or keys, which may extend down inside another layer, such as a device body layer.

In embodiments various combinations of one or more of the layers 1866-1876 or other layers are provided in non-transitory computer-readable media accessed by instruction running on a processor. In an embodiment one or more of the layers 1864 are stored on a memory of the user interface device 11, and may be transferred to the computer 15 for processing. In an embodiment one or more of the layers 1864 are stored on a memory associated with the computer 15 and are obtained following identification of the user interface device 11, e.g. by means of a database, which may have a key-value or other suitable implementation. The user interface device 11 may be identified by techniques including one or more of the following: transmitting a unique identifier to the computer 15 (which may be used as the key);

by image processing of an image, which may be obtained by the camera system; a positioning system as previously discussed.

In embodiments, the host and local processors 198, 168, 184 (see FIG. 13) partially or fully generate one or more of the layers based on images of the user interface device 11, which may be obtained from the camera system. In an embodiment the user interface device 11 may be adapted to facilitate said generation of the one or more layers. Said adaption may include the formation of a non-reflective surfaces and/or surfaces which are convenient to identify.

In an embodiment the processors include in said instructions the one or more layers 1864 arranged representative of the real-word arrangement of the associate object. The body part layer may include representative arrangement of the body part 17 based on the determined real-word arrangement of the body part 17. The body part of the body part layer and the layers representing the user interface 11 may be arranged an equivalent position to that in the real-world, including in the field of view in the graphical environment equivalent to that in the field of view in the real-world environment. The sensor system 9 for determining the real-world arrangement of the body part 17 and/or user interface device 11 may be operatively connected to the user interface device 11 as previously discussed.

In an embodiment one or more of the layers 1864 are user customisable, an example includes the indicia of the indicial layer 1868 may be selected by the user and/or the configuration of the feedback layer 1870 may be selected by the user.

In an embodiment one or more of the layers 1864 is fitted to the real-world arrangement of a portion of the user interface device 11, an example includes the Input element layer 1868 fitted to keys of a keyboard, the body layer 1872 fitted to the periphery of a keyboard.

In embodiments the instructions of one or more of the processors described above (host, HMD, input or peripheral device processor) may include a transition of one or more of the layers 1864 based on a trigger. "Transition" may refer to changing the representation of one or more layer from a first representation to a second representation (e.g. in the instance of the indicia layer 1866 a first representation may include the indicia as alphanumeric and other symbols as shown in FIG. 19 and the second state may include the indicia as emoji as shown in FIG. 20). In an embodiment the trigger includes one or more of the following (which may be determined by the host or local processor).

A configuration of the user interface device 11, which may include determination of a type of user interface device 11. The type of the user interface device 11 may be determined by identification of the user interface device 11 as discussed previously. The type of the user interface device 11 may relate to the form factor of said device.

An arrangement of the user interface device 11, which may include a location of the user interface device 11. Examples of location include the arrangement of the user interface device 11 on a work surface (e.g. a keyboard) or held by the user (e.g. a game controller). Arrangement may include the real-world arrangement of the user interface device 11, including an orientation of the device. The orientation may be relative to a reference point (e.g. the HDM 19 or other element of the user), examples include an orientation of the device which may be defined by an alignment of a longitudinal axis of the user interface device 11 (e.g. aligned vertically or pointing away from the user).

A proximity of an object associated with the system 13. Proximity may be with reference to the user interfaced device 11, e.g. the proximity of the object to the said device 11 (which may be determined using the sensor system 9 arranged on the user interface device 10). The object may be as previously defined. Proximity may include the previously defined proximal field. An example includes the user interface device 11 arranged in operative proximity an object arranged as an interoperable user interface device, wherein input element functionally its transferred/shared between the devices.

A contextual event, which may be related to the virtual reality environment (e.g. a particular stage in a VR game) or other computer implemented notification including the receipt of a message or email). A contextual event may also include the environmental media 1877.

A user interaction with the system, which may include a gesture that may be made by fingers/hand. The gesture may include a characteristic movement of the hand, including a hand swipe or finger moment (e.g. to press an input element). The gesture may include a characteristic shape made by the hand, such as natural hand movements for grasping, pointing, pulling apart, etc. An example of a gesture includes a moving their finger to make a selection of an input element 1744 of the user interface device 11. In other embodiments, the user interaction includes input determined from the I/O system of the user interface device 11 via the user interfacing with of one or more of the input elements 1744.

User configured, which may include the user configuring the configuration of one or more of the layers 1864 and/or their transition.

Inclusion and transition of the one or more of the layers 1864 in the instructions based on a trigger will now be exemplified for the various triggers defined above.

In an embodiment instructions for one or more of the layers 1864 may be triggered based on the user interface device 11 being identified, e.g. as a game controller or keyboard or other user interface device. One or more of the indicia layer 1866, input element layer 1868, feedback layer 1870, device body layer 1872 may be configured to overlay the real-world device.

In an embodiment instructions for one or more of the layers 1864 may be triggered based on the user interface device 11 determined as arranged on a work surface, e.g. the proximal layer 1874 is arranged to represent the work surface, as previously discussed.

In an embodiment, for a keyboard 11 (or other user interface device) determined as transitioned from abutment with a work surface to being held by a user, the instructors for the one or more of the indicia layer 1866, may be accordingly transitioned (e.g. to represent input elements 1744 with reduced functionality) since a user may be unable to use both hands to type.

In an embodiment, instructions for one or more of the layers 1864 may be triggered based on other user objects determined as in the proximal field the user interface device 11 (e.g. by the previously described sensor system 9 arranged on the user interface device 11). In an embodiment, wherein the objects are interoperable user interface devices, one or more of the indicia layer 1866, input element layer 1868, feedback layer 1870 of the user device 11 may be transitioned as input function is transferred to/from the interoperable user interface devices, e.g. a joy stick wheel is arranged proximal the keyboard, wherein the keyboard transfers/shares functionality of the cursor keys to the stick).

In an embodiment the proximal layer 1874 is transitioned to represent objects therein. In an embodiment one or more of the objects are represented by layers 1864 as defined herein in a similar manner as for the user interface device 11.

In an embodiment the virtual reality environment or notification that requires alphanumeric entry and one or more of the indicia layer 1866, input element layer 1868, feedback layer 1870 (or other layer) is transitioned to represent input elements for said alphanumeric entry.

In an embodiment a gesture (e.g. a swipe) is used to transition the indicia layer 66 as alphanumeric and other symbols as shown in FIG. 19 to the indicia as emoji as shown in FIG. 20. It will be understood that various gestures may be used to transition of one or more of the layers 1864 to various representations.

Figure 22:
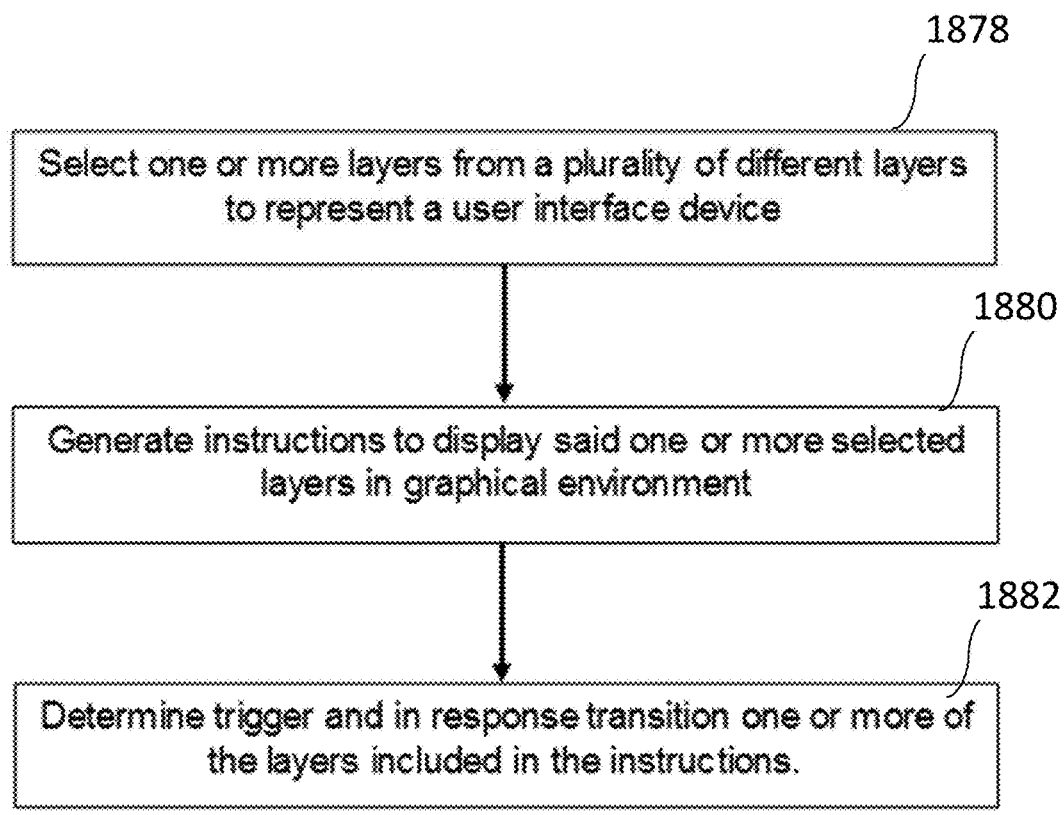
FIG. 22 is a flow chart showing an embodiment process for interfacing a user with a computer of the virtual reality environment system.

Referring to FIG. 22, process of interfacing a user with a computer, which may be implemented by the processor may include at block 1878 selecting one or more layers from a plurality of different layers 1864 to represent a physical user interface device 11 in graphical environment of a virtual or augmented reality virtual reality environment. The process may include at block 1880 generating instructions to display said one or more selected layers in the graphical environment. At block 1882 the method may include determining a trigger and in response transitioning one or more of the layers included in the instructions.

Surrounding Area Images and Perspective Adjustment

Figure 23:
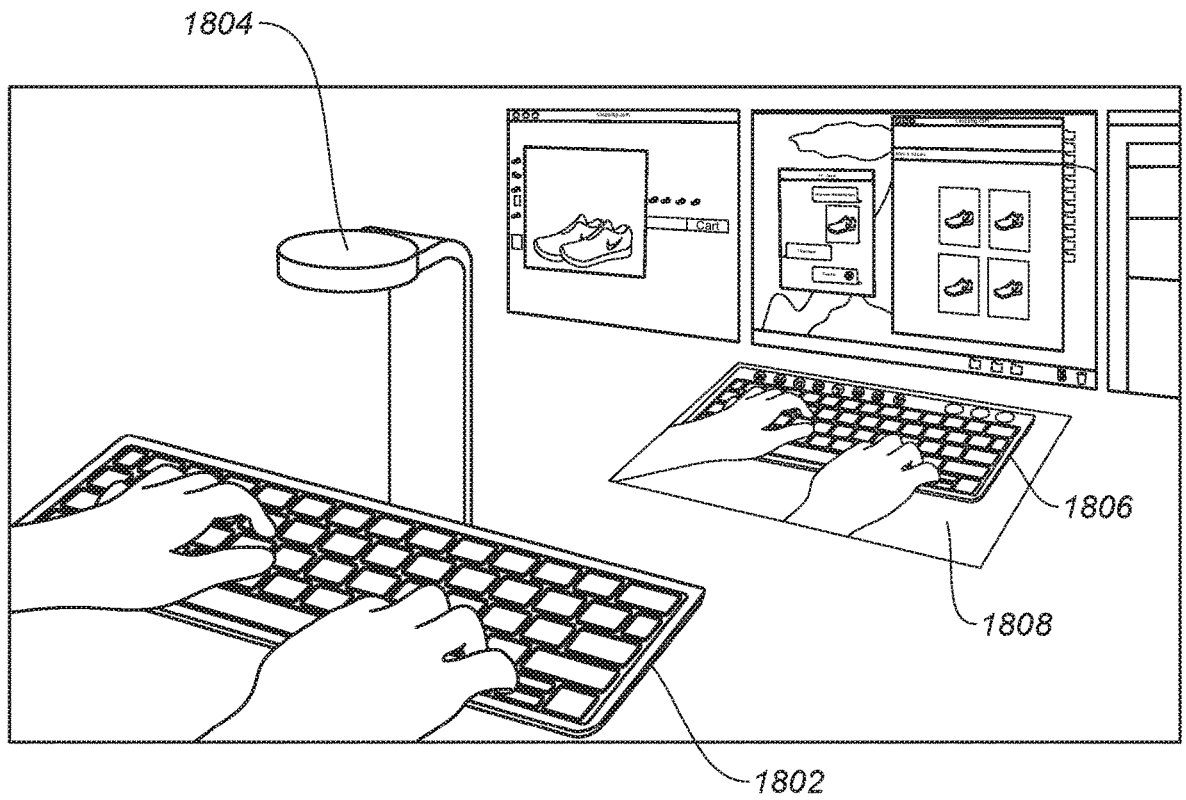
FIG. 23 is a diagram illustrating an imported keyboard and surrounding area window to a VR environment according to an embodiment.

FIG. 23 is a diagram illustrating an imported keyboard and surrounding area window to a VR environment according to an embodiment. A camera 1804 is shown positioned over a real world keyboard 1802. The camera view is imported into a virtual display, where keyboard image 1806 is shown, with layering (e.g., emojis on the top row). The user's hands can also be seen. The camera view also picks up the area of the desk or other surface around the keyboard, such as an area 1808. This area can be also used for additional features.

Figure 24A:
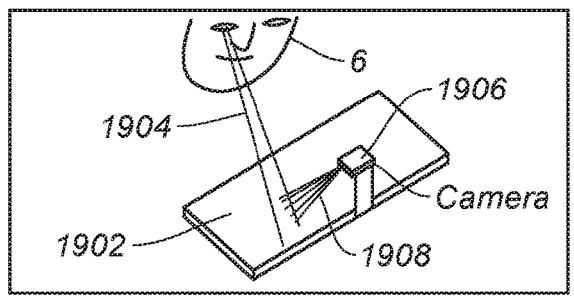
FIGS. 24A-C are diagrams illustrating transforming perspective between a camera and eye perspective according to an embodiment.
Figure 24B:
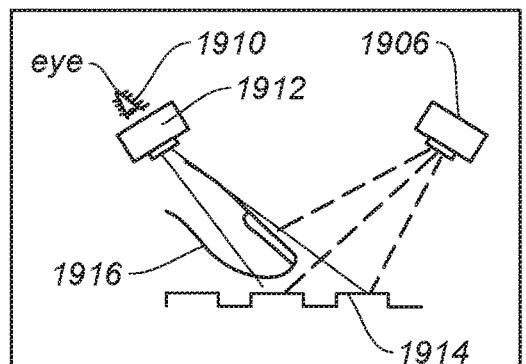
Figure 24C:
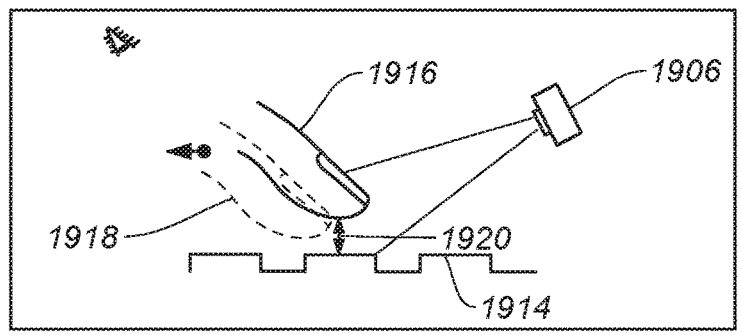

FIGS. 24A-C are diagrams illustrating transforming perspective between a camera and eye perspective according to an embodiment. As illustrated in FIG. 24A, a keyboard 1902 is viewed by a user 17 with a perspective 1904. Camera 1906 has a perspective 1908, which is at a different angle. Simply importing the camera perspective into the VR environment would be disorienting to a user. Thus, in one embodiment, the image is processed and shifted to better match the perspective of the user.

FIG. 24B shows a user's eye 1906, and the ideal position of a camera 1912. However, a camera 1912 would block the user's real world view, and may interfere with the user's hand movement when the user is wearing a HMD. Attaching the camera 1912 to the HMD would provide the right perspective, but only if the user is looking down at the real world keyboard. Preferably, the virtual keyboard is located higher, near the displays as shown in FIG. 23, and the user will often be looking at the displays, not the virtual keyboard. In one embodiment, camera 1912 can be located on a movable arm such that it can be moved to a position out of the user's view when the user is operating the keyboard without the HMD, and the user can move it to the position shown for camera 1912 when wearing the HMD.

However, to avoid the user moving the camera around, camera 1906 can be used, with its different perspective on keys 1914 of the keyboard 1902. Camera 1906 can capture a 3D view of the keys. The scene can then be transformed so that the keys 1914 and keyboard 1902 are rendered on the HMD display from the perspective of a camera 1912. This will produce a keyboard layer, over which a hand layer can be superimposed. The keyboard layer can be generated upon calibration, before the user begins operating the keyboard. In one embodiment, the keyboard layer is generated as part of the manufacturing process, and the shifted keyboard view is stored in a memory of the keyboard, or is provided with software accompanying the keyboard to be loaded into a memory of a computer or HMD.

Further calibration and set-up can be done when the user sets up the keyboard. Each time the user begins to operate the keyboard, the camera 1906 will pick up a view of other objects around the keyboard, such as potentially a mouse, notepad, etc. The perspective of those objects can then be rendered to approximate the perspective of the user's eye. In one embodiment, the position of the HMD relative to camera 1906 is determined from a camera in the HMD, a lighthouse tracking system, or ultrasound or other sensors and emitters between the HMD and camera 1906. The rendering from the perspective of the user's eye can then be adjusted based on the measure HMD position compared to the assumed HMD position used for the manufacturing calibration.

FIG. 24C illustrates that the 3D view captured by camera 1906 enables a determination of the height 1920 of the user's finger 1916 off of keys 1914. The height of the finger can be dynamically measured, and the image of the keyboard provided for the AR environment can shift the position of the finger to a position 1918, which is closer to the user and thus closer to the user's perspective.

State Transition Visual Metamorphosis

Figure 25:
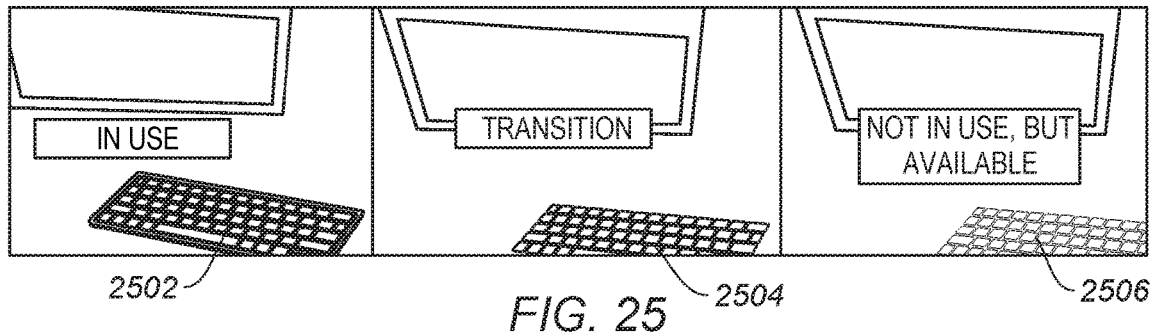
FIG. 25 illustrates one embodiment of a metamorphosis of an User Interface Device (UID) during a state transition.

FIG. 25 illustrates one embodiment of a metamorphosis of an User Interface Device (UID) during a state transition. Typically, when entering the Augmented Reality (AR) state from a Virtual Reality (VR) state, it is desirable to have the UID appear instantly, since the user has indicated a desire to use it. When transitioning back to the VR state, however, it may be desirable to have a gradual transition, for example by fading out the image or otherwise reducing the image (the image is the visualization of a tracked device, which can be a flat image, a 3D model or any other type of representation). FIG. 25 first shows a keyboard image 2502 while the keyboard is in use. When the keyboard has not been used for some time, the image may be faded or reduced to just showing the keycaps 2504, and not the whole keyboard body. This can be done by removing the keyboard body layer. After a further passage of time without keyboard use, the image 2506 is presented, with a faded version of the key caps layer. Multiple types of effects can be applied upon a transition. For example, in addition to fading, selective contouring could be used, changing from RGB (color) to black and white, etc. Other visual effects that reduce overall visibility could be used. The transition can be in stages. For example, the whole keyboard or other input device or peripheral or object could go to 40% transparency, then 90% transparency for a second stage.

Figure 26:
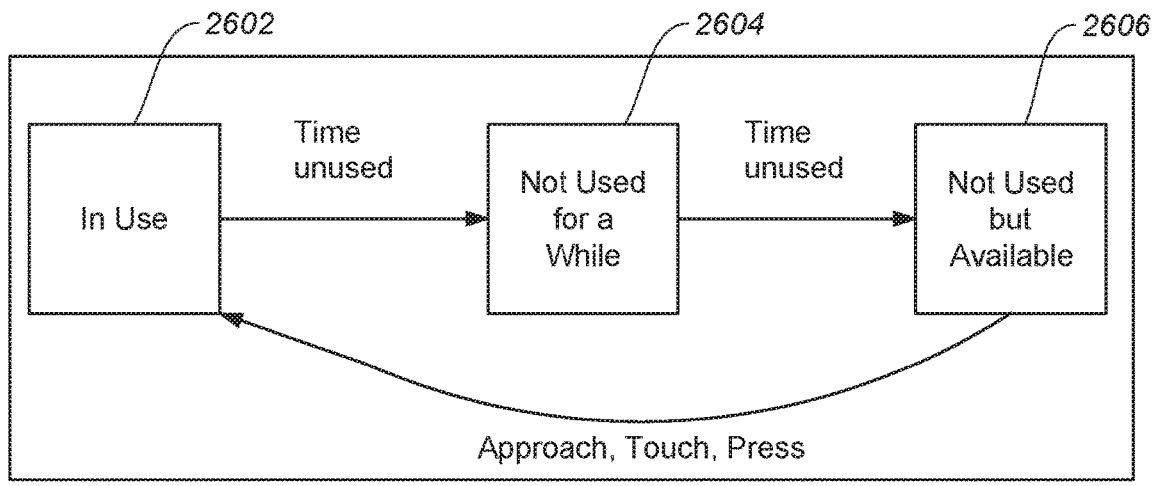
FIG. 26 is a flowchart illustrating a state transition.

FIG. 26 is a flowchart illustrating a state transition. The keyboard (or other input device) is first determined to be in use, in step 2602. It is determined if it is unused for a period of time (2604), which can dictate a fading of the image or removal of a layer, such as the keyboard body layer. The determination that it is not in use may comprise the combination of no key touch detected for a period of time (or other input touch, such as mouse movement, touch pad movement, etc.), and also no proximity of the user's hands to the keyboard. The position and orientation of the user's head, as determined by the HMD sensors, can be another input to determining when to transition, as well as the context of an application, game, etc. In one variation, two transition states, or metamorphosis conditions, may be displayed. The absence of a key touch for period of time could cause a fading of the keyboard, or a blinking highlight, to warn the user it is about to fade away. The user can then move the hands away to complete the transition and indicate that the keyboard should go away. Alternately, the user may touch a key to keep the keyboard available. For example, the lack of a key touch for 10 seconds-1 minute may trigger an image change. If there is both the lack of a key touch and the lack of proximity, that can accelerate the transition in one embodiment, such as to 5-20 seconds. Alternately, if the user moves the hands away after a an image change (fading, blinking, etc.), that can accelerate the transition, such as to 0-5 seconds.

A transition from the not used state (2606) back to the in use state (2602) can occur upon an approach by the user, a touch of an input element, or a press or other activation of an input element, such as a tap or slide. An application can also decide to awaken the keyboard or other input device or peripheral based on context, such as if the user moves a cursor to a text input field for example. Applications and their context are also a criteria to activate/dim or otherwise vary the image of the keyboard or other input device or peripheral. Different reappearance images may be used, such as a highlighting of the outline of the input device upon an approach, a showing of the key caps or other input elements on a touch, and highlighting of a particular indicia of a key upon a key press.

Interaction of Layers.

Figures 27A, 27B, 27C:
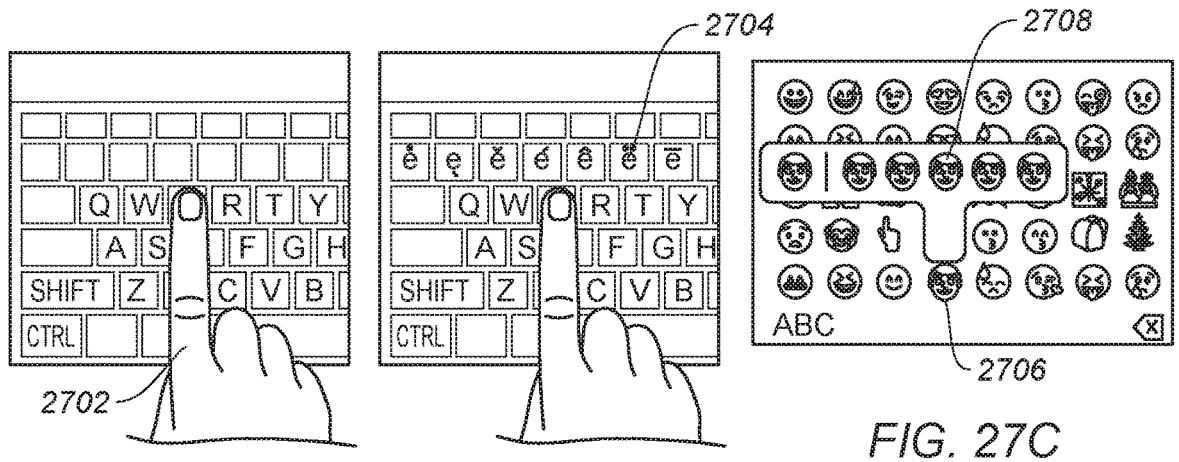
FIGS. 27A-C illustrate a key indicia layer being below a hand layer.
Figure 28:
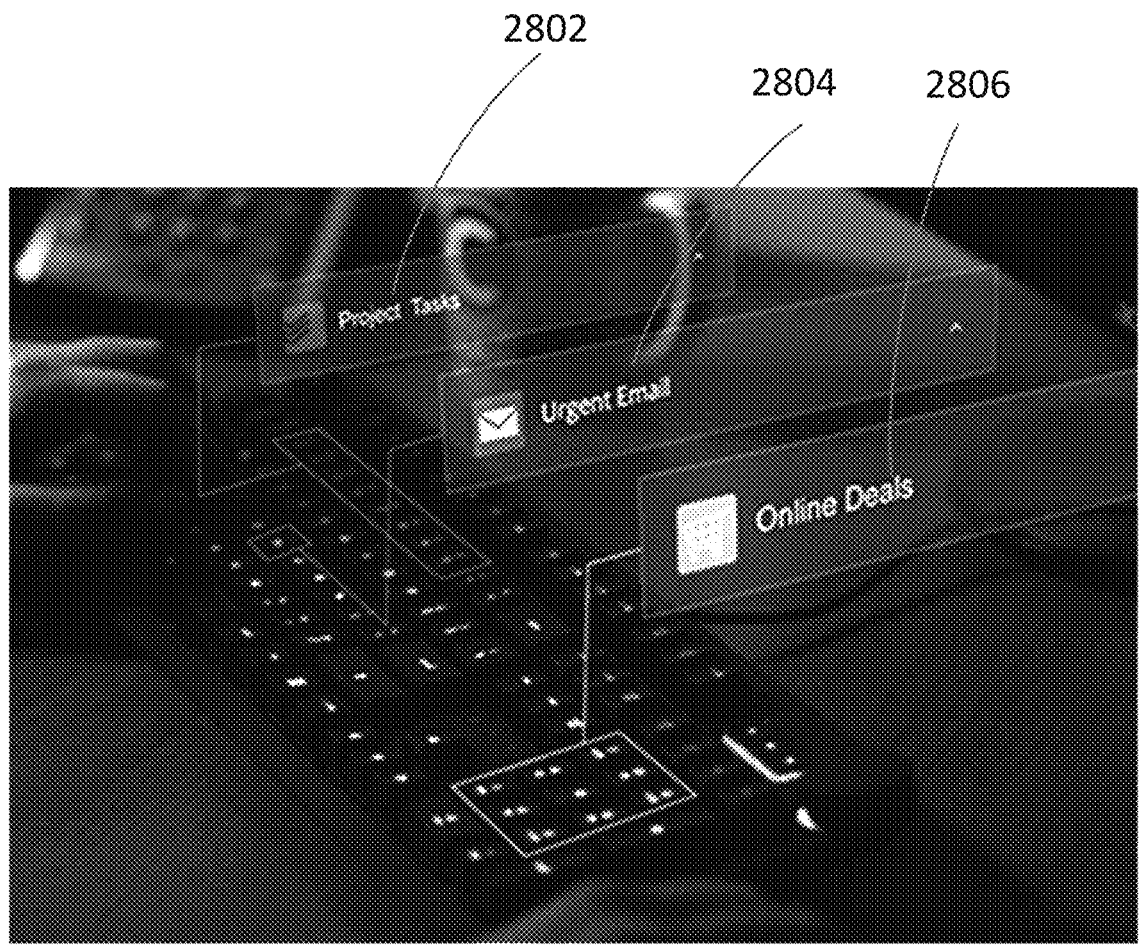
FIG. 28 illustrates a key indicia layer above the hand layer.

A transition between states can involve the interaction of layers. For example, one layer may move above another. FIGS. 27A-C illustrate a key indicia layer being below a hand layer. FIG. 28 illustrates a key indicia layer above the hand layer. As shown in FIG. 27A, a user's finger 2702 touches the "E" key. In one embodiment, a long press of key 'E', or long touch over the 'E', results in the appearance of additional key options that the user may select (similar to long press for an On Screen Keyboard (OSK)). This could be context aware, so that those options only appear when needed. As shown in FIG. 27B, the number keys above the 'E' key are replaced with variations of the 'E,' such as an E with an accent, caret, etc. In one embodiment, the overlay is placed over a portion of the next row of keys above the selected key, or on the keyboard body if a top row key is selected. Alternately, a bubble can appears, such as shown in FIG. 27C. Pressing an emoji 2706 brings up variations of the emoji in a bubble 2708. These images may all be in the keycap layer, below the hand layer. The images could also be on a layer that appears only above the key and whose size is limited to the content shown. It could also be tilted and reoriented to show a clear distinction between the keyboard layer and these new options unlocked by a long key press. The additional character/emoji are selected differently on a physical keyboard or other input device with fixed keycaps or other fixed input elements than on a touchscreen where one can tap anywhere. In one embodiment, selection is made using the neighboring keycaps, swipe left, right, up, down or other movements across the keycaps, movement to the edge of a key cap, or any other movement or action. The nearest keys could be highlighted, or the arrow keys could be used. Alternately, the display could cycle through the suggestions when pressing the original key, with validation by lifting a finger, a double tap, using the Enter key, etc.

FIG. 28 provides an example of where an indicia layer may be displayed above a user's hand layer. Tags 2802, 2804 and 2806 provide examples of such an above the hand indicia layer.

User Interface Device Communication with HMD

Figure 29:
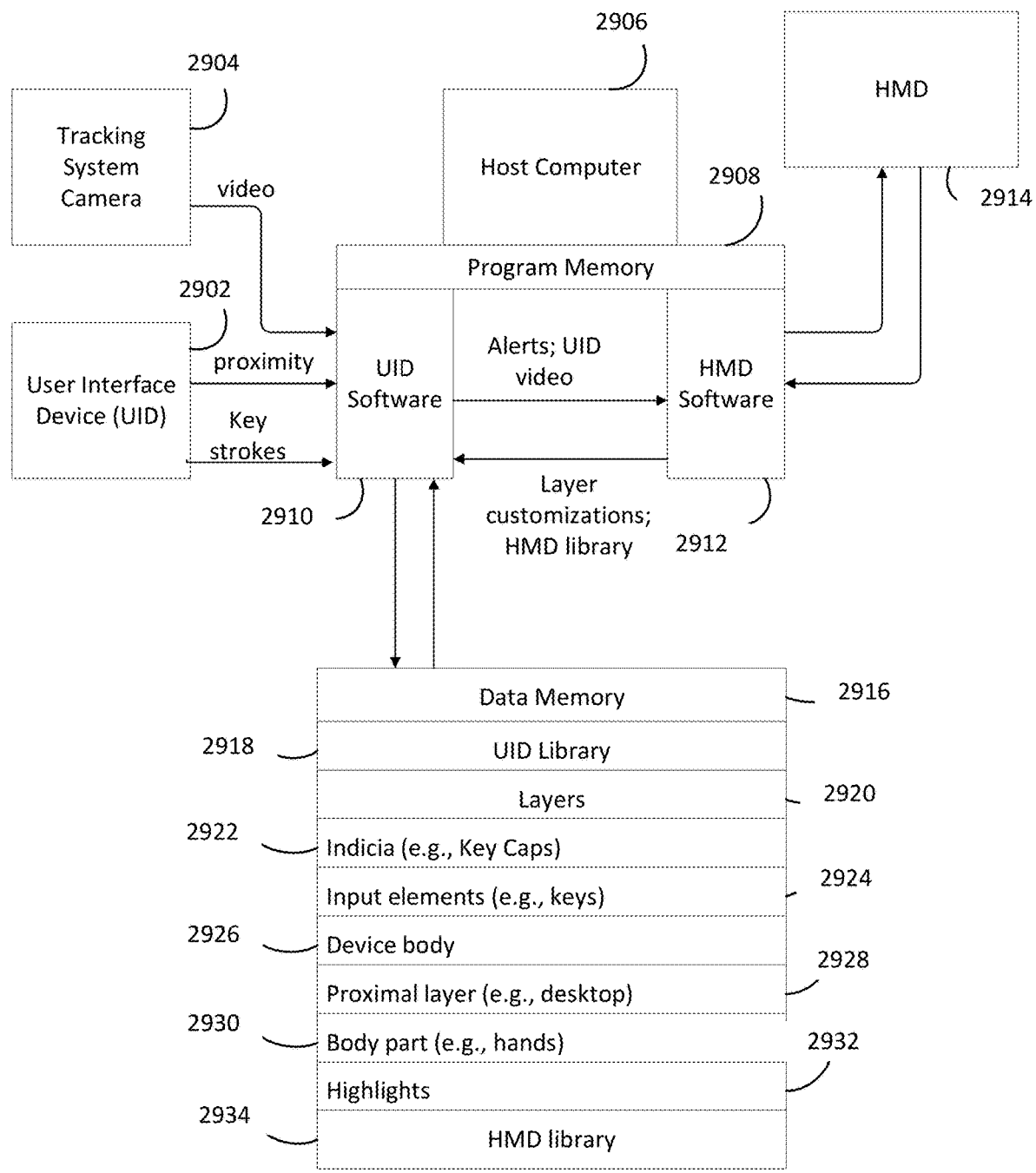
FIG. 29 is a diagram of an embodiment of a communication system between a user interface device and an HMD or other virtual environment apparatus.

FIG. 29 is a diagram of an embodiment of a communication system between a user interface device and an HMD or other virtual environment apparatus. A User Interface Device (UID) 2902 and a tracking system 2904 (e.g., a camera) provide inputs to UID Software 2910 in a program memory 2908 of a host computer 2906. UID software 2910 communicates with a data memory 2916 and HMD software 2912. HMD 2914 communicates through HMD software 2912.

Tracking system 2904, in one embodiment, provides video to UID software 2910. Software 2910 analyses the video to detect the UID 2902, and also detect when a user's hand(s) or other body part approaches the UID. The hands or other body part are extracted from the video to provide a body part layer which is buffered in data memory layer 2930. In addition, the background of the UID is captured, such as the surrounding desktop, and is isolated and provided as a proximal layer 2928.

UID 2902 provides a device ID to UID software 2910, which may be provided through host computer 2906 upon connection (wirelessly or wired) of UID 2902 to host computer 2906. UID software refers to a UID library 2918 to reference the device ID and pull up a description and images for the UID. In one embodiment, the UID library contains a URL link to a remote server with the description and images, which are downloaded to data memory 2916 when the UID connects to the host computer (this can also include 3D files as models of the UID). The images include various layers 2920, including an indicia layer (e.g., key caps) 2922, input element (e.g., keys) layer 2924, device body 2926, and available highlights layer 2932.

UID 2902 also provides a proximity signal when a capacitive or other sensor detects a proximate user body part. In addition, inputs (e.g., keystrokes) from the normal user operation of the UID are provided. Such inputs include button presses, joystick and steering wheel movement, touches and movements on a touchpad, etc. UID software 2910 provides alerts to HMD software 2912 upon proximity and user input events, so that the HMD software can use the inputs. A proximity alert may be based on a weighted combination of inputs from the UID proximity sensor and the tracking system. The weighting may vary depending on conditions, such as weighting the tracking system less when its view is partially blocked. In addition, a far proximity alert may be provided upon a tracking system detection, which may occur before the user's body part is within range of the UID proximity sensor. Such alerts are push signals to HMD software 2912.

A proximity or intent to use the UID may factor in information from the HMD, such as HMD orientation (e.g., indicating a gaze toward the UID). The intent to type/input is the moment the user decides they want/need to use the keyboard or other UID, and have started showing external signs of their intent. Such external signs include, but do not limit to: head tilting down, hands hovering over the keyboard, hands moving toward the keyboard, etc. The intent to type could be detected when the user has their hands close enough to the keyboard, but not necessarily on it to type. In one embodiment, machine learning is used to detect an intention to type based on hands movements and position, and/or gaze tracking, and/or head tracking (using capacitive, optical, magnetic, acoustic, radar-like (ex: Google soli), or any other technology sensors in the keyboard in conjunction or each as a single way of detecting this intention to type). The user interface of the application being used is a strong indicator also on the intent to type as it will decide most of the time whether it allows the user to perform a typing action or not, depending on what is happening in the application (e.g., presentation of a text box, text fields, research fields, chat, side notifications, etc.).

HMD software 2912 may issue pull commands to the UID software, in particular requesting, in response to a proximity or input alert, a reconstituted video of the UID, user body part and close surrounding area. The reconstituted video is input to the VR environment generated by the HMD to provide an AR or MR environment, which may also be called augmented virtuality. Alternately, the HMD may request individual layers, and do the reconstituting itself, adding or modifying layers. The HMD may provide its customized inputs to the layers assembled by UID Software 2910. These customized inputs are stored in a HMD library 2934 of data memory 2916. For example, a particular HMD software application for a particular video game or other application may provide customized indicia (e.g., types of flowers) to be added to the layer in certain situations. In another example, in Minecraft® VR the application could show the game hotbar icons on number keys 1-6. Also, a customized device body for the input device may be provided, such as a keyboard body with the logo of the video game. In addition, transition criteria for effects to use upon state transitions may be provided, such as fading or a wide variety of transitions similar to those available between slides of a presentation. In addition, layer customizations, such as particular highlights, may be provided from HMD software 2912 to UID software 2910 during running of the HMD software. The HMD software may be an operating system for HMD 2914, or a particular application (e.g., video game or office application) running on host computer 2906 to control HMD 2914. The HMD software may alternately be located in HMD 2914. Alternately, the layers may be provided to a different software application for combining and rendering a composite video. Similarly, other tasks can be modularized and performed in different software applications, in firmware or even in hardware, such as using a specialized graphics chip.

HMD software 2912 decides when to use or change the layers or composite video. The transitions can happen when (1) the user interacts with the peripheral, (2) when the HMD application decides it is required to change one or more layers, or (3) when the system/platform decides to change one of the layers. The user interactions could be determined by detecting the user has the intention to type through sensing hands getting closer to the keyboard, detecting touch on keycaps, or viewing hands moving in the direction of the keyboard through an optical sensor, gaze detection, etc. The HMD application is able to decide which layers are displayed, with what content, and when they are displayed. I.e, entering a text field will display the keyboard, with one layer of augmentation that shows the hands, and one other layer with function tooltips above some keys. The system operating system might put a red layer over the keyboard to indicate an alert condition, or high priority message from outside of the VR environment. In one embodiment, a communication channel is provided to the application or game that is running on the HMD. This channel is used to let the application or game know where the user's hands or other body parts are. This provides more flexibility in addition to letting the application or user toggle the visualization on and off. This enables integration with the application or game mechanics. For example, starting/pausing/resuming the application/game can happen automatically if the hands are at the right place.

Device Augmentation

In one embodiment, an indicia or keycaps layer provides readability augmentation. This layer features a representation of any sort that allows the user to better read the keycaps than the original keyboard representation used in VR could. Three example implementations are: (1) the hands representation come from an optical sensor and are not segmented, (2) the hands representation come from an optical sensor and the hands are segmented, and (3) the hands are a virtual representation of the user's real hands.

In one embodiment, the user is in a VR context/environment. When they direct their gaze at the keyboard (be it to identify the location of a key or for any other purpose involving the use of a keyboard), the user is given a layer that remains strictly above the representation of their hands/presence of their hands. In this context, the keycap readability augmentation layer is set to a transparency level that does not completely occlude the hands representation augmentation layer.

In one embodiment, a region of interest is identified. The user is in a VR context/environment. When they direct their gaze at the keyboard (be it to identify the location of a key or for any other purpose involving the use of a keyboard), the user is given a layer that remains strictly above the representation of the keyboard, but strictly below the hands representation augmentation layer. Other layers can be placed between the representation of the keyboard and the aforementioned layer.

In one embodiment, the keycaps readability augmentation layer is integrated in a 3D model of the peripheral and becomes a part of it natively.

In one embodiment, keys usage augmentation is provided. The user is in a AR or VR context/environment, and is using their keyboard. Upon pressing a key, the user is given a visual hint on the keys usage augmentation layer. This visual hint could be any visual effect happening at the location of the virtual key that reflects the real key that has been pressed. Such visual effects include, but do not limit to:

Color effect: color change, brightness change, highlight change, key lighting change, etc.

Animation: key moving up and down, key rotating on itself, key grows or shrinks, etc.

VFX: key turns to flames, key explodes, key changes shape, etc.

SFX: simulate a regular key, allow the user to assign any sfx to key events, etc.

Natural effects removal: hide the keys, remove audio feedback of the keys, etc.

adding 3D figurines or objects (still or animated/moving) on top of the keys so that the user can see 3D objects as being coming out of his keyboard.

replace elements of the keyboard, (such as the touchpad), with other UI, such as a video window feed, or a scrollable list of elements (in AR/MR).

Note: This layer can be merged with the keycaps readability augmentation.

In one embodiment, keys sound augmentation is provided. Depending on the different layers/skins used to virtually enhance in an AR/VR setting, different sounds are added depending on the context. For example, a keyboard can be augmented to work in two different game types. For each game type a different layer/skin may be used. A combination of both could be used, and it could also adapt and vary based on the actions or states in the game or application. Also the sound of a key press can be augmented to 'fit' with the game type, i.e. '8 bit' sound for the Minecraft® game for the entire keyboard or callout WASD keys sounds to be different from other sounds of the keyboard. This click is heard from the headset speakers and not the physical keyboard. All of this is also relevant for haptics if a haptic feedback type keyboard is the UID. The haptic feel of a key press would be altered depending on the key/game type.

In one embodiment, a user augmented/customized keyboard is provided. A 3D model of the hardware is provided and the user is enabled to paint and customize the virtual product, either beforehand or while in the VR/AR/MR environment.

In one embodiment, many key-level interactions will feel more natural if the augmentation is below the fingers. However, there are a few examples when it might be useful/acceptable to have augmentation appear above the hands or above the keys. For example, when the user approaches the keyboard, the overlay shows different functional zones of the keyboard. In this example it shows alphanumeric keys, edit keys, cursors keys, etc. This could be more broadly applied to give the user a sense of spatial distribution of controls on the keyboard as they learn/adapt to a new app. Dynamic hints can also be provided by the application ("application" may include a game). For example based on what tool is opened in an application, hints can be provided on the keyboard with shortcuts that apply to this specific tool, and it can be limited to only when it is brought to the foreground.

In one embodiment, additional information on the context of the key is shown above the fingers. For a gaming example, where the user is playing the Minecraft® game, if the user does long touch on key an additional 3D popup can be provided that shows macro assignments in more detail. Another type of overlay that would be suitable to appear above the keyboard could be a priority alert (such as done in some games with flashing LEDs on keys to indicate a "serious" issue). An overlay can be a notification tool. For example, the Battlefield 1™ game uses a flash of the RGB LEDs on the keyboard to signify to the player that the game is loaded and ready to be played. Such an overlay could be used in other circumstances than notifying issues, such as a help menu, comments and feedback, or any other interaction or communication.

Figure 30:
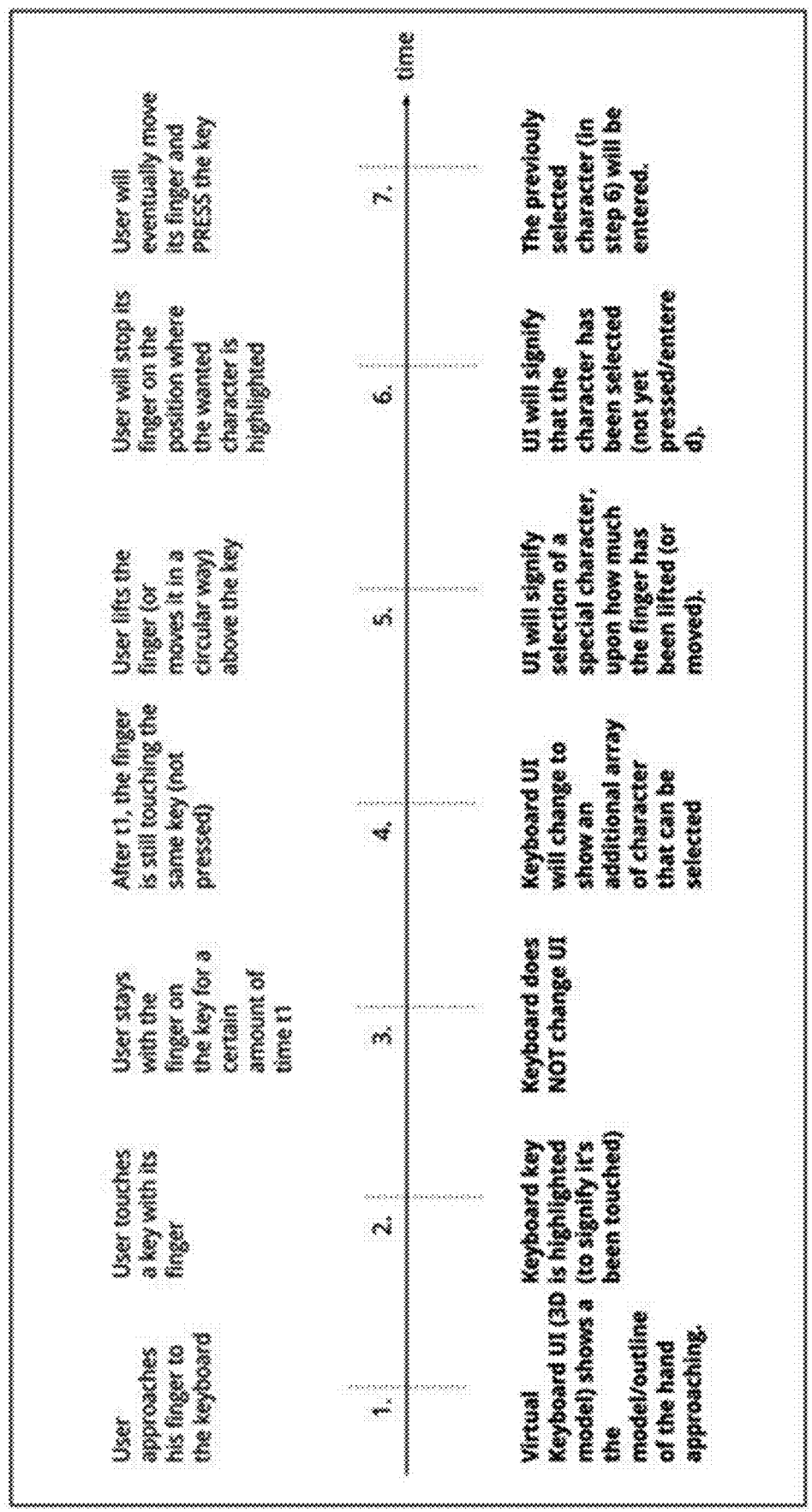
FIG. 30 illustrates one embodiment of a flow of transitions.

In one embodiment, as illustrated in FIG. 30, a particular flow of transitions is provided. When the user/s hands approach the keyboard, the keyboard view is augmented to show the different functional areas of the keyboard based on the current context (app, mode within app, enabled features, etc.).

In one embodiment, the user needs to access additional characters that are not printed on keycaps. Also, avoiding having to add too many printings on keys will allow a nicer design/ID. Sometimes some characters are only triggered when pressing a certain combination of keys, which is often difficult to remember for the user. Thus, in a similar way as it is done for a OSK (On Screen Keyboard) on a phone, where when the user long-presses on a key (ie before releasing/removing the finger from the screen), the UI will show an additional set of accessible (special) characters (see, e.g., FIGS. 27A-C) that the user will be able to select by sliding his/her finger to the selected character. The showing and selecting of special characters can be done in a variety of ways. The user may slide a finger from key to key until they reach the correct one. The user could slide above or sideways. Since proximity sensing is provided, a user could lift the finger (in the air) or slide it (in the air) sideways above the keys. Since it is tracked the system can highlight/select the correct virtual UI elements while the user does that. Other gestures on or above the keys can also be used, and can be used in combination with other key presses, such as arrow keys, an Enter key to select, etc. This same mechanism can be applied to the following situations:

Selection of a special character
Selection of a particular emoji
Selection of granular settings such as color palette, brush size, font or others.

In one embodiment, the same triggering mechanism could be used to enter a mode (i.e., after having positioned the fingers on some definite keys on the keyboard) in order to enter a mode where the user will be able to manipulate windows not only in XY (move windows up and down and laterally) by moving fingers on the keyboard surface, but also on Z, by moving the fingers away or closer to the keys while above the keys (e.g., in order to move the windows closer or further away from the user when in XR).

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example (s), embodiment(s), or dependency of the claim(s).

Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

As used herein, any machine executable instructions, or compute readable media, may carry out a disclosed method, and may therefore be used synonymously with the term method, or each other.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

What is claimed is:

1. A non-transitory computer-readable medium storing computer-executable instructions that, when executed by at least one processor of a computer, are configured to cause the computer to:
   receive, from a computer peripheral device, an identifier;
   identify an image of the computer peripheral device, wherein the image of the computer peripheral device includes a composite of a plurality of layers for displaying the computer peripheral device within a virtual reality environment and wherein the plurality of layers are stored at a location defined within a lookup table;
   use the identifier to index into the lookup table; and
   obtain, using the lookup table and the identifier, image data for visually representing layers of the plurality of layers within the virtual reality environment.

2. The non-transitory computer-readable medium of claim 1 wherein the virtual reality environment has a plurality of states including a virtual reality display state and an augmented reality display state.

3. The non-transitory computer-readable medium of claim 2 wherein the computer-executable instructions are further configured to cause the computer to:
   transition between two of the plurality of states in response to receiving a trigger signal from the computer peripheral device.

4. The non-transitory computer-readable medium of claim 3 wherein the trigger signal from the computer peripheral device corresponds to either:
   a detected activation of an input element on the computer peripheral device; or
   a detected activation of a proximity sensor on the computer peripheral device.

5. The non-transitory computer-readable medium of claim 3 wherein the plurality of layers includes at least two of an indicia layer, an input element layer, a device body layer, a proximal layer, a body part layer and a highlight layer, wherein at least one of the plurality of layers is modified upon the transition between states.

6. The non-transitory computer-readable medium of claim 5 wherein the image of the computer peripheral device has one of the layers modified a period of time after the transition.

7. The non-transitory computer-readable medium of claim 1 wherein the instructions are further configured to cause the computer to:
   display the plurality of layers in a head mounter display (HMD).

8. A system comprising:
   one or more processors;
   one or more non-transitory computer-readable mediums storing computer-executable instructions that, when executed by the one or more processors, cause the system to:
   receive, from a computer peripheral device, an identifier;
   identify an image of the computer peripheral device, wherein the image of the computer peripheral device includes a composite of a plurality of layers for displaying the computer peripheral device within a virtual reality environment and wherein the plurality of layers are stored at a location defined within a lookup table;
   use the identifier to index into the lookup table; and
   obtain, using the lookup table and the identifier, image data for visually representing layers of the plurality of layers within the virtual reality environment.

9. The system of claim 8 wherein the virtual reality environment has a plurality of states including a virtual reality display state and an augmented reality display state.

10. The system of claim 9 wherein the computer-executable instructions are further configured to cause the computer to:
    transition between two of the plurality of states in response to receiving a trigger signal from the computer peripheral device.

11. The system of claim 10 wherein the trigger signal from the computer peripheral device corresponds to either:
    a detected activation of an input element on the computer peripheral device; or
    a detected activation of a proximity sensor on the computer peripheral device.

12. The system of claim 10 wherein the plurality of layers includes at least two of an indicia layer, an input element layer, a device body layer, a proximal layer, a body part layer and a highlight layer, wherein at least one of the plurality of layers is modified upon the transition between states.

13. The system of claim 12 wherein the image of the computer peripheral device has one of the layers modified a period of time after the transition.

14. The system of claim 8 wherein the instructions are further configured to cause the system to: display the plurality of layers in a head mounted display (HMD).

15. A computer-implemented method comprising:
    receiving, from a computer peripheral device, an identifier;
    identifying an image of the computer peripheral device, wherein the image of the computer peripheral device includes a composite of a plurality of layers for displaying the computer peripheral device within a virtual reality environment and wherein the plurality of layers are stored at a location defined within a lookup table;
    using the identifier to index into the lookup table; and
    obtaining, using the lookup table and the identifier, image data for visually representing layers of the plurality of layers within the virtual reality environment.

16. The computer-implemented method of claim 15 wherein the virtual reality environment has a plurality of states including a virtual reality display state and an augmented reality display state.

17. The computer-implemented method of claim 16 further comprising: transitioning between two of the plurality of states in response to receiving a trigger signal from the computer peripheral device.

18. The computer-implemented method of claim 17 wherein the trigger signal from the computer peripheral device corresponds to either:
    a detected activation of an input element on the computer peripheral device; or a detected activation of a proximity sensor on the computer peripheral device.

19. The computer-implemented method of claim 17 wherein the plurality of layers includes at least two of an indicia layer, an input element layer, a device body layer, a proximal layer, a body part layer and a highlight layer, wherein at least one of the plurality of layers is modified upon the transition between states.

20. The computer-implemented method of claim 19 wherein the image of the computer peripheral device has one of the layers modified a period of time after the transition.

* * * * *